(12) United States Patent
Yoshida

(10) Patent No.: US 9,594,439 B2
(45) Date of Patent: Mar. 14, 2017

(54) HANDWRITING INPUT/OUTPUT SYSTEM, HANDWRITING INPUT SHEET, INFORMATION INPUT SYSTEM, AND INFORMATION INPUT ASSISTANCE SHEET

(76) Inventor: Kenji Yoshida, Tokyo (JP)

( * ) Notice: Subject to any disclaimer, the term of this patent is extended or adjusted under 35 U.S.C. 154(b) by 752 days.

(21) Appl. No.: 13/131,073

(22) PCT Filed: Nov. 25, 2009

(86) PCT No.: PCT/JP2009/006332
§ 371 (c)(1),
(2), (4) Date: Jun. 8, 2012

(87) PCT Pub. No.: WO2010/061584
PCT Pub. Date: Jun. 3, 2010

(65) Prior Publication Data
US 2012/0263381 A1  Oct. 18, 2012

(30) Foreign Application Priority Data
Nov. 25, 2008 (JP) .................. 2008-300118

(51) Int. Cl.
*G06F 3/0354* (2013.01)
*G06F 3/038* (2013.01)
*G08C 17/00* (2006.01)

(52) U.S. Cl.
CPC .......... *G06F 3/03545* (2013.01); *G06F 3/038* (2013.01); *G08C 17/00* (2013.01)

(58) Field of Classification Search
USPC .................. 345/180, 182, 183; 382/188, 189
See application file for complete search history.

(56) References Cited

U.S. PATENT DOCUMENTS 5,799,107 A  *  8/1998  Fukuchi ................. 382/181
5,984,559 A  *  11/1999  Shiobara et al. ......... 401/214
(Continued)

FOREIGN PATENT DOCUMENTS

CN  201018625 Y  2/2008
CN  101135940 A  3/2008
(Continued)

OTHER PUBLICATIONS

Translation of Office Action dated Sep. 7, 2016, issued in counterpart Korean application No. 10-2011-7014490.*
(Continued)

*Primary Examiner* — Gregory F Cunningham

(57) ABSTRACT

A handwriting input/output system that allows letters, characters and figures to be input by hand. The handwriting input/output system includes an imaging device that captures and transmits the image of a medium provided with a writing area having a dot pattern that defines coordinate information and code information, a dot pattern analysis device that calculates trajectory information by storing the image data of the dot pattern and analyzing the code of the image data, a trajectory recognition device recognizes the trajectory information of the letter, character, and figure traced on the writing area based on a change in the analyzed coordinate information, and a process instruction device transmits a process instruction based on the recognized information together with the trajectory information to an information processing device, whereby a letter, character, or figure can be input by hand.

50 Claims, 75 Drawing Sheets

(56) References Cited

U.S. PATENT DOCUMENTS

| | | | |
|---|---|---|---|
| 6,118,889 A * | 9/2000 | Izuno et al. | 382/119 |
| 6,225,989 B1 | 5/2001 | Wu et al. | |
| 6,556,970 B1 | 4/2003 | Sasaki et al. | |
| 6,747,599 B2 * | 6/2004 | McEwan | 342/463 |
| 2004/0035935 A1 | 2/2004 | Takahashi et al. | |
| 2004/0160430 A1 | 8/2004 | Tokunaga et al. | |
| 2005/0025355 A1 * | 2/2005 | Simard et al. | 382/159 |
| 2005/0223315 A1 * | 10/2005 | Shimizu et al. | 715/512 |
| 2006/0031245 A1 | 2/2006 | Krieglstein | |
| 2006/0139338 A1 | 6/2006 | Robrecht et al. | |
| 2006/0283949 A1 * | 12/2006 | Katsurabayashi et al. | 235/454 |
| 2007/0023523 A1 | 2/2007 | Onishi | |
| 2007/0058868 A1 * | 3/2007 | Seino | G06F 3/0317 382/187 |
| 2007/0098263 A1 | 5/2007 | Furukawa et al. | |
| 2007/0164110 A1 * | 7/2007 | Yoshida | G06F 3/0317 235/454 |
| 2007/0294138 A1 | 12/2007 | Yokota | |
| 2008/0019616 A1 | 1/2008 | Hotta et al. | |
| 2008/0233360 A1 | 9/2008 | Sekine et al. | |
| 2008/0273797 A1 | 11/2008 | Takikawa et al. | |
| 2009/0003733 A1 | 1/2009 | Osakabe et al. | |
| 2009/0059299 A1 * | 3/2009 | Yoshida | G06F 3/0317 358/1.18 |
| 2009/0091530 A1 | 4/2009 | Yoshida | |
| 2009/0325647 A1 * | 12/2009 | Cho et al. | 455/567 |
| 2010/0171891 A1 * | 7/2010 | Kaji et al. | 349/12 |
| 2010/0265520 A1 | 10/2010 | Yoshida | |
| 2010/0328272 A1 * | 12/2010 | Craven-Bartle et al. | 345/179 |

FOREIGN PATENT DOCUMENTS

| | | | | |
|---|---|---|---|---|
| EP | 1 548 635 A1 | 6/2005 | | |
| EP | 2 189 882 A1 | 5/2010 | | |
| GB | 2 274 186 A | 7/1994 | | |
| JP | 52-24422 A | 2/1977 | | |
| JP | 61-133486 A | 6/1986 | | |
| JP | 64-41081 A | 2/1989 | | |
| JP | 6-208654 A | 7/1994 | | |
| JP | 2000-221991 A | 8/2000 | | |
| JP | 2000347686 A * | 12/2000 | | G06F 3/16 |
| JP | 2002-182838 A | 6/2002 | | |
| JP | 2003-528387 A | 9/2003 | | |
| JP | 2003-346078 A | 12/2003 | | |
| JP | 2004-139534 A | 5/2004 | | |
| JP | 2004-246433 A | 9/2004 | | |
| JP | 2004-302608 A | 10/2004 | | |
| JP | 2005-99939 A | 4/2005 | | |
| JP | 3766678 B2 | 4/2006 | | |
| JP | 2006376667 * | 4/2006 | | G06K 7/10 |
| JP | 2007-41691 A | 2/2007 | | |
| JP | 3879106 B1 | 2/2007 | | |
| JP | 2007-109118 A | 4/2007 | | |
| JP | 2007-115291 A | 5/2007 | | |
| JP | 2007-328637 A | 12/2007 | | |
| JP | 4042065 B1 | 2/2008 | | |
| JP | 2008-152745 A | 7/2008 | | |
| JP | 2008-152755 A | 7/2008 | | |
| JP | 2008-154211 A | 7/2008 | | |
| JP | 4129841 B1 | 8/2008 | | |
| JP | 2008-234684 A | 10/2008 | | |
| JP | 2008-264575 A | 11/2008 | | |
| JP | 2009-009343 A | 1/2009 | | |
| JP | 2009-187235 A | 8/2009 | | |
| JP | 2010-518496 A | 5/2010 | | |
| KR | 2002085099 * | 11/2002 | | G06F 3/033 |
| KR | 10-2008-0080237 A | 9/2008 | | |
| KR | 20080080237 * | 9/2008 | | G06F 3/0317 |
| WO | 01/71473 A1 | 9/2001 | | |
| WO | 2005/057471 A1 | 6/2005 | | |
| WO | 2007/032747 A2 | 3/2007 | | |
| WO | 2007/105819 A1 | 9/2007 | | |
| WO | 2008-046128 A1 | 4/2008 | | |
| WO | 2008/095232 A1 | 8/2008 | | |

OTHER PUBLICATIONS

Notification of Transmittal of Translation of the International Preliminary Report on Patentability (Form PC/IB/338) issued in counterpart International Application No. PCT/JP2009/006332 mailed Jul. 14, 2011 with Forms PCT/IB/373 and PCT/ISA/237 (12 pages).
Extended European Search Report dated Aug. 14, 2014, issued in counterpart European Patent Application No. 09828834.3 (8 pages).
Office Action dated Sep. 7, 2016, issued in counterpart Korean application No. 10-2011-7014490. (6 pages).

* cited by examiner

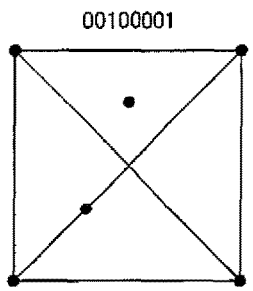
FIG.12 (a)
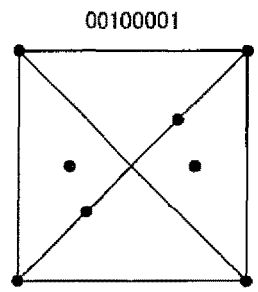
FIG.12 (b)
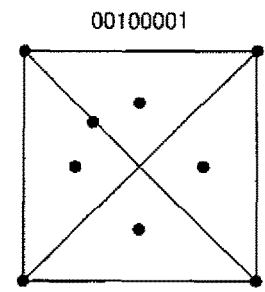
FIG.12 (c)
| $I_3$ | $I_4$ | $I_5$ |
|---|---|---|
| $I_2$ | $I_1$ | $I_6$ |
2 × 3
FIG.13 (a)
| $I_3$ | $I_4$ | $I_5$ |
|---|---|---|
| $I_2$ | $I_1$ | $I_6$ |
| $I_9$ | $I_8$ | $I_7$ |
3 × 3
FIG.13 (b)
| $I_5$ | $I_6$ | $I_7$ |
|---|---|---|
| $I_4$ | $I_1$ | $I_8$ |
| $I_3$ | $I_2$ | $I_9$ |
| $I_{12}$ | $I_{11}$ | $I_{10}$ |
3 × 4
FIG.13 (c)
| $I_{36}$ | $I_{17}$ | $I_{18}$ | $I_{19}$ | $I_{20}$ | $I_{21}$ |
|---|---|---|---|---|---|
| $I_{35}$ | $I_{16}$ | $I_5$ | $I_6$ | $I_7$ | $I_{22}$ |
| $I_{34}$ | $I_{15}$ | $I_4$ | $I_1$ | $I_8$ | $I_{23}$ |
| $I_{33}$ | $I_{14}$ | $I_3$ | $I_2$ | $I_9$ | $I_{24}$ |
| $I_{32}$ | $I_{13}$ | $I_{12}$ | $I_{11}$ | $I_{10}$ | $I_{25}$ |
| $I_{31}$ | $I_{30}$ | $I_{29}$ | $I_{28}$ | $I_{27}$ | $I_{26}$ |
6 × 6
FIG.13 (d)

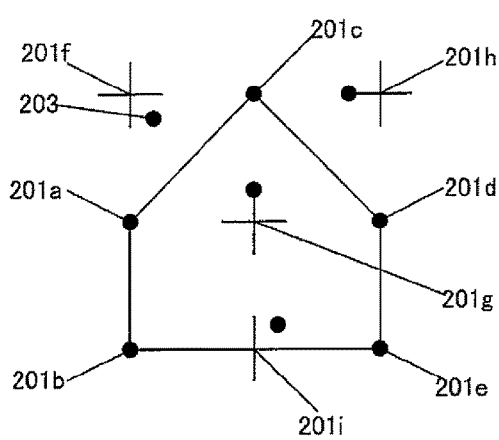
FIG.14 (a)
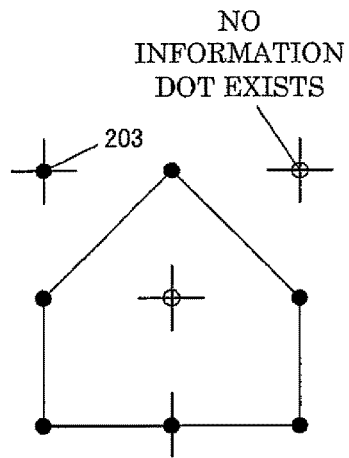
FIG.14 (b)
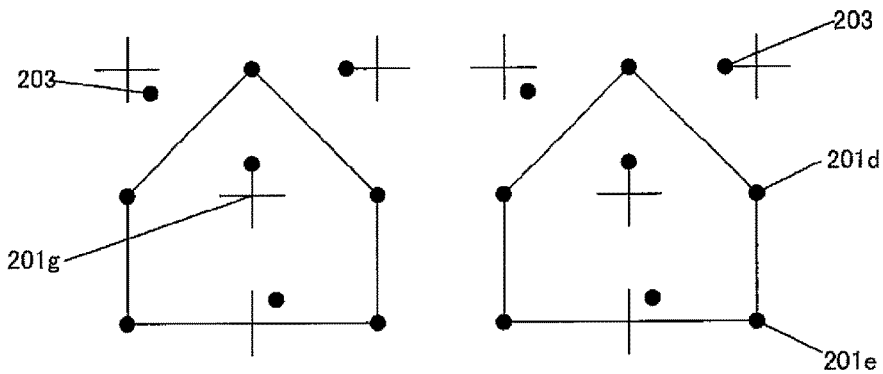
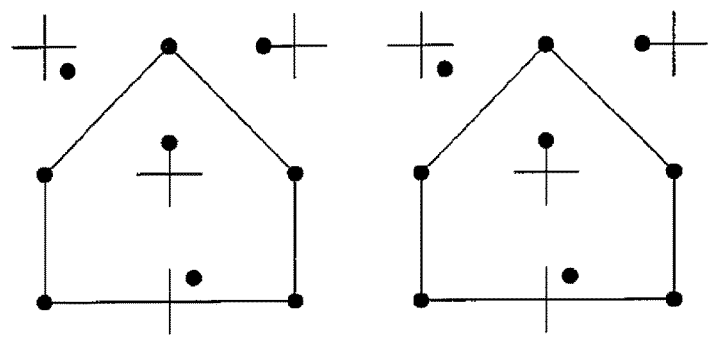
FIG.14 (c)

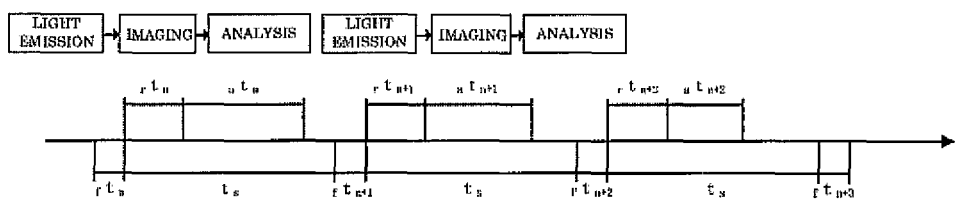
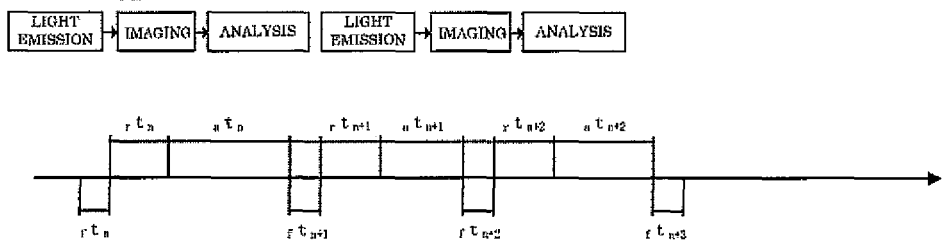
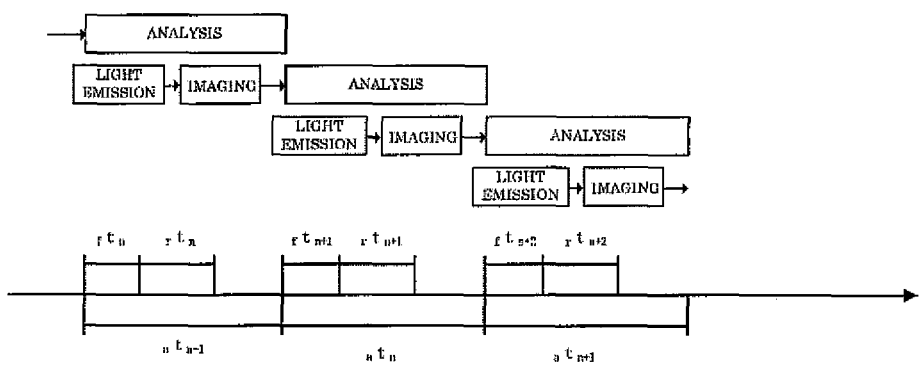
FIG.18

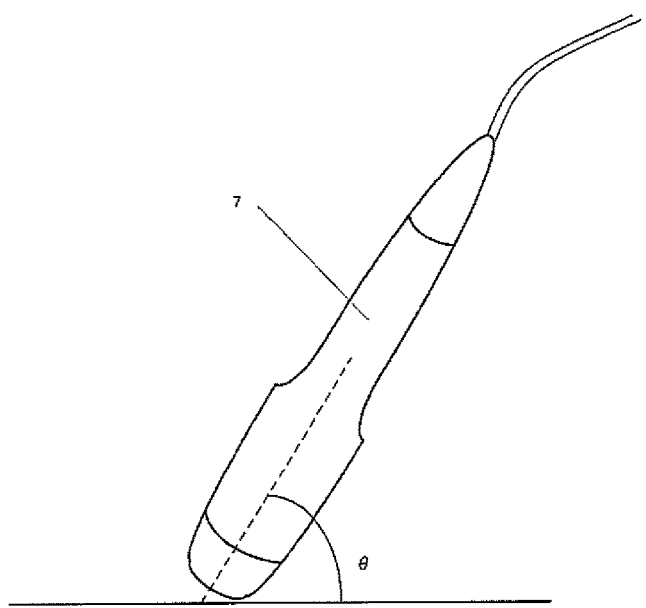
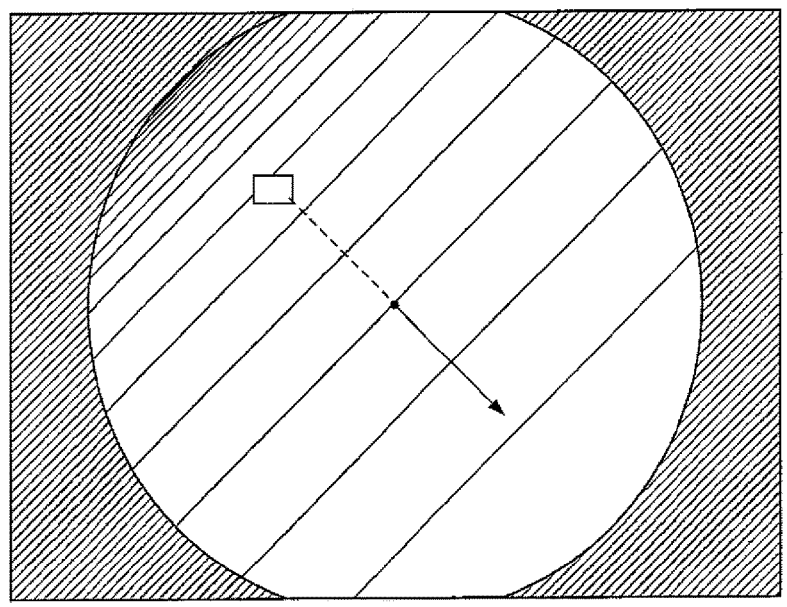
FIG.44

MEASURING METHOD USING FOURIER'S FUNCTION
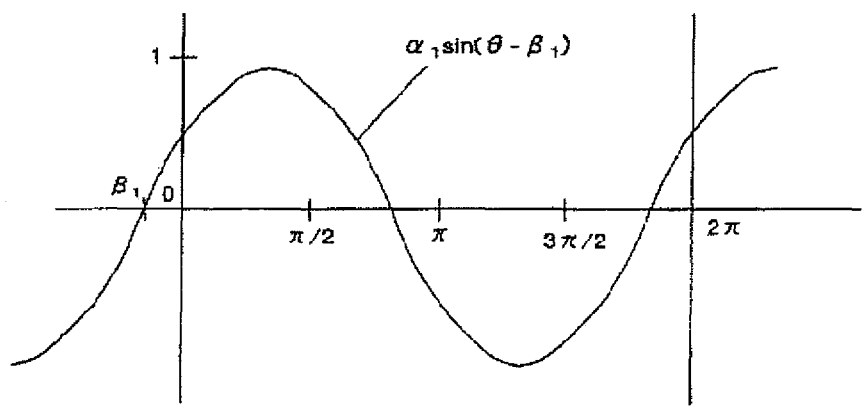
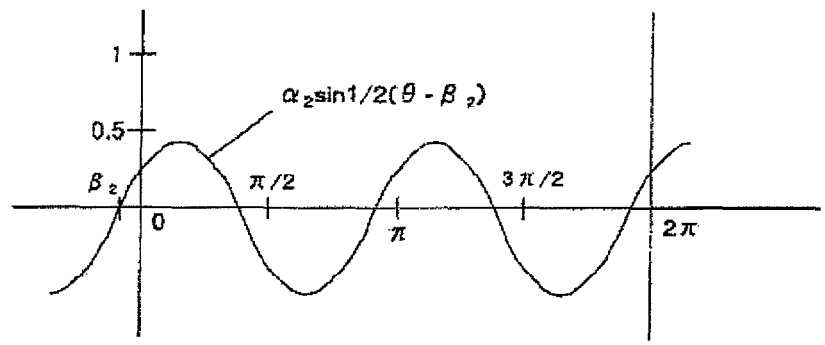
$$BL(i) = \sum_{j=1}^{\frac{n}{2}} \alpha_j \left\{ \sin\left(\frac{1}{2}\right)^{j-1} (\theta - \beta_j) \right\}$$
WHEREIN n = 2m (n IS THE NUMBER OF MEASUREMENT POINTS)
FIG.46

BL(i)= $\alpha_1(\theta - \beta_1) \cdot \alpha_2(\theta - \beta_2) \cdots \alpha_j(\theta - \beta_j)$
WHEREIN j IS n/2, n = 2m
j AND j ARE CALCULATED BY SOLVING THIS EQUATION

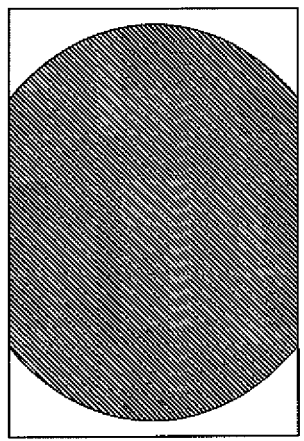
FIG.48 (c)
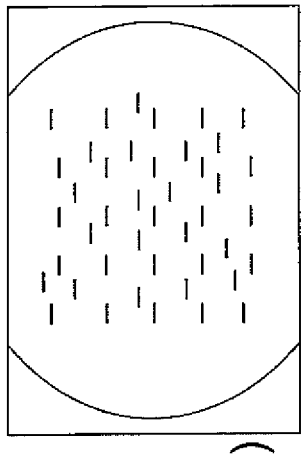
FIG.48 (d)
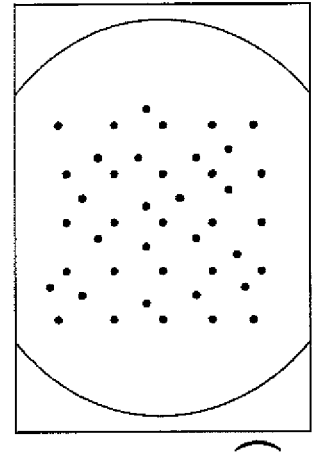
FIG.48 (e)
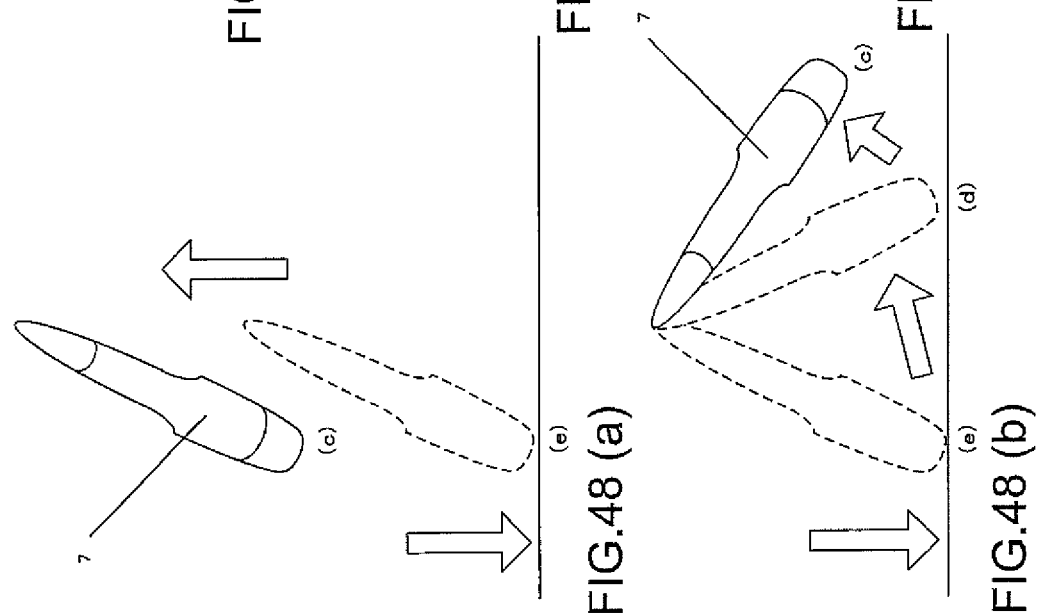
FIG.48 (a)
FIG.48 (b)

Thank you for today.

I will send some materials later.

When you come Tokyo, please visit xx building. Development team will

[At Kinder: Kaneko, Tanaka, Ogawa, Akanatus: Shiroishi]

wait you on that day.

—1—

To all employees

We will have a party to celebrate successful completion of our project at xx. Please come in front of Tokyo station at xx:xx. All employees

[ad ticket gate of Marunouchi North Exit]

are respectfully invited to this occasion.

| EDIT MARK | USE PURPOSE |
|---|---|
| ⬭ | SELECTING THE AREA |
| ⌒  ⌐ | SELECTING THE AREA INBETWEEN LINES |
| ⬭ (with arrow) | CUTTING & PASTING |
| =  トル (DELETE) | DELETING |
| イキ (STET) | NULLIFYING DELETION/ CANCELLATION OF EDITING |
| MVV * MORE THEN THREE UP AND DOWN PATTERNS | CANCELLATION OF EDITING |
| ↕ | SWAPPING |
| ↪ | SPECIFYING PASTING DESTINATION |
| Ⓐ Ⓑ | FLAG |

FIG.53

THANK YOU FOR TODAY.

I WILL SEND SOME MATERIALS LATER.

WHEN YOU COME TOKYO, PLEASE VISIT XX BUILDING. DEVELOPMENT TEAM WILL WAIT YOU ON THAT DAY.

—1—

TO ALL EMPLOYEES

WE WILL HAVE A PARTY TO CELEBRATE SUCCESSFUL COMPLETION OF OUR PROJECT AT XX.

PLEASE COME IN FRONT OF XX STATION AT XX:XX.

All ARE RESPECTFULLY INVITED TO THIS OCCASION.

THUS, INFRARED RAYS ARE REQUIRED TO BE DIFFUSELY REFLECTED AND ENTER INTO LENS.

*INFRARED RAYS ARE DIFFUSELY REFLECTED IN ALL IMAGING AREA AND ENTER INTO LENS.

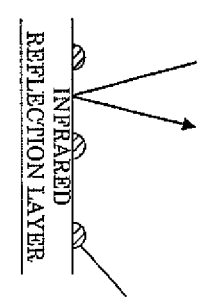
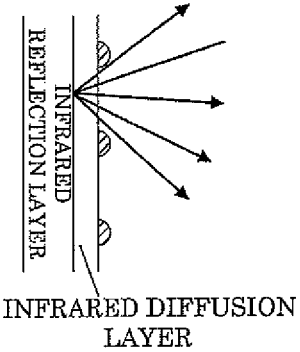
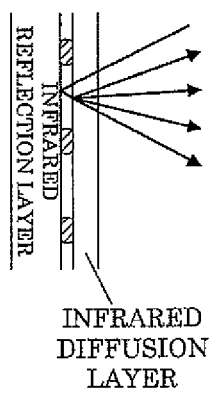
DOT PATTERN LAYER     INFRARED DIFFUSION LAYER     INFRARED DIFFUSION LAYER
FIG.71 (a)          FIG.71 (b)          FIG.71 (c)
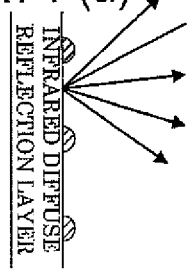
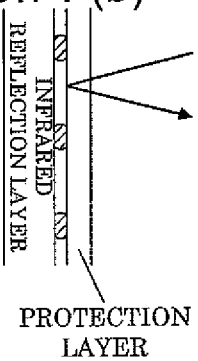
FIG.71 (d)
PROTECTION LAYER
FIG.71 (e)
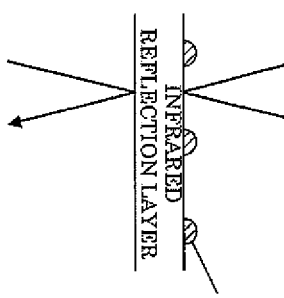
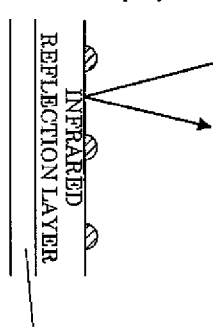
DOT PATTERN LAYER
FIG.71 (f)
ADHESIVE LAYER
FIG.71 (g)

DOT PATTERN LAYER

INFRARED DIFFUSION LAYERS

INFRARED DIFFUSION LAYERS

PROTECTION LAYER — PROTECTION LAYER

ADHESIVE LAYER — ADHESIVE LAYER

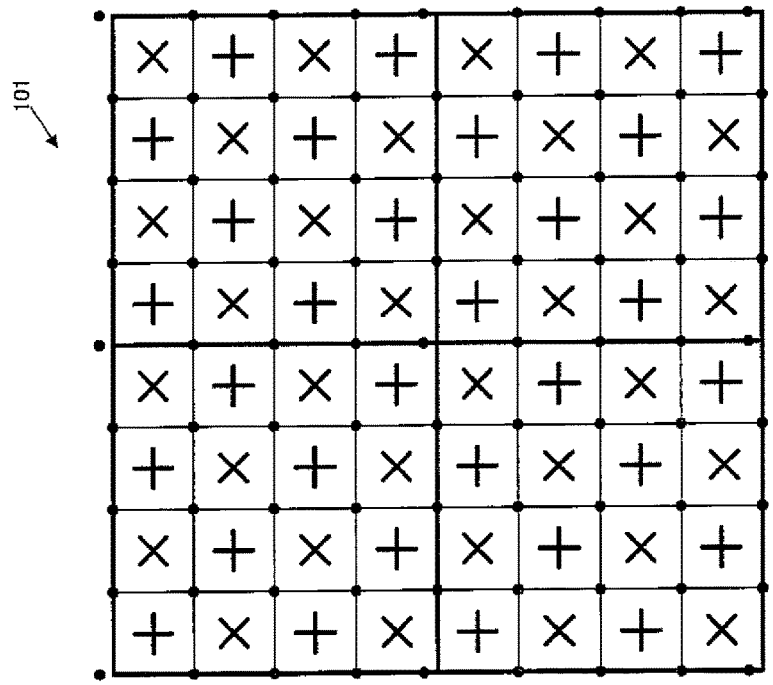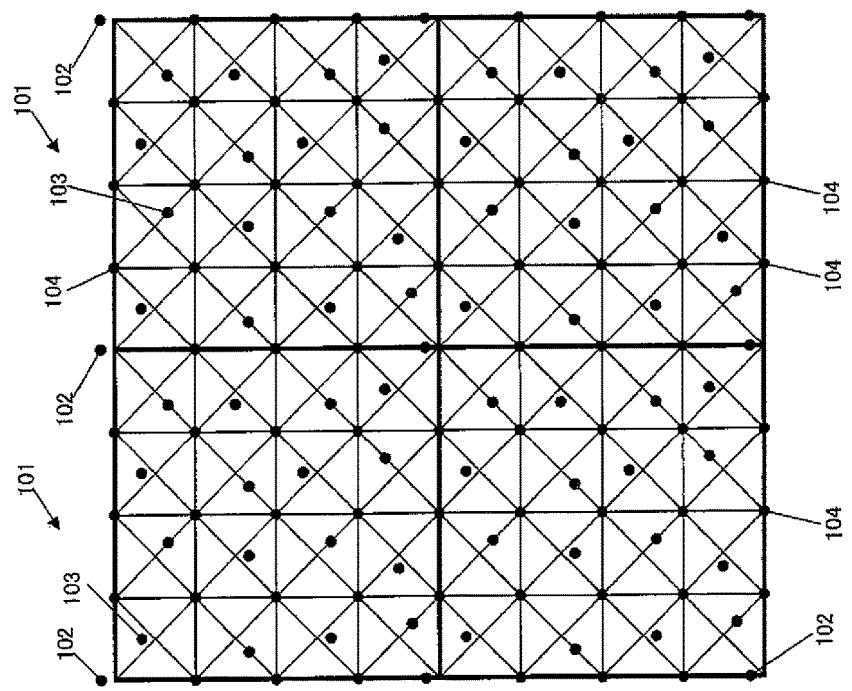

HANDWRITING INPUT/OUTPUT SYSTEM, HANDWRITING INPUT SHEET, INFORMATION INPUT SYSTEM, AND INFORMATION INPUT ASSISTANCE SHEET

FIELD OF THE INVENTION

The present invention relates to a handwriting input/output system and hand writing input sheet for inputting handwritten information including letters, characters, and figures into a computer system. The invention relates to an information input system and information input assistance sheet for assisting input into a computer system.

BACKGROUND OF THE INVENTION

Computers have come to be used widely in every situation of our lives. In addition to traditional usages such as preparing documents and performing calculations, the functions and usages of the computer are dramatically increasing including drawing pictures and drawing architecture and machines.

To draw pictures, architecture, and machines, it is conventionally required to use a keyboard, mouse, tablet, CAD system, and the like to perform operations, such as inputting of letters and characters and drawing designs.

However, there are a lot of cumbersome operations to input letters and characters via a keyboard and to draw designs using a tablet and CAD system, requiring time to get used to. Particularly there is a problem in which, for those who have trouble in operating devices, such as elderly people, such operations are difficult. Further, "digital divide" is now becoming a problem in which a gap is generated in terms of information and opportunities between those who can use a keyboard, mouse, and the like to handle computers and those who cannot use a keyboard, mouse, or the like and cannot handle computers.

To solve such problems, a system for inputting handwritten information into a computer had been proposed. Such a system comprises a base and a drawing device. Moving the drawing device in relation to the base generates graphical information (handwritten information). The base is equipped with fine dot patterns of position-coding pattern that registers position information on the base. If drawing is performed on the base using the drawing device, the drawing device reads out the position-coding pattern. The computer system stores the position information on the base from the drawing device as a graphical input. In this way, the drawn content can be input into the computer system, output to the display, or stored to the memory (for example, Japanese Unexamined Patent Application Publication No. 2003-528387).

SUMMARY OF THE INVENTION

Problems that the Invention is to Solve

However, the position-coding pattern used in the system of Japanese Unexamined Patent Application Publication No. 2003-528387 registers only position information. As the result, the computer system can only input the graphical information drawn by the drawing device, and a different area from the area for drawing has to be separately provided to input/record a variety of information related with the graphical information including the page number of a booklet, which arises a problem in which the handwriting input/output system becomes complicated requiring a user to operate over a plurality of areas. Further, a reference table must be provided for inputting and recording a variety of information related with the graphical information to all the position information corresponding to the graphical information drawn by the drawing device. Particularly, if the drawing area is not a rectangle and is an area surrounded by a polygon or curved lines, a reference table for all the position information within the area is required.

The present invention was devised in consideration of such problems, and has a technical subject to easily provide, with low cost, a handwriting input/output system that allows inputting of letters, characters, figures, and the like by hand. Further, the present invention also has a technical subject to provide a handwriting input/output system that allows collectively inputting information, such as letters, characters, and figures, as well as relating information thereto.

Means to Solve the Problems

<Handwriting Input/Output System>

The handwriting input/output system comprises: a medium that comprises a writing area, on at least part of or a plurality of areas of the medium, formed with a dot pattern that repeatedly defines coordinate information and code information; an imaging unit that images the dot pattern of the writing area and transmits image data thereof; a dot pattern analysis unit that stores the image data of the dot pattern imaged and transmitted from the imaging unit into a storage element and analyzes a code of the image data to obtain trajectory information including the coordinate information and the code information; a trajectory recognition unit that recognizes the trajectory information of a letter, a character, and/or a figure that is traced on a surface of the writing area based on a change in the analyzed coordinate information; and a process instruction unit that transmits a process instruction and the trajectory information according to a recognized recognition information to an information processing unit.

According to the above feature, in the handwriting input/output system of the invention, as the dot pattern formed on the medium defines code information as well as coordinate information, the process instruction unit can collectively transmit trajectory information and a process instruction based on the trajectory information to the information processing unit.

The medium is preferably further formed with a text, graphic, and photograph related with the writing area on at least part of or a plurality of areas of the medium.

According to the above feature, with the handwriting input/output system of the invention, a user can easily know the position of the writing area and what to write in the writing area.

The medium is preferably formed by being additionally superimposed with the dot pattern at least over the trajectory information drawn on the surface of the writing area or the edited information of the trajectory information and/or print information on the surface of the medium.

According to the above feature, in the handwriting input/output system of the invention, a medium that is once handwritten input can be superimposed and printed with a new dot pattern, then, the medium can be further written in/edited.

On a predetermined medium surface and/or the writing area surface of the medium, the dot pattern that repeatedly forms code information that defines identification information identifying the writing area and/or an operation instruction (e.g., starting up a program, inputting a command, inputting and outputting/searching data, specifying searching information) is preferably formed by being superimposed with an icon signifying the code information.

According to the above feature, in the handwriting input/output system of the invention, a user can easily know what the code information means (what kind of process instruction is transmitted) by seeing the icon.

The icon is preferably formed by superimposing on the dot pattern on the surface of a medium including a sticker and sticky note that can be attached somewhere.

According to the above feature, in the handwriting input/output system of the invention, the icons can be freely laid out on the medium surface, enhancing flexibility of the layout.

By defining the medium provided with the writing area as the first medium, the medium preferably further comprises the second medium on which is formed a dot pattern that repeatedly defines code information for identifying the surface of the first medium and/or the surface of the writing area, wherein, by scanning the code information formed on the second medium with the imaging unit, print information on the first medium surface and/or the trajectory information drawn on the writing area surface and/or information related with the trajectory information is output.

According to the above feature, in the handwriting input/output system of the invention, by printing the code information identifying a medium surface on other media (e.g., an organizer), information handwritten input on the medium surface can be searched and output by touching on the medium surface with the imaging unit. Further, the space for the writing area of the medium can be widely retained.

The second medium is preferably in a form of a sticker, sticky note, and the like that can be attached somewhere, or a card.

According to the above feature, with the handwriting input/output system of the invention, flexibility of the layout of the writing area is further enhanced, allowing searching and outputting of information handwritten input on the writing area at will in accordance with convenience and preference of a user.

The medium is preferably a grid sheet that is a transparent medium used by being placed on a monitor surface that displays the writing area of the handwriting input/output system and the grid sheet is formed with a dot pattern that repeatedly defines coordinate information and/or code information.

According to the above feature, the handwriting input/output system of the invention can provide a manageable touch panel.

The medium is preferably a grid sheet that is a transparent medium used by being placed on a medium printed with the writing area of the handwriting input/output system and the grid sheet is formed with a dot pattern that repeatedly defines coordinate information and/or code information.

According to the above feature, in the handwriting input/output system of the invention, a grid sheet can be placed over a medium surface to input by handwriting even if the grid sheet is not placed on the monitor surface.

The imaging unit preferably further comprises: an irradiation unit that irradiates a predetermined wavelength light to the medium surface through an imaging opening; and an imaging element that images reflection of the predetermined wavelength light and transmits as image data to the dot pattern analysis unit, and the dot pattern analysis unit further comprises: a light control unit that controls the irradiation unit by causing the irradiation unit to emit a predetermined strength light during a first predetermined time, then to emit the predetermined strength light again after a second predetermined time has elapsed that is longer than analysis time required by the dot pattern analysis unit for analyzing a code of the image data, so that the image data can remain in the imaging element as an afterimage longer than time during which the dot pattern analysis unit stores the image data imaged and transmitted by the imaging element, and the first predetermined time and the second predetermined time are consecutive.

According to the above feature, at writing in the handwriting input/output system of the invention, the dot pattern can be clearly burned on the imaging element when the imaging unit moves on the medium surface. Therefore, handwriting input can be realized by analyzing the afterimage even if the frame rate (imaging speed) of the imaging unit is low.

It is preferable that the light control unit instructs the irradiation unit to immediately emit light after analyzing of a code of the image data by the dot pattern analysis unit before the second predetermined time, the irradiation unit emits the predetermined strength light during the first predetermined time, and the dot pattern analysis unit stores image data that is newly imaged and transmitted by the imaging unit into a storage element to analyze a code.

According to the above feature, in the handwriting input/output system of the invention, if the code analysis ends before the second predetermined time due to ideal dot pattern imaging/analysis, an error, or the like, by immediately moving to the next code analysis, imaging interval is shortened and smooth trajectory information can be obtained.

It is preferable that the light control unit instructs the irradiation unit to immediately emit light while the dot pattern analysis unit is analyzing the dot pattern before the second predetermined time, the irradiation unit emits the predetermined strength light during the first predetermined time, and the dot pattern analysis unit stores image data that is newly imaged and transmitted by the imaging unit into a storage element during the analysis time, then, analyzes a code of the image data immediately after the analysis time.

According to the above feature, in the handwriting input/output system of the invention, as the dot pattern analysis unit stores next image data while still analyzing a code, and moves on to analyzing the next image data immediately after analyzing the code, imaging interval is shortened and smooth trajectory information can be obtained.

It is preferable that the imaging unit further comprises a projection for instruction and images the dot pattern on a trajectory near the projection for instruction when tracing a letter, a character and/or a figure traced by the projection for instruction onto the writing area surface, and the dot pattern analysis unit stores image data of the dot pattern transmitted from the imaging unit into a storage element and analyzes a code of the dot pattern to obtain trajectory information including the coordinate information and the code information.

According to the above feature, with the handwriting input/output system of the invention, the position traced by the imaging unit on the writing area can be easily viewed.

It is preferable that the imaging unit further comprises at least a pen tip, and images and transmits the dot pattern on a trajectory near the pen tip when tracing a letter, a character, and/or a figure drawn by the pen tip onto the writing area surface, and the dot pattern analysis unit stores image data of the dot pattern imaged and transmitted from the imaging unit into a storage element and analyzes a code of the dot pattern to obtain trajectory information including the coordinate information and the code information.

According to the above feature, with the handwriting input/output system of the invention, a trajectory near the imaging unit can be left on the writing area surface.

The projection for instruction preferably further comprises: at least a pen tip; a retraction space for retracting the pen tip inside the projection for instruction; and a button for controlling retraction/extension of the pen tip.

According to the above feature, the handwriting input/output system of the invention can be used differently depending on when a trajectory near the imaging unit drawn on the writing area surface is desired to be left and desired not to be left.

It is preferable that the imaging unit further comprises an erasing unit, in the projection for instruction, that erases a letter, a character, and/or a figure drawn on the writing area surface, and, while erasing an area traced by the erasing unit, simultaneously images a dot pattern on a trajectory near the erasing unit on the writing area surface, and the process instruction unit transmits a process instruction for erasing the trajectory information of the letter, the character, and/or the figure and the trajectory information to an information processing unit.

According to the above feature, the handwriting input/output system of the invention can not only relate inputs of the written information between the writing area surface and the information processing unit but also relate erasures of the written information therebetween.

It is preferable that the trajectory recognition unit calibrates the coordinate information obtained by code analysis by the dot pattern analysis unit, so that the coordinate information becomes identical or approximate to the trajectory of a letter, a character, and/or a figure either traced or drawn on the writing area surface.

According to the above feature, even when the trajectory information recognized by the trajectory recognition unit differs from the trajectory on the medium, the handwriting input/output system of the invention can make the trajectory information the same as the actual trajectory or approximate the trajectory information to the actual trajectory as far as there is no problem for real use by calibrating the trajectory information.

It is preferable that the trajectory recognition unit further comprises a timer for keeping times when the imaging unit touches on and separates from the writing area surface, recording a sequence of a trajectory touched and drawn by the imaging unit on the writing area surface and time during which the imaging unit is in contact with the writing area surface, and transmitting them to the information processing unit.

According to the above feature, with the handwriting input/output system of the invention, a variety of researches including the writer's character, age, and sex, can be carried out by recognizing the time required by the information processing unit for inputting and comparing that with normal time.

The timer preferably records times when the imaging unit becomes in contact with the writing area surface and when the dot pattern analysis unit calculates the trajectory information, and transmits the times to the information processing unit.

According to the above feature, in the handwriting input/output system of the invention, by recognizing the moving rate of the pen, brushstroke of a letter or difficulty of writing the letter can be analyzed, further, mental state and physical state of the writer can be anticipated.

It is preferable that the process instruction unit is capable of uniquely inputting identification information that identifies the writing area and/or an operation instruction (e.g., starting up a program, inputting a command, inputting and outputting/searching data, specifying searching information) based on the code information and/or the recognition information.

According to the above feature, in the handwriting input/output system of the invention, process instruction unit can make unique instruction to information processing unit based on the code information and/or recognition information. This is the most important function of the invention, which makes possible identification of which writing area is written in and what kind of operation instruction is performed to which writing area.

It is preferable that the trajectory recognition unit further refers to a letter, character, and/or figure information pattern table categorized in advance and relating to a content to be written in the writing area based on the code information to recognize the trajectory information with high accuracy.

According to the above feature, in the handwriting input/output system of the invention, as a letter, character, and/or figure information pattern table categorized in advance is referred to based on the code information, trajectory information can be recognized with high accuracy.

It is preferable that, after recognizing the trajectory information, based on an analyzed change in the coordinate information, the trajectory recognition unit further refers to a predefined semantic information code table (a dictionary) corresponding to the code information, in search of semantic information of the letter, the character, and/or the figure or a word comprising one or a plurality of the letters and the characters, and converts the code information into a semantic information code, and the process instruction unit transmits the semantic information code and the process instruction based on the semantic information to the information processing unit.

According to the above feature, by referring to the semantic information code table when recognizing the trajectory, the handwriting input/output system of the invention can recognize the trajectory information with high accuracy, and, by converting into a semantic information code, transmit the process instruction of that meaning.

The process instruction unit preferably instructs the information processing unit to execute the first operation, that is, to input the recognition result of the trajectory information by the trajectory recognition unit as a text and/or a figure.

According to the above feature, the handwriting input/output system of the invention can write a text or a picture by handwriting input.

The process instruction unit preferably instructs the information processing unit to execute the second operation, that is, to input the recognition result of the trajectory information by the trajectory recognition unit as a comment.

According to the above feature, the handwriting input/output system of the invention can input a comment text, in addition to a text and a picture input by handwriting.

The process instruction unit preferably instructs the information processing unit to execute the third operation, that is, by defining the recognition result of the trajectory information by the trajectory recognition unit as an edit mark for editing a text and/or a figure and/or a comment, to edit a text and/or a figure and/or a comment based on the edit mark.

According to the above feature, the handwriting input/output system of the invention can edit a text or an image (including the one not input by the handwriting input/output system) by handwriting input.

Preferably, the handwriting input/output system of the invention further comprising: an angle measuring unit that at least measures the inclination and the inclination direction of an imaging light axis of the imaging unit in contact with the medium surface when the imaging unit is tilted with reference to a perpendicular line to the medium surface; and an angle change recognition unit that analyzes a predetermined change in the inclination and/or the direction by a grid tilt operation, that is, a motion of tilting the imaging unit with reference to the inclination and the direction measured when the imaging unit becomes in contact with the medium surface, wherein the process instruction unit transmits a predefined process instruction to the information processing unit based on the result of the analysis.

According to the above feature, the handwriting input/output system of the invention can instruct operations by the grid tilt operation of the imaging unit.

It is preferable that the dot pattern arranged with a predetermined angle with reference to the direction of the writing area is formed on the writing area on the medium, and the angle measuring unit and the angle change recognition unit analyze a predetermined change in the inclination direction and/or the inclination of the imaging unit tilted toward the writing area with reference to the direction of the dot pattern read out when the imaging unit became in contact with the writing area surface.

According to the above feature, the handwriting input/output system of the invention can recognize an inclination and a change therein with reference to the direction of the dot pattern, in addition to a change in the angle.

It is preferable that, when the angle change recognition unit recognizes that the imaging unit is tilted to the first predetermined direction with reference to the upward direction of the imaging unit or the writing area by the grid tilt operation, the process instruction unit instructs the information processing unit to execute the first operation, that is, to input the recognition result of trajectory information by the trajectory recognition unit as a text and/or a figure.

According to the above feature, the handwriting input/output system of the invention can switch to the first operation by the grid tilt operation.

It is preferable that, when the angle change recognition unit recognizes that the imaging unit is tilted to the second predetermined direction with reference to the upward direction of the imaging unit or the writing area by the grid tilt operation, the process instruction unit instructs the information processing unit to execute the second operation, that is, to input the recognition result of trajectory information by the trajectory recognition unit as a comment.

According to the above feature, the handwriting input/output system of the invention can switch to the second operation by the grid tilt operation.

It is preferable that, when the angle change recognition unit recognizes that the imaging unit is tilted to the third predetermined direction with reference to the upward direction of the imaging unit or the writing area by the grid tilt operation, the process instruction unit instructs the information processing unit to execute the third operation, that is, by defining the recognition result of trajectory information by the trajectory recognition unit as an edit mark for editing a text and/or a comment, to edit a text and/or a figure and/or a comment based on the edit mark.

According to the above feature, the handwriting input/output system of the invention can switch to the third operation by the grid tilt operation.

It is preferable that, when the angle change recognition unit recognizes that the imaging unit is tilted to the fourth predetermined direction with reference to the upward direction of the imaging unit or the writing area by the grid tilt operation, the process instruction unit instructs the information processing unit to terminate the third operation.

According to the above feature, the handwriting input/output system of the invention can terminate the third operation by the grid tilt operation and switch to the first or second operation or execute the third operation again.

It is preferable that, when the information processing unit determines whether to execute a predetermined process or not and when the dot pattern analysis unit recognizes that the imaging unit touches the medium surface only once during a predetermined time period, the process instruction unit instructs the information processing unit to determine not to execute the predetermined process, and when the dot pattern analysis unit recognizes that the imaging unit touches the medium surface once and touches again during a predetermined time period, the process instruction unit instructs the information processing unit to determine to execute the predetermined process.

According to the above feature, the handwriting input/output system of the invention can instruct determination or refusal of a process only by touching on the medium surface by the imaging unit.

It is preferable that the handwriting input/output system of the invention further comprises: a rotation angle reading unit that reads out a rotation angle between the direction of the dot pattern read out when the imaging unit became in contact with the writing area surface by standing imaging light axis of the imaging unit generally perpendicular to the writing area surface and the angle of the imaging unit; and a rotation angle change recognition unit that, when the imaging light axis is rotated in a predetermined rotation direction by a grid turn operation, that is, a motion that rotates the imaging unit, analyzes a predetermined change in the rotation angle with reference to the rotation angle measured when the imaging unit became in contact with the writing area surface, wherein the process instruction unit transmits a predetermined process instruction to the information processing unit based on the result of the analysis.

According to the above feature, the handwriting input/output system of the invention can make instruction by the grid turn operation.

It is preferable that, when the rotation angle change recognition unit recognizes that the imaging unit is rotated in the first predetermined direction, the process instruction unit instructs the information processing unit to store the change result of the file content of a running application, and when the rotation angle change recognition unit recognizes that the imaging unit is rotated in the second predetermined direction that is the opposite direction to the first predetermined direction, the process instruction unit instructs the information processing unit to cancel the change of the file content of the running application.

According to the above feature, the handwriting input/output system of the invention can make instruction of storing or canceling of the change in the file content by the grid turn operation.

It is preferable that, when the rotation angle change recognition unit recognizes that the imaging unit is rotated in the first predetermined direction and further rotated in the second predetermined direction that is the opposite direction to the first predetermined direction during a predetermined time period, the process instruction unit instructs the information processing unit to start up an application for handwriting input/output, and when the rotation angle change recognition unit recognizes that the imaging unit is rotated in the second predetermined direction and further rotated in the first predetermined direction during a predetermined time period, the process instruction unit instructs the information processing unit to terminate the application for handwriting input/output.

According to the above feature, the handwriting input/output system of the invention can start up/terminate the application for handwriting input/output by the grid turn operation.

It is preferable that the handwriting input/output system of the invention further comprises: a sound recording unit that, after imaging of the writing area by the imaging unit and obtaining of coordinate information and code information by the dot pattern analysis unit, records a sound, instead of tracing or drawing a letter or a character on the writing area by a predetermined operation with the imaging unit; and a sound recognition unit that refers to a predefined sound recognition information table (a dictionary) corresponding to the code information, recognizes the recorded sound, converts it to text information, and transmits the text information to the information processing unit. According to the above feature, the handwriting input/output system of the invention allows sound input instead of handwriting input.

The predetermined operation is preferably performed either by tracing or drawing a symbol signifying a sound input on the writing area using the imaging unit.

According to the above feature, the handwriting input/output system of the invention can easily switch to sound input as the extension of a series of handwriting input operations, and leave the log of starting the sound input in the writing area or the computer.

It is preferable that the predetermined operation is performed by touching the writing area with imaging unit and flicking the imaging unit.

According to the above feature, the handwriting input/output system of the invention can easily switch to sound input by even easier operation, and use the sound input without leaving the log of starting the sound input in the writing area.

The predetermined operation is preferably performed by recording a predetermined word in the sound recording unit and recognizing the predetermined word by the sound recognition unit.

According to the above feature, with the handwriting input/output system of the invention, the operation of starting the sound input can be intuitively performed without remembering cumbersome operations.

It is preferable that instruction information of voice guidance is defined in advance in the code information of the medium, and the handwriting input/output system further comprises a sound output unit that explains a content to be written on the writing area by the voice guidance.

<Handwriting Input Sheet>

The handwriting input sheet of the invention comprises a medium having a writing area on which is formed a dot pattern that repeatedly defines coordinate information and code information at least part of or a plurality of areas of the medium.

According to the above feature, by defining code information as well as coordinate information in the dot pattern formed on the medium, the handwriting input sheet of the invention can collectively input coordinate information and unique information by handwriting input.

It is preferable that the medium is formed by further being superimposed with a text, a graphic, and a photograph relating to the writing area.

According to the above feature, in the handwriting input sheet of the invention, a user can easily recognize the content of the writing area when performing the handwriting input.

It is preferable that the medium is formed by being further superimposed by an icon signifying code information over the dot pattern that repeatedly forms the code information that defines: identification information that identifies a predetermined medium surface and/or the writing area surface; and/or an operation instruction (e.g., starting up a program, inputting a command, inputting and outputting/searching data, specifying searching information).

According to the above feature, with the handwriting input sheet of the invention, a user can further recognize the content of unique information or instruction input based on the code information.

The icon is preferably formed with the dot pattern on a sticker and sticky note that can be attached somewhere, and other medium surfaces.

According to the above feature, the handwriting input sheet of the invention can enhance flexibility of layout on a medium, allowing searching and outputting of information input by handwriting on the writing area to be flexibly executed according to a user's convenience and preference.

The handwriting input sheet preferably further comprises Braille within and/or around the writing area.

According to the above feature, when visually impaired people perform handwriting input, the handwriting input sheet of the invention contributes to maintain input efficiency close to equivalent to physically unimpaired people.

The handwriting input sheet of the invention preferably further comprises a thin convex guide along the external circumference of the writing area so that the imaging unit does not go over the boundary when writing in the writing area.

According to the above feature, when visually impaired people perform handwriting input, the handwriting input sheet of the invention contributes to maintain input efficiency close to equivalent to physically unimpaired people by providing a guide for accurate tracing or drawing within the writing area.

<Information Input System>

The information input system of the invention comprising: an information input assistance sheet, that is, a grid sheet, laminated with: an infrared reflection layer that reflects infrared rays yet transmits visible light coming from one side; a dot pattern layer that is provided on the one side of the infrared reflection layer and made of material having a characteristic of diffusely reflecting infrared rays, and arranged with the dots of a dot pattern that repeatedly defines coordinate information and/or code information in at least part of or a plurality of areas; and a protection layer that is provided on a side of the dot pattern layer opposite to the infrared reflection layer and has a characteristic of transmitting infrared rays and visible light, a medium at least part of which surface is formed with the dots of the dot pattern with material having a characteristic of absorbing infrared rays; an imaging unit that images the dot pattern and transmits image data; a dot pattern analysis unit that determines by a predetermined determination method a dot portion imaged with lower brightness than surrounding area in image data of the dot pattern of the medium surface imaged and transmitted by the imaging unit or a dot portion imaged with higher brightness than surrounding area in image data of the dot pattern of the grid sheet imaged and transmitted by the imaging unit, stores the image data of the dot pattern into the storage element, and analyzes the code of the image data to input the coordinate information and/or code information.

According to the above feature, the information input system of the invention can avoid the eyeball phenomenon without providing a diffuse reflection layer on the grid sheet.

It is preferable that the predetermined determination method comprises: a method of sequentially calculating a difference ($+\Delta BL=BL(i, j+k)-BL(i, j)$) of brightness ($BL(i, j)$) of a captured image that is stored in a storage element and has m rows and n columns of pixels between pixels that are apart at a predetermined interval (k) beginning from a left end shifting in a rightward direction for each row (i) to determine whether the difference exceeds or falls below a predetermined positive/negative threshold; for determining a dot portion imaged with lower brightness than surrounding area, a method of determining a pixel on right side as a dot when a difference in the brightness falls below a negative threshold and that the dot starts from the pixel, and a pixel on right side not as a dot when a difference in the brightness exceeds a positive threshold and that the dot ends before the pixel; and for determining a dot portion imaged with higher brightness than surrounding area, a method of determining a pixel on right side as a dot when a difference in the brightness exceeds a positive threshold and that the dot starts from the pixel, and a pixel on right side not as a dot when a difference in the brightness falls below a negative threshold and that the dot ends before the pixel, wherein the dot pattern analysis unit determines by the predetermined determination method whether the dot pattern is the one provided on the medium surface or on the grid sheet and analyzes a code by the predetermined determination method.

It is preferable that the predetermined determination method measures brightness of a predetermined area of the captured image, then, if the brightness exceeds a predetermined threshold, a determination method for a dot portion imaged with lower brightness than surrounding area is used, and if the brightness falls below a predetermined threshold, a determination method for a dot portion imaged with higher brightness than surrounding area is used.

<Information Input Assistance Sheet>

The information input assistance sheet of the invention is laminated with: an infrared reflection layer that reflects infrared rays yet transmits visible light coming from one side; a dot pattern layer that is provided on the one side of the infrared reflection layer and made of material having a characteristic of diffusely reflecting infrared rays, and arranged with dots of a dot pattern that defines coordinate information and/or code information in at least part of or a plurality of areas; and a protection layer that is provided on the side of the dot pattern layer opposite to the infrared reflection layer and has a characteristic of transmitting infrared rays and visible light.

According to the above feature, the information input assistance sheet of the invention can avoid the eyeball phenomenon without providing a diffuse reflection layer thereon.

The information input assistance sheet of the invention is laminated with: an infrared reflection layer that reflects infrared rays coming from both sides and transmits visible light; dot pattern layers that are provided on both sides of the infrared reflection layer, made of material having a characteristic of absorbing infrared rays, and arranged with dots of the dot pattern; and protection layers that are provided on further outer sides of the dot pattern layers and have a characteristic of transmitting infrared rays and visible light coming from both directions, wherein coordinate information and/or code information that is made into a pattern in the dot pattern and arranged on each of the dot pattern layers is identical or different from each other.

According to the above feature, the information input assistance sheet of the invention can avoid the eyeball phenomenon without providing a diffuse reflection layer thereon.

It is preferable that, in the handwriting input/output system of the invention, the writing area is of an arbitrary shape.

Conventionally, to identify a writing area using only coordinate information, the coordinates indicating the boundary of the writing area should be defined in advance using a table or a function, and each input coordinate value should be determined whether it is within the scope of the table or the function. As the result, the analysis becomes complicated and to identify the writing area using only coordinate information, the writing area has to be of a generally rectangle shape to maintain analysis efficiency of used memory and calculation speed. Using code information to identify the writing area, the present invention can exhibit similar analysis efficiency whatever the shape of the writing area may be.

In the handwriting input/output system and the handwriting input sheet of the invention, it is preferable that the medium comprises: a writing area formed with a dot pattern in which a plurality of reference points are provided so as to form the size and direction of a block within the area of the block for arranging an information dot, a plurality of virtual reference points that are defined with reference to the reference points are arranged, the information dot that defines coordinate information or coordinate information and code information by a distance and direction from the virtual reference point is arranged, the coordinate information or the coordinate information and code information is repeatedly defined at least part of or a plurality of areas in a predetermined combination of arrangement directions of the information dot among a plurality of combinations of arrangement directions of the information dot with reference to the plurality of virtual reference points, and the dot pattern analysis unit determines the writing area based on the predetermined combination of arrangement directions of the information dot and processes handwriting input.

According to the above feature, when inputting by handwriting, without operation to a button separately provided to the handwriting input/output system or reading a dot pattern that defines a predetermined operation direction of handwriting input by the imaging unit, the writing area is determined only by analyzing the code of a predetermined combination of arrangement directions of the information dot by the dot pattern analysis unit and, if it is a writing area, the process of handwriting input is executed. If it is not a writing area, information output and/or instruction process that is associated to the code information and/or coordinate information is executed.

In the handwriting input/output system and handwriting input sheet of the invention, it is preferable that the predetermined combination of arrangement directions of the information dot is a predetermined combination of arrangement directions of the information dot among combinations of arrangement directions where the information dot is arranged in any one of upward, downward, leftward, rightward directions and diagonal directions from each of the plurality of virtual reference points.

According to the above feature, as the arrangement direction of the information dot is restricted to upward, downward, leftward, rightward, and diagonal directions, the dot pattern analysis unit can accurately recognize the predetermined combination of arrangement directions of the information dot, then, determine whether or not the target is a writing area, and, if it is a writing area, performs a process of handwriting input. If it is not a writing area, information output and/or instruction process that is associated to the code information and/or coordinate information is executed.

It is preferable that the code information defines a writing flag indicating that there is a writing area, and the dot pattern analysis unit processes handwriting input by identifying that there is the writing area based on the writing flag.

According to the above feature, when the imaging unit reads out the dot pattern formed on the medium surface, the dot pattern analysis unit immediately determines whether or not the target area is a writing area, and, if it is a writing area, performs a process of handwriting input. If it is not a writing area, information output and/or instruction process that is associated to the code information and/or coordinate information is executed.

It is preferable that the code information defines identification information that identifies the writing area and/or an operation instruction meaning a writing process, and the dot pattern analysis unit processes handwriting input/output by identifying the identification information and/or the operation instruction.

According to the above feature, when the imaging unit reads out the dot pattern formed on the medium surface, the imaging unit can immediately identify which writing area is to be written in. If a content to be input by handwriting in this writing area belongs to a predetermined category, the recognition rate significantly increases by referring to the dictionary of that category. Further, appropriate process can be performed by determining how to process the written content.

It is preferable that the trajectory information comprises: coordinate information of the center of the imaging area of the imaging unit, or coordinate information of a position where the projection for instruction or the pen tip provided near the imaging unit is in contact with the writing area surface; and the code information, and the dot pattern analysis unit calculates the trajectory information by interpolation based on the coordinate information defined in the dot pattern.

According to the above feature, in the coordinate information defined by the dot pattern, as one unit increments for each block that defines one pair of XY coordinate values, a predetermined precision of smaller than one unit required for accurately reproducing trajectory information can be calculated by interpolation based on the coordinate information. For example, if the size of a block is 2 mm, XY coordinate values may be calculated with the precision of approximately 0.1-0.2 mm, tenth to twentieth of 2 mm, to recognize trajectory information for accurately reproducing a letter or a character.

Advantageous Effect of the Invention

Having the above-described variety of features, the present invention can provide a handwriting input/output system that can provide users new and diversified additional values and convenience, which is a new level of technique absolutely different from conventional techniques.

BRIEF DESCRIPTION OF THE DRAWINGS

FIGS. 12A to 12C are diagrams illustrating a dot pattern used for the handwriting input/output system of the invention (5).

FIGS. 13A to 13D are diagrams illustrating a dot pattern used for the handwriting input/output system of the invention (6).

FIGS. 14A to 14C are diagrams illustrating a direction dot used for the handwriting input/output system of the invention.

FIGS. 15A and 15D are diagrams illustrating a dot pattern used for the handwriting input/output system of the invention (7).

FIG. 18 is a diagram illustrating the function of the imaging unit used for the handwriting input/output system of the invention (2).

FIGS. 40A and 40B are diagrams illustrating the function of the medium on which is formed the writing area used for the handwriting input/output system of the invention (12).

FIG. 44 is a diagram illustrating the method for calculating the direction and angle of the inclination of the imaging unit used for the handwriting input/output system of the invention (2).

FIG. 46 is a diagram illustrating the method for calculating the direction and angle of the inclination of the imaging unit used for the handwriting input/output system of the invention (4).

FIGS. 48A to 48E are diagrams illustrating a method of determining the touching motion and flicking motion of the imaging unit used for the handwriting input/output system of the invention.

FIG. 50 is a diagram illustrating the second operation in the handwriting input/output system of the invention (1).

FIG. 53 is a diagram illustrating the third operation in the handwriting input/output system of the invention (1).

FIG. 54 is a diagram illustrating the third operation in the handwriting input/output system of the invention (2).

FIGS. 71A to 71G are diagrams illustrating the grid sheet that is an embodiment of the medium used for the handwriting input/output system of the invention (4).

FIGS. 79A and 79B are diagrams illustrating a dot pattern used for the handwriting input/output system of the invention (7).

BRIEF DESCRIPTION OF THE DRAWINGS

The following describes embodiments of the present invention with reference to the drawings:

<Description of the Configuration of the Entire System>

Figure 1:
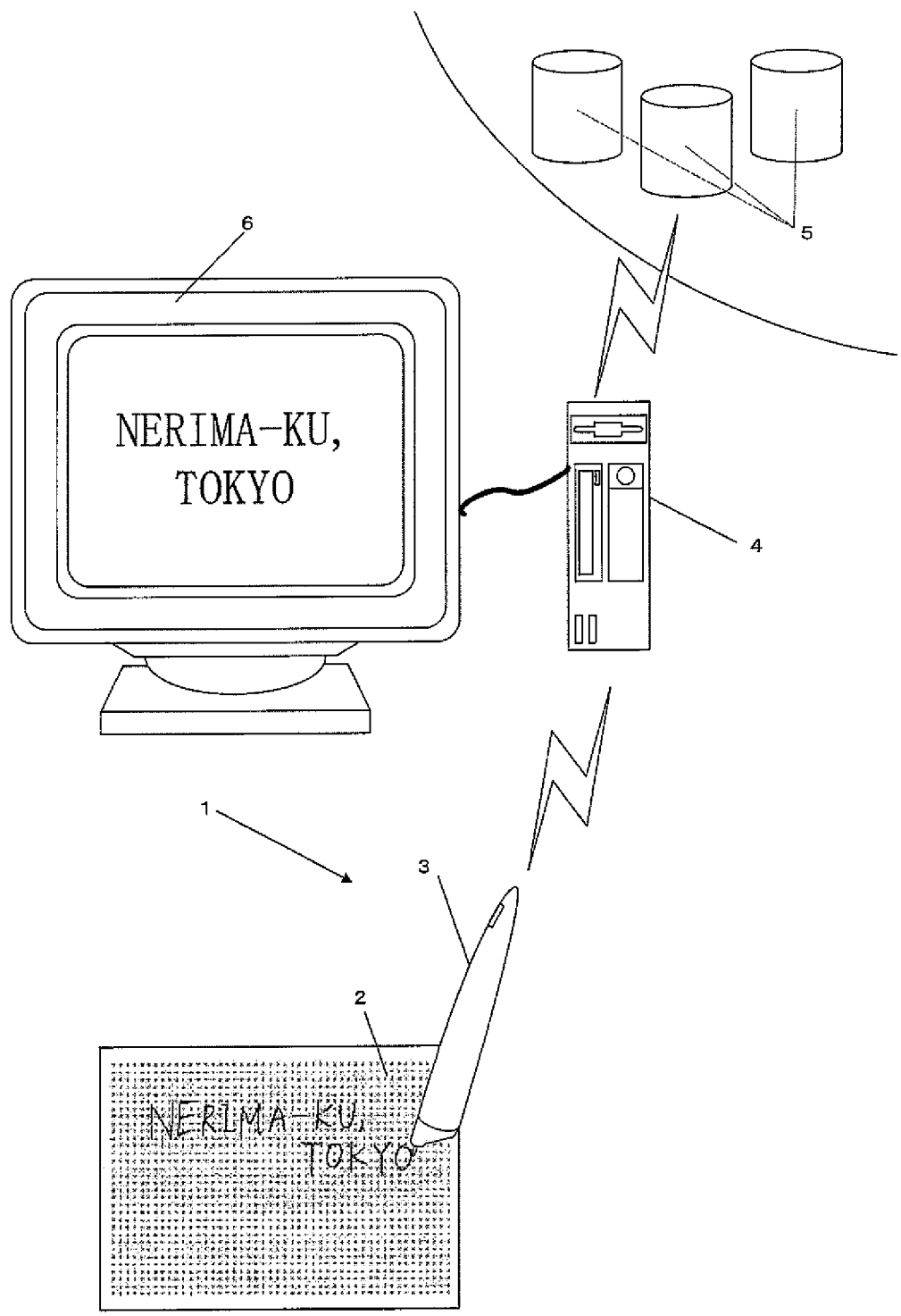
FIG. 1 is an external view showing a use situation of the handwriting input/output system of the invention.

FIG. 1 is an external view showing an example of a use situation of handwriting input/output system 1 of the invention. According to FIG. 1, if scanner 3 is used to write on medium 2, a text just as being written is displayed on display 6. This is realized by imaging a dot pattern on the written trajectory by scanner 3 and analyzing the image data by computer 4 (and accessing server 5 if necessary). However, computer 4 may be embedded in scanner 3.

Figure 2:
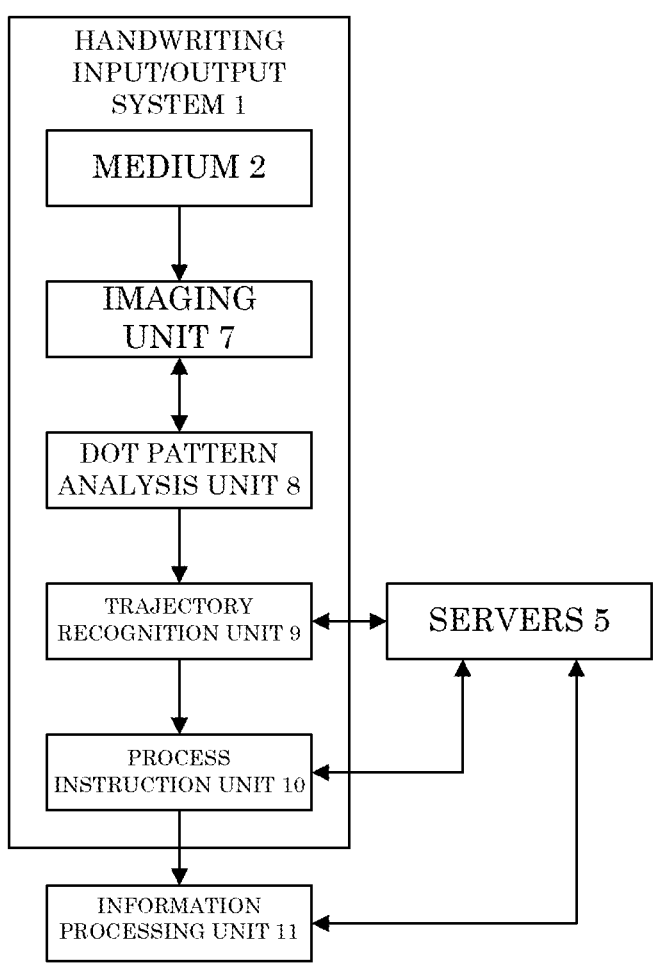
FIG. 2 is a block diagram showing the configuration of the first embodiment of the handwriting input/output system of the invention.

FIG. 2 is a block diagram showing the configuration of the first embodiment of handwriting input/output system 1 of the invention.

This handwriting input/output system 1 at least comprises: medium 2 (handwriting input sheet), imaging unit 7 (imaging means), dot pattern analysis unit 8 (dot pattern analysis means), trajectory recognition unit 9 (trajectory recognition means), and process instruction unit 10 (process instruction means) to perform a variety of instructions to information processing unit 11 and access variety of servers 5 if necessary.

Figure 3:
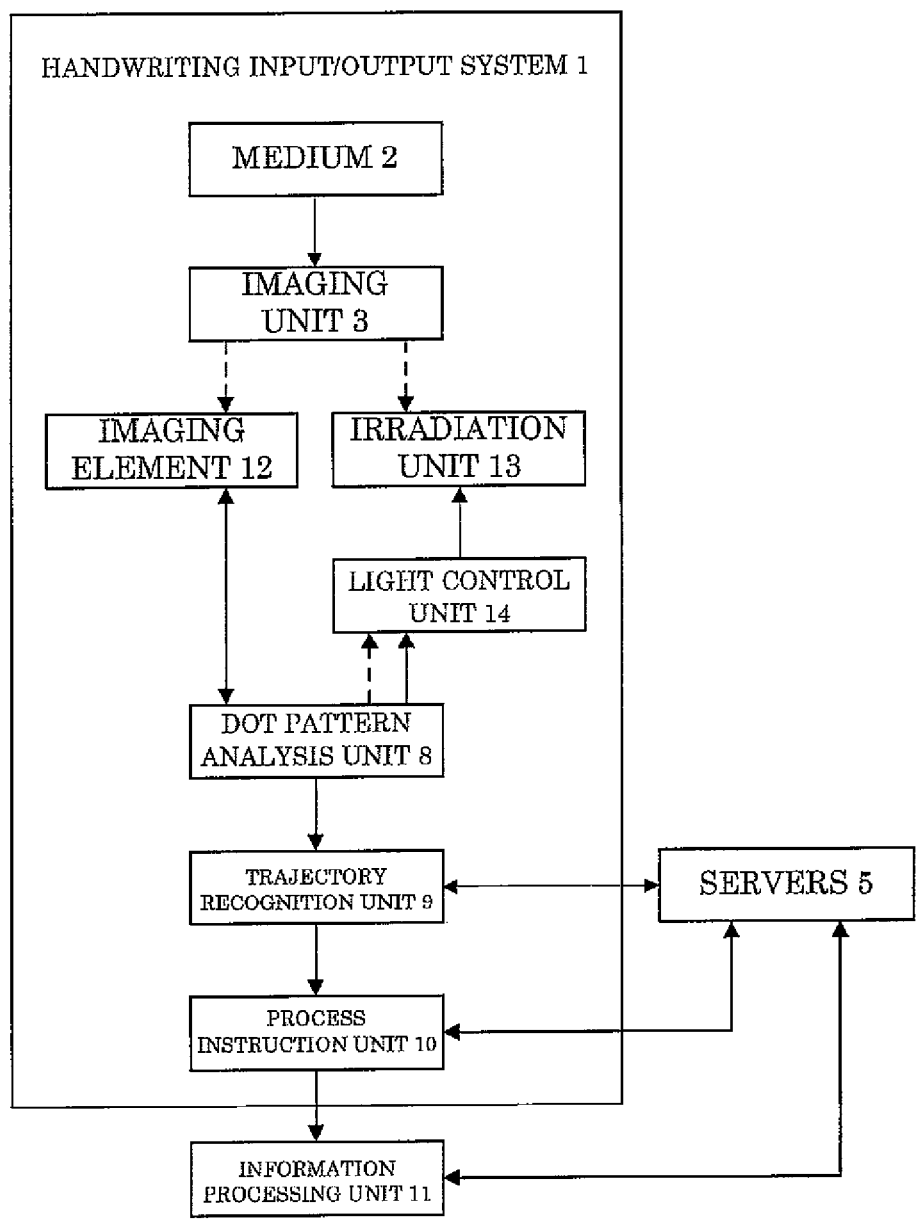
FIG. 3 is a block diagram showing the configuration of the second embodiment of the handwriting input/output system of the invention.

FIG. 3 is a block diagram showing the configuration of the second embodiment of handwriting input/output system 1 of the invention. The second embodiment further comprises imaging element 12, irradiation unit 13, and light control unit 14 in addition to the configuration that the first embodiment comprises.

Here, as shown by dashed lines in FIG. 3, imaging element 12 and irradiation unit 13 are integrated in imaging unit 7, and light control unit 14 is integrated in dot pattern analysis unit 8.

Figure 4:
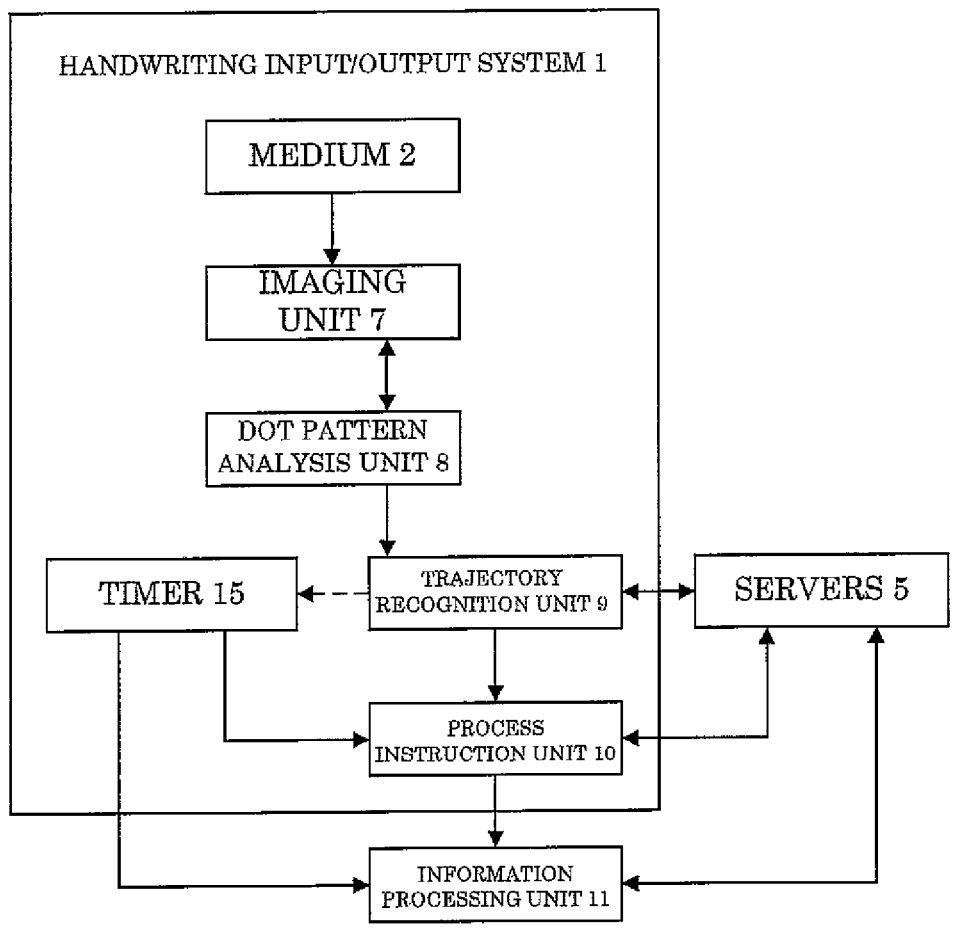
FIG. 4 is a block diagram showing the configuration of the third embodiment of the handwriting input/output system of the invention.

FIG. 4 is a block diagram showing the configuration of the third embodiment of handwriting input/output system 1 of the invention. The third embodiment further comprises timer 15 in addition to the configuration that the first embodiment comprises.

Here, as shown by a dashed line in FIG. 4, timer 15 is integrated in trajectory recognition unit 9.

Figure 5:
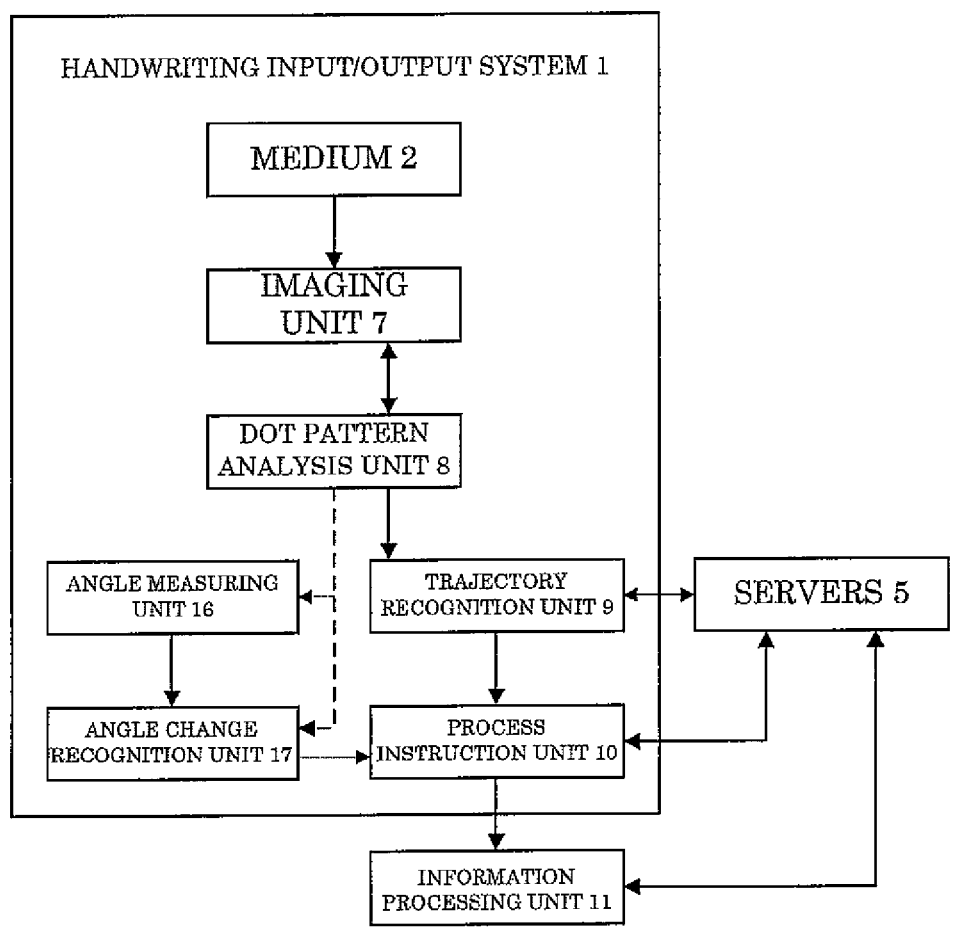
FIG. 5 is a block diagram showing the configuration of the fourth embodiment of the handwriting input/output system of the invention.

FIG. 5 is a block diagram showing the configuration of the fourth embodiment of handwriting input/output system 1 of the invention. The fourth embodiment further comprises angle measuring unit 16 and angle change recognition unit 17 in addition to the configuration that the first embodiment comprises.

Here, as shown by dashed lines in FIG. 5, angle measuring unit 16 and angle change recognition unit 17 are integrated in dot pattern analysis unit 8.

Figure 6:
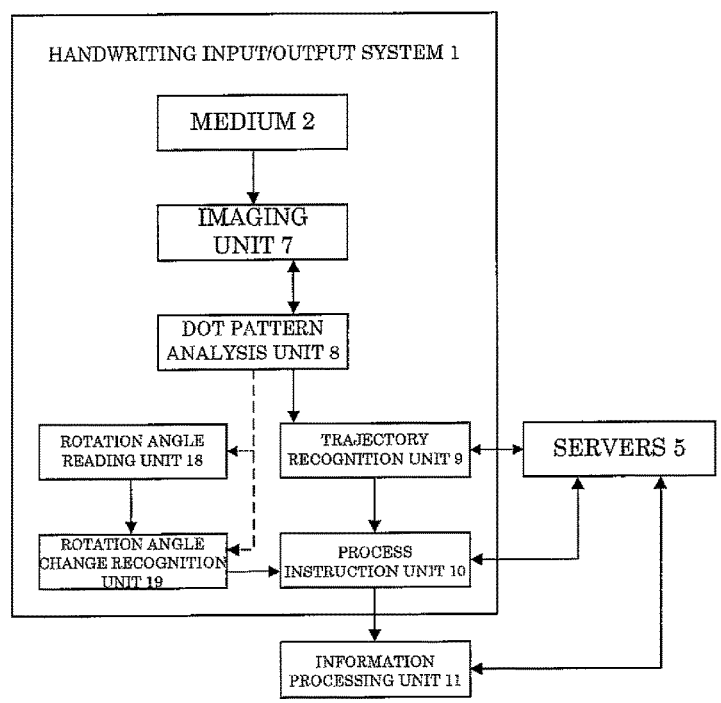
FIG. 6 is a block diagram showing the configuration of the fifth embodiment of the handwriting input/output system of the invention.

FIG. 6 is a block diagram showing the configuration of the fifth embodiment of handwriting input/output system 1 of the invention. The fifth embodiment further comprises rotation angle reading unit 18, rotation angle change recognition unit 19 in addition to the configuration that the first embodiment comprises.

Here, as shown by dashed lines in FIG. 6, rotation angle reading unit 18 and rotation angle change recognition unit 19 are integrated in dot pattern analysis unit 8.

Figure 7:
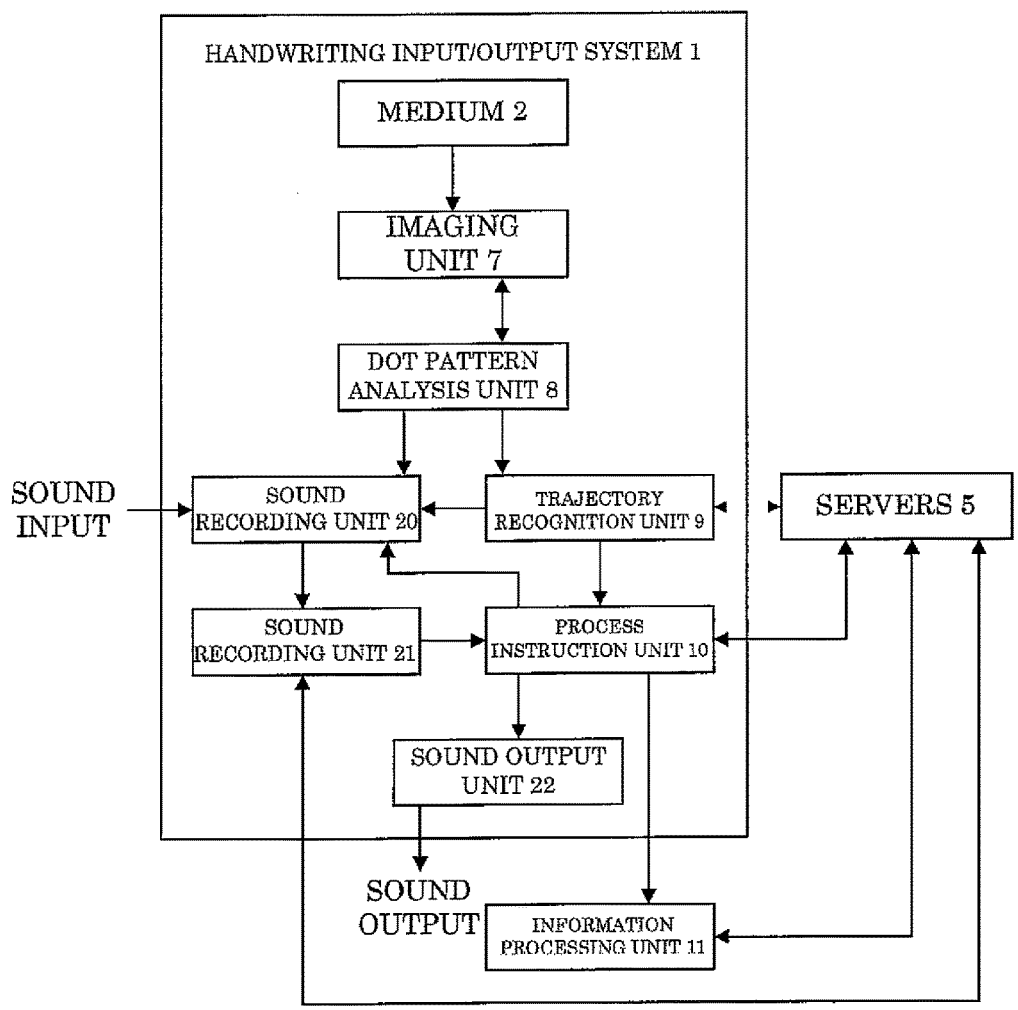
FIG. 7 is a block diagram showing the configuration of the sixth embodiment of the handwriting input/output system of the invention.

FIG. 7 is a block diagram showing the configuration of the sixth embodiment of the handwriting input/output system of the invention. The sixth embodiment further comprises sound recording unit 20, sound recognition unit 21, and sound output unit 22 in addition to the configuration that the first embodiment comprises.

<Dot Pattern>

The following describes the dot pattern used in handwriting input/output system 1 of the invention with reference to FIGS. 8 to 15D.

<Description of Dot Pattern; GRID1>

FIGS. 8 to 15D are diagrams illustrating an example of a dot pattern formed on medium 2, that is, GRID1, in handwriting input/output system 1 of the invention It should be noted that in FIGS. 8 to 15D, the grid lines in horizontal and vertical directions are added for convenience of explanation, and do not exist in actual printing surface. It is desirable that when scanner 3 as imaging means has an infrared irradiation unit, the dot pattern 101 constituents, such as key dot 102, information dot 103, and reference grid point dot 104, are printed with invisible ink which absorbs the infrared light or with carbon ink.

Figure 8:
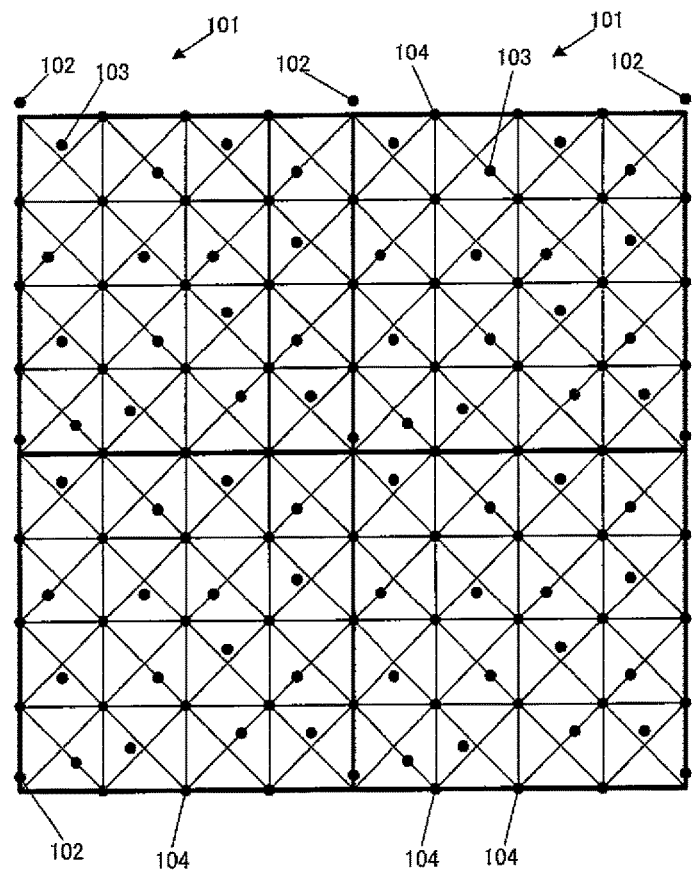
FIG. 8 is a diagram illustrating a dot pattern used for the handwriting input/output system of the invention (1).
Figure 9:
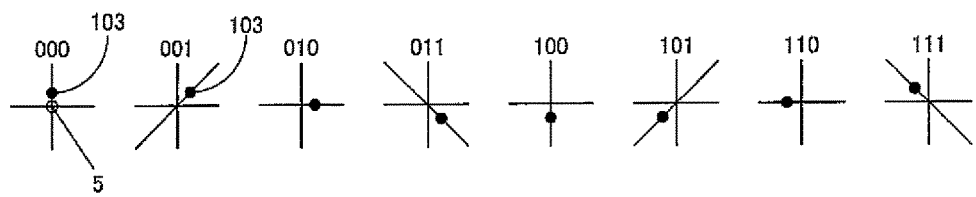
FIGS. 9A and 9B are diagrams illustrating a dot pattern used for the handwriting input/output system of the invention (2).
Figure 9:
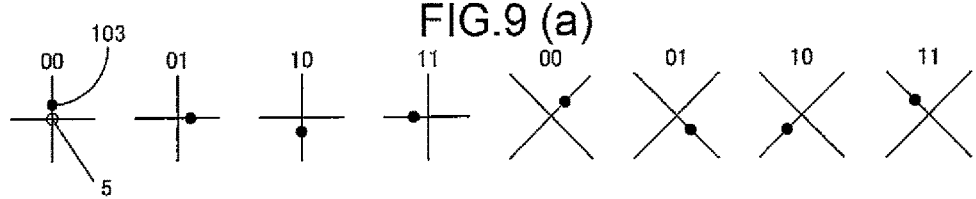

FIG. 8 is an enlarged view showing an example of an information dot of dot pattern 101 and the bit expression of data defined therein. FIGS. 9A and 9B are explanatory views showing information dot 103 arranged around key dot 102.

The information input/output method using the dot pattern comprises a unit for generating dot pattern 101, a unit for recognizing dot pattern 101, and a unit for outputting information and a program from this dot pattern 101. That is, after retrieving dot pattern 101 as image data by imaging unit 7 embedded in scanner 3, first, the method extracts reference grid point dot 104, next, extracts key dot 102 based on the fact that there is no dot at the location where reference grid point dot 104 is supposed to be, extracts information dot 103, and digitizes information dot 103 to extract the information region and convert the information into numerical values. Based on the numerical information, information and a program are output from this dot pattern 101. For example, information, such as a sound and a program, is output, from this dot pattern 101, to an information output device, personal computer, PDA, mobile telephone, or the like.

To generate dot pattern 101, based on a dot code generation algorithm, fine dots used for recognition of numerical information including key dot 102, information dot 103, and reference grid point dot 104 are arranged according to a predetermined rule. As shown in FIG. 7, in a block of dot pattern 101 that represents information, 5×5-reference grid point dots 104 are arranged with reference to key dot 102, and information dot 103 is arranged around virtual grid point 105 that is surrounded by four reference grid point dots 104. Arbitrary numerical information is defined in this block. The example illustrated in FIG. 8 shows four blocks of dot patterns 101 arranged in parallel (in bold frame), provided, however, that dot pattern 101 is not limited to four blocks and may be repeatedly arranged many times in upper, lower, leftward, and rightward directions.

When imaging unit 7 retrieves this dot pattern 101 as image data, the reference grid point dots 104 can correct a distortion of the lens of imaging unit 7, skewed imaging, expansion and contraction of a paper surface, curvature of a medium surface, and distortion during printing. Specifically, a function for calibration (Xn, Yn)=f(Xn', Yn') is calculated to convert distorted four reference grid point dots 104 into the original square, then the vector of correct information dot 103 is obtained by calibrating information dot 103 by the same function.

If reference grid point dots 104 are arranged in dot pattern 101, since the image data of this dot pattern 101 retrieved by imaging unit 7 is calibrated its distortion attributable to imaging unit 7, image data of dot pattern 101 can be recognized accurately even though retrieved by a popular camera with a lens with high distortion rate. Moreover, dot pattern 101 can be accurately recognized even when dot pattern 101 is read by imaging unit 7 inclined with reference to the surface of dot pattern 101.

Key dots 102 are dots, as shown in FIG. 8, arranged by shifting four reference grid point dots 104 which are disposed at four corners of a block in certain directions. Key dot 102 is a representative point of one block of dot pattern 101 that represents information dot 103. For example, key dots 102 are the dots being shifted reference grid point dots 104 disposed at four corners of a block of dot pattern 101 upward by 20% of a gap between neighbouring reference grid point dots 104 (if a distance between reference grid point dots is 0.5 mm, by 0.1 mm). However, these numbers are not limited to these, and may vary depending on the size of the block of dot pattern 101.

Information dots 103 are dots used for recognition of a variety of information. Information dot 103 is arranged around key dot 102 as a representative point and also disposed at the ending point of a vector with the starting point of virtual grid point 5 at the center surrounded by four reference grid point dots 104. For example, this information dot 103 is surrounded by four reference grid point dots 104. As shown in FIG. 9A, since dots away from the virtual grid point 5 by 20% of a gap between neighbouring reference grid point dots 104 (if a distance between reference grid point dots is 0.5 mm, by 0.1 mm) have direction and length as expressed by vectors, the dots can express three bits by being disposed in eight directions by shifting by 45 degrees in a clockwise direction. Therefore, one block of dot pattern 101 may express 3 bits×16=201 bits.

FIG. 9B is a method of defining information dot 103 having two bits for each grid, in the dot pattern of FIG. 3.

Two-bit information is each defined by shifting a dot in + direction and x direction. In this way, although 201-bit information can be indeed defined, data may be allocated to each 32 bits by dividing for an intended purpose. Maximum of $2^{16}$ (approx. 65,000) dot pattern formats can be realized depending on the combination of + direction and x direction.

It will be appreciated that the dot pattern format is not limited to this, and may vary including a possibility of four-bit expression by arranging the dots in 16 directions.

Preferably, when imaging the dot pattern by moving scanner 3 as imaging means close to the medium surface or by touching the medium surface with scanner 3, the dot diameter of key dot 102, information dot 103, or reference grid point dot 104 is approximately 6-16% of a distance between neighbouring reference grid point dots 104 (if a gap between reference grid point dots is 0.5 mm, 0.03-0.08 mm) in consideration of visual quality, printing accuracy in respect of a paper quality, resolution of imaging unit 7, and optimal digitalization. However, it will be appreciated that the dot pattern is required to be formed so a predetermined dot pattern as to be imaged within the imaging area, and the arrangement size of one block of a dot pattern and the diameter of the dot are defined appropriately, according to the size of the imaging opening of scanner 3. Moreover, in consideration of information amount required for an imaging area and possible false recognition of dots 102, 103, 104, a distance between reference grid point dots 104 is preferably around 0.3-0.5 mm in both vertical and horizontal directions. Displacement of key dot 102 is preferably around 20-25% the grid distance, taking into account the possible false recognition with reference grid point dot 104 and information dot 103.

On the other hand, it will be appreciated that, when a non-contact scanner or an embedded camera of a mobile telephone, not shown, are used as imaging means to image a dot pattern by keeping them apart from a medium surface by a predetermined distance, the dot pattern should be formed so a predetermined dot pattern as to be imaged within the imaging area, and the arrangement size of one block of the dot pattern and the diameter of the dot are defined appropriately.

A distance between this information dot 103 and a virtual grid point surrounded by four reference grid point dots 104 is preferably the distance of around 15-30% the gap between neighbouring virtual grid points 5. If the gap between information dot 103 and virtual grid point 5 is shorter than this distance, the dots are easily recognized as a big cluster, and are ugly as dot pattern 101. On the other hand, if the gap between information dot 103 and virtual grid point 5 is wider than this distance, the judgment of which one of adjacent virtual grid points 5 is the center of the vector of information dot 103.

As shown in FIG. 8, one dot pattern is a dot pattern comprising 4×4 block regions. Two-bit information dot 103 is arranged in each block. FIGS. 9A and 9B show an example of the dot code format of this information dot 103.

Figures 10, 11:
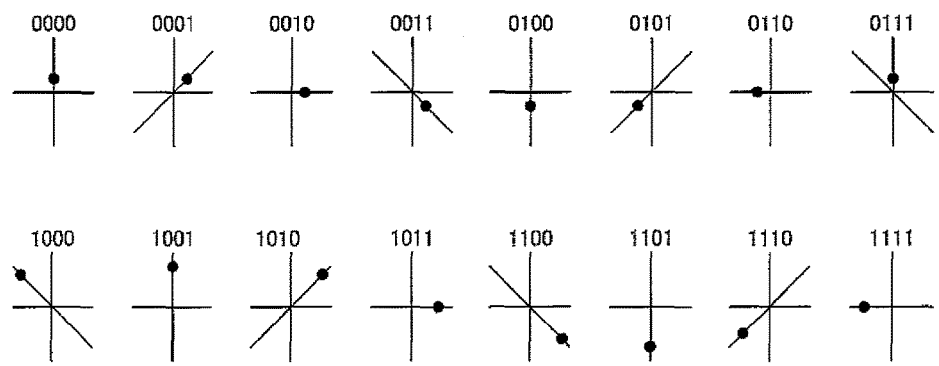
FIG. 10 is a diagram illustrating a dot pattern used for the handwriting input/output system of the invention (3).
FIG. 11 is a diagram illustrating a dot pattern used for the handwriting input/output system of the invention (4).
Figure 16:
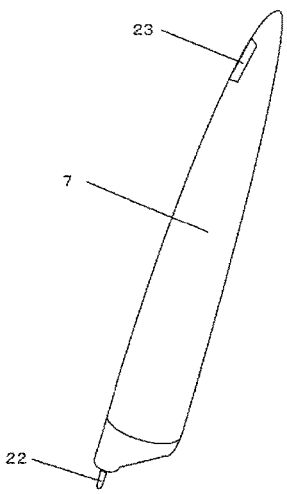
FIGS. 16A to 16D are external views showing the entire configuration of the imaging unit used for the handwriting input/output system of the invention.
Figure 16:
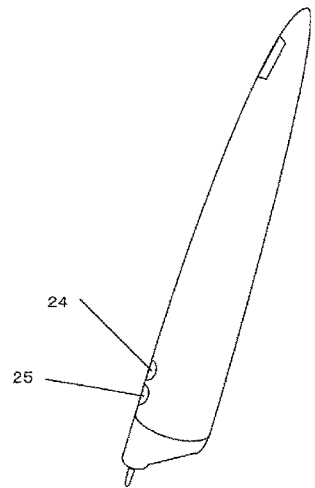
Figure 16:
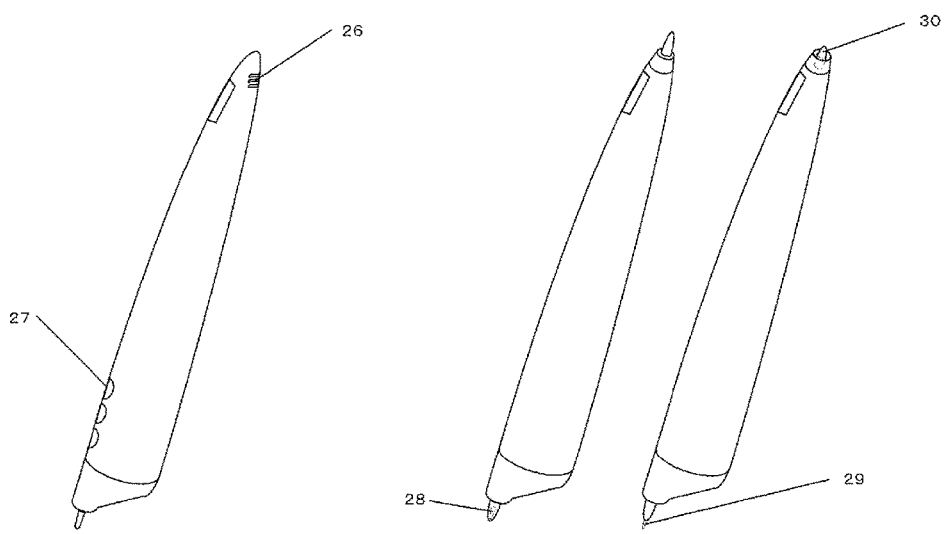
Figure 17:
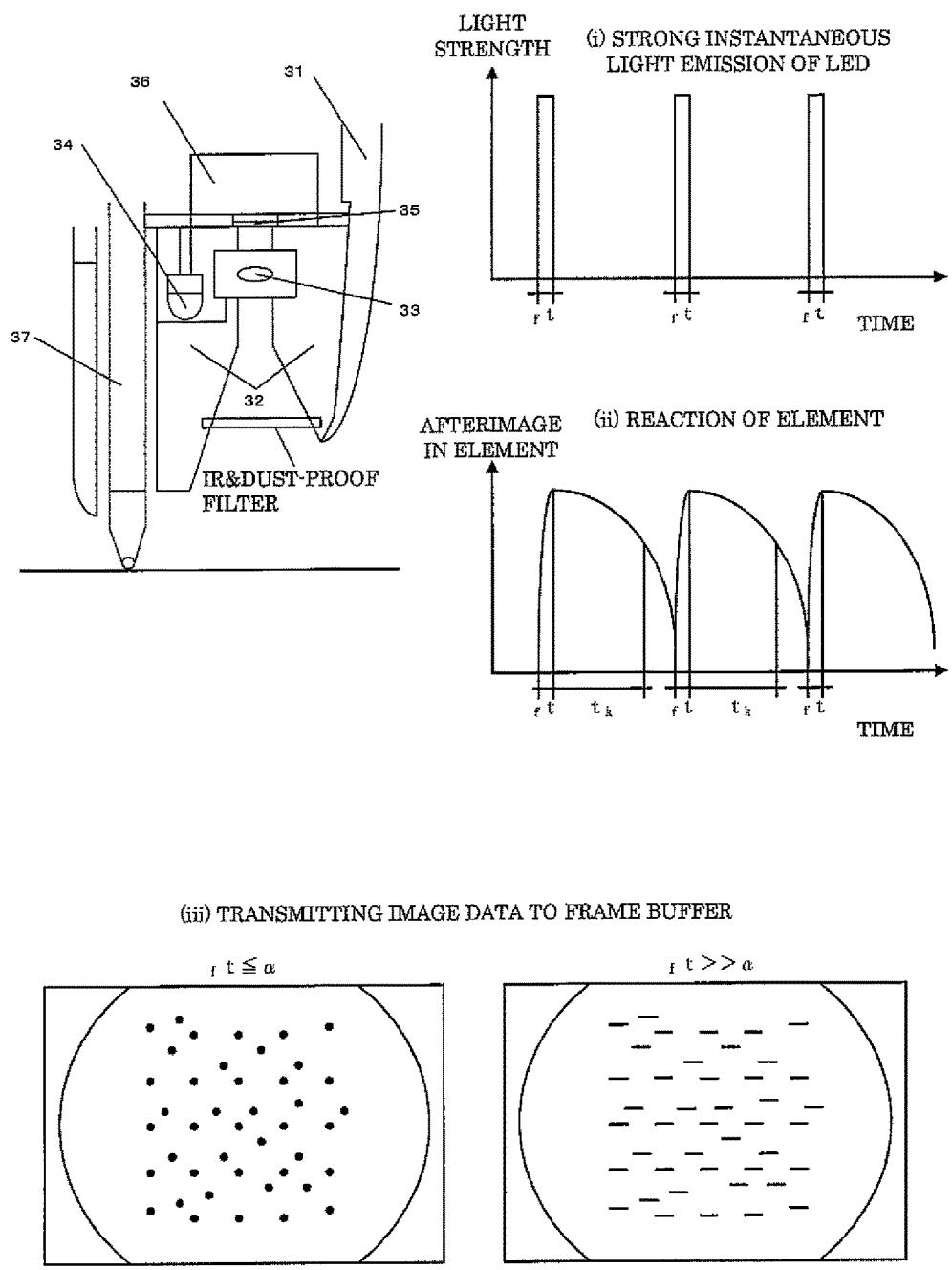
FIG. 17 is a diagram illustrating the function of the imaging unit used for the handwriting input/output system of the invention (1).

As shown in FIG. 10, one dot pattern stores a parity check, a code value, an X coordinate, and a Y coordinate. It should be noted that the details of the format will be described later.

FIG. 11 is an example of information dot 103 and bit expression of data defined therein, showing another embodiment.

If two types of information dots 103, long and short distances from virtual grid point 5 surrounded by reference grid point dots 104, are used, and vector directions are eight directions, four bits can be expressed. Here, the long distance one of information dots 103 is preferably about 25-30% the gap between neighbouring virtual grid points 5. The short distance one of information dots 103 is preferably about 15-20% the gap between neighbouring virtual grid points 5. However, a distance between the centers of long and short information dots 103 is preferably longer than the diameter of these dots.

The number of information dot 103 surrounded by four reference grid point dots 104 is preferably one dot, taking into account the visual quality. However, if visual quality is disregarded and information amount should be increased, voluminous information can be included by allocating one bit to one vector and expressing information dot 103 using a plurality of dots. For example, in eight direction concentric vectors, information dot 103 surrounded by four grid dots 4 can express $2^8$ pieces of information, and thus, 16 information dots in one block accounts for $2^{128}$.

FIGS. 12A to 12C are examples of information dots and bit expression of data defined therein. FIG. 12A is a diagram of disposing two dots, FIG. 12B is a diagram of disposing four dots, and FIG. 12C is a diagram of disposing five dots.

FIGS. 13A to 13D are variants of dot pattern 101. FIG. 13A is a schematic view of six-information dot arrangement, FIG. 13B is a schematic view of nine-information dot arrangement, FIG. 13C is a schematic view of 12-information dot arrangement, and FIG. 13D is a schematic view of 1036-information dot arrangement.

Dot pattern 101 shown in FIG. 8 illustrates an example in which 16 (4×4) information dots 103 are arranged in one block. However, this information dot 103 is not limited to 16-dot arrangement, and may vary in many ways. For example, depending on the size of required information amount and the resolution of imaging unit 7, six information dots 103 (2×3) may be arranged in one block (FIG. 13A), nine information dots 103 (3×3) may be arranged in one block (FIG. 13B), 12 information dots 103 (3×4) may be arranged in one block (FIG. 13C), or 36 information dots 103 may be arranged in one block (FIG. 13D).

<Description of Dot Pattern; Direction Dot>

Next, another embodiment of the dot pattern, direction dot, is described with reference to FIGS. 14A to 14C.

This dot pattern defines the direction thereof by the shape of the block. Reference points 201a to 201e are first arranged in FIG. 14A. The shape indicating the orientation of the block is defined by lines connecting reference points 201a-201e (in this case, a pentagon facing upward). Then, based on these reference points, virtual reference points 201f, 201g, 201h are arranged, and information dot 203 is arranged at the end point of a vector having a direction and length with this virtual reference point as the starting point. In this way, in FIG. 14A to FIG. 14C, the orientation of the block is defined by the way that reference points are arranged. In addition, the direction dot that defines the orientation of the block also defines the size of the entire block. It will be appreciated that this block may be repeatedly arranged in upper, lower, leftward, and rightward directions.

It should be noted that, while reference points 201a-201e and information dot 203 are described as being of the same shapes in FIG. 14A, the shapes of reference points 201a-201e may be larger than information dot 203. Further, these reference points 201a-201e and information dot 203 may be of any shape, as long as they are identifiable, including a triangle, a rectangular, or other polygons.

In FIG. 14B, information is defined by whether or not there is an information dot on the virtual grid point of a block.

FIG. 14C shows that each two blocks shown in FIG. 14A are connected in parallel in horizontal and vertical directions.

In handwriting input/output system 1 of the invention, the dot pattern formed on medium 2 is not limited to GRID1 as long as the dot pattern defines XY coordinate information and code information.

For example, there can be used Japanese Patent No. 3766678 (GRID2), Japanese Patent No. 3858051 (GRID3), Japanese Patent No. 3858052 (GRID4), and Japanese Patent Application No. 2009-165163 (Stream dot pattern).

<Description of Dot Pattern Format>

FIGS. 15A to 15D are diagrams illustrating the format of a dot pattern formed on medium 2 in handwriting input/output system 1 of the invention.

Figures 15A, 15B, 15C, 15D:
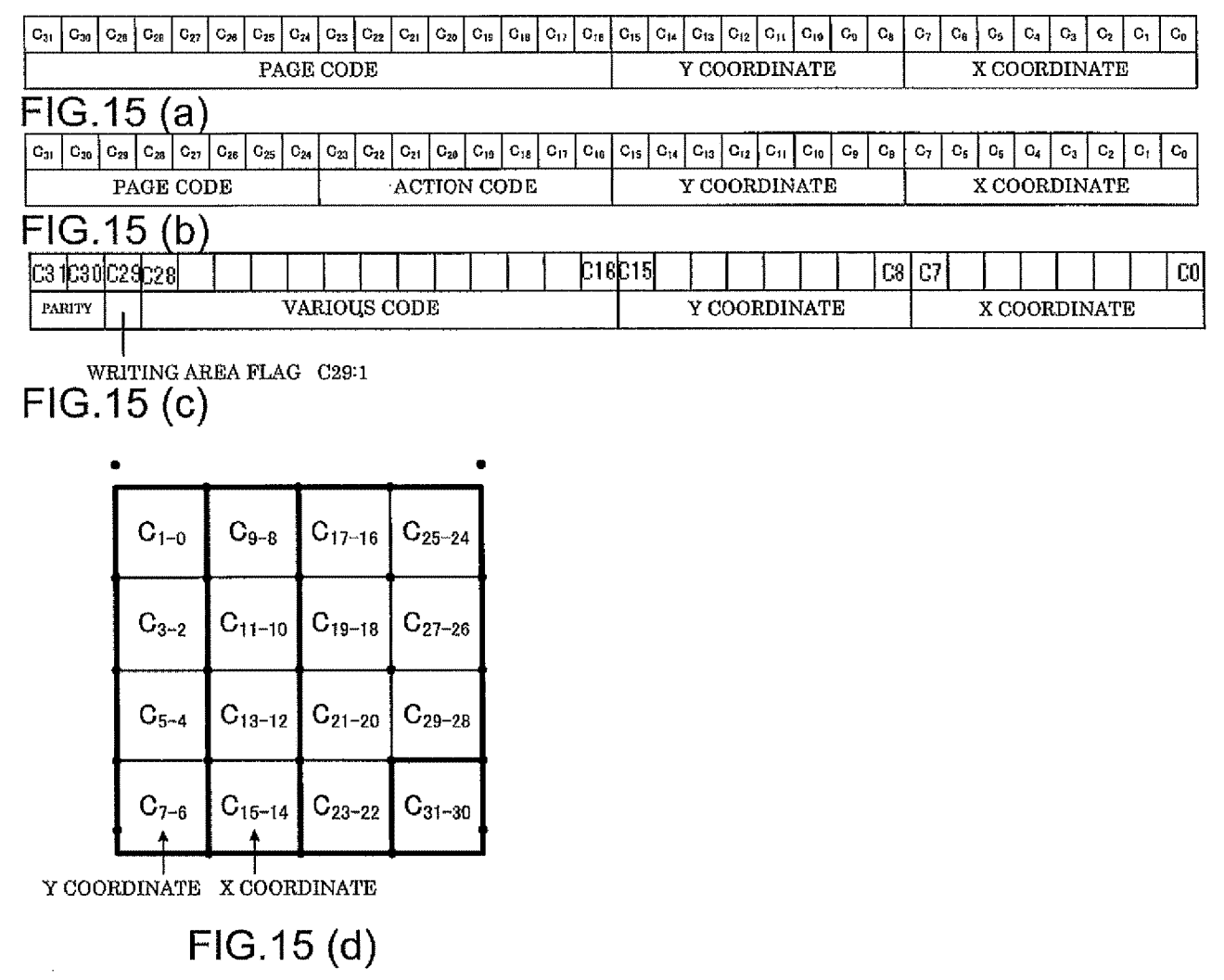

As shown in FIG. 15D, the dot pattern is a dot pattern comprising 4×4 block regions, and the blocks are partitioned into $C_{1-0}$-$C_{31-30}$. FIGS. 15A and 15B show the dot code format of each region.

FIG. 15A is a format registering a page code, an X coordinate, and a Y coordinate. The page code means the number of a page of medium 2 when medium 2 is a booklet, and the X coordinate and the Y coordinate respectively mean a position (a coordinate value) on the medium. In this way, when a user scans medium 2 using scanner 3, the page number of the medium and the coordinate position of a read portion are simultaneously recognized by one scanning operation.

FIG. 15B is a format registering a page code, an action code, an X coordinate, and a Y coordinate. The action code means an operation direction. For example, the action code is defined only in regions where icons signifying operations, such as "Zoom in" and "Zoom out," are drawn on the page, and included in the dot pattern used in the icon regions described later. Further, if the action code is defined in the entire writing area of the page and a necessary process is performed during or after handwriting input, the corresponding instruction process may be related with the action code and executed. The instruction process, for example, is a process to recognize a text or transmit a text to another information processing device during or after handwriting input. It should be noted that, while the specific writing area code in ( ) is used as a page code here, a plurality of the specific writing area codes may be provided on a medium surface and these writing areas may be defined by unique page codes so that what is written where can be immediately determined. It will be appreciated that the specific writing area code may be defined in combination with a page code so that which writing area on which page can be determined. Further, if a handwritten input content belongs to a predetermined category, the recognition rate is significantly improved by referring to the dictionary of that category. The handwritten input content may be a symbol or an illustration in addition to a letter and a character. It will be appreciated that the action code may be defined in combination with the specific writing area code to execute the corresponding instruction process.

In FIG. 15C, by providing a writing area flag, when the imaging unit images the dot pattern formed on a medium surface and dot pattern analysis unit 8 analyzes the dot pattern, whether it is a writing area or not can be immediately known. If it is not a writing area, information output and/or instruction processing associated to the code value/coordinate value is executed. If it is the writing area, a predetermined process of handwriting input is executed by the trajectory recognition unit. It will be appreciated that this writing area flag may also be provided with the page code (specific writing area code) or the action code in FIGS. 15A and 15B.

In this way, the dot pattern of the invention can register a variety of code information including a page code and an action code, and XY coordinates in one format. Alternatively, the dot pattern can register only either XY coordinates or code information. The format can be flexible.

<Imaging Unit>

FIGS. 16A-28 are diagrams illustrating imaging unit 7 used for the handwriting input/output system 1 of the invention.

It should be noted that imaging unit 7 is preferably the size and shape suitable for a person to hold, and most preferably, a pen shape as shown in FIGS. 16A-16D.

FIG. 16A is a diagram showing the most basic embodiment of imaging unit 7 of pen shape. In such an embodiment, projection for instruction 23, transmission unit 24 are provided, and a C-MOS sensor, which is not shown, is embedded generally along the axis of the pen. Transmission unit 24 is equipped to allow imaging unit 7 to transmit a signal to other members using infrared communication, wireless communication, or other methods. While transmission unit 24 is described for convenience of description, it does not have to be provided somewhere to be seen from outside.

FIG. 16B and FIG. 16C are diagrams showing other embodiments of pen-shaped imaging unit 7. In this embodiment, two buttons are provided to accept operations by a user. Such two buttons are transmission button 25 and retransmission button 26, and a user can instruct imaging unit 7 to transmit a signal to other members by a button operation. Here, retransmission button 26 is used to retransmit the same signal when a signal transmitted by transmission button 25 could not reach other destination members due to the existence of a shielding material or other reasons.

FIG. 16C is a diagram showing another embodiment of pen-shaped imaging unit 7. This embodiment is further provided with microphone 27 for accepting sound input by a user and sound play button 28. Microphone 27 is used for recording a sound used for sound recognition, which is described later, and sound play button 28 is used for reproducing voice guidance, which is described later.

FIG. 16D is a diagram showing another embodiment of pen-shaped imaging unit 7. In this embodiment, pen 29 is stored in the inner space of projection for instruction 23. Pen 29 comes out by pressing pen retract button 30.

FIG. 17A is a section view showing the leading end of pen-shaped scanner 31, which is an embodiment of imaging unit 7 comprising handwriting input/output system 1 of the invention. This pen-shaped scanner 31 comprises: light guide 32 that has a hollow formed thereinside and an opening at the leading end thereof; lens 33 that is disposed at a position near the opening of this light guide 32; LED 34 (irradiation unit 13) arranged on the same surface as this lens 33 and functions as the light source that irradiates light of a predetermined wavelength to a medium surface on which a dot pattern is formed; C-MOS sensor 35 (imaging element 12) disposed at a position retracted from lens 33; PCB 36 at a further retracted position; and, CPU that is mounted on PCB 36 yet is not shown. The hollow of light guide 32 is formed in a tapered shape expanding from lens 33 toward the opening. Here, the CPU plays any or all rolls of dot pattern analysis unit 8, trajectory recognition unit 9, process instruction unit 10, and information processing unit 11.

Light guide 32 is made of transparent resin or opaque white resin, and inside thereof functions as light guiding path. Light irradiated from LED 34 proceeds inside light guide 32 onto medium 2 through the opening. If light guide 32 is made of opaque white resin, as the irradiation light from LED 34 is adequately diffused while proceeding light guide 32, the light can be more evenly irradiated onto medium 2 through the opening.

<Controlling the Timing of Emitting LED Light>

FIG. 17B is a diagram showing the light emitting timing of LED 34 through time. LED 34 instantaneously emits light of a predetermined strength at each predetermined timing to expose medium 2. C-MOS sensor 35 images reflected light off medium 2 and transmits the image data to dot pattern analysis unit 8.

FIG. 17C is a diagram showing the reaction state of the element of C-MOS sensor 35 through time. Afterimage of medium 2 is burned on the element of C-MOS sensor 35 at the moment when LED 34 emits light of a predetermined strength and exposes medium 2. Here, predetermined time $t_k$ is time required for maintaining the condition of the afterimage that is analyzable by dot pattern analysis unit 8 within time until the afterimage of imaging element 12 disappears.

If time $_ft$ during which LED 34 had been emitting light is shorter than predetermined time $\alpha$, since the afterimage of dots is burned on the element of C-MOS sensor 35 without blur as shown in FIG. 17D, this afterimage is transmitted to dot pattern analysis unit 8 as image data. In this case, the transmission is performed within time $t_1$ during which the afterimage still remains on the element.

On the other hand, if time $_ft$ during which LED 34 had been emitting light greatly exceeds predetermined time $\alpha$, the afterimage of dots are blurry burned on the element of C-MOS sensor 35 as shown in FIG. 17E, disabling accurate reading of numerical values.

While such an imaging method is particularly effective when using a C-MOS sensor, CCD camera may be used instead of the above-described imaging method.

The functions of light control unit 14 and dot pattern analysis unit 8 used for handwriting input/output system 1 of the invention are described with reference to FIGS. 18A to 18C.

FIG. 18A is a time-series describing the first pattern of light emitting timing of LED 34 by light control unit 14, timing for imaging a dot pattern by imaging element 12 and transmitting the image data to the storage element, and timing for analyzing the image data by dot pattern analysis unit 8. In the first pattern, light emission $_ft_n$, imaging $_at_n$, analysis $_at_n$ are sequentially performed. After analysis $_at_n$ ends, next light emission $_ft_{n+1}$ will not take place until predetermined time $t_s$ elapses. Here, predetermined time $t_s$ is defined as the maximum value of anticipated values of time required for imaging, transmitting, analyzing a dot pattern by imaging element 12 as anticipated imaging, transmission, and analysis time.

FIG. 18B is a time-series describing the second pattern of light emitting timing of LED 34 by light control unit 14, timing for imaging and transmitting a dot pattern by imaging element 12, and timing for analyzing image data by dot pattern analysis unit 8. In the second pattern, after analysis $_at_n$ ends, light control unit 14 detects that the end of the analysis and next light emission $_ft_{n+1}$ immediately takes place, then, the next dot pattern is imaged $_rt_{n+1}$ and analyzed $_at_{n+1}$.

FIG. 18C is a time-series describing the third pattern of light emitting timing of LED 34 by light control unit 14, timing for imaging and transmitting a dot pattern by imaging element 12, and timing for analyzing image data by dot pattern analysis unit 8. In the third pattern, having a plurality of task processors or light control units 14 and dot pattern analysis units 8, imaging $_rt_n$ of a dot pattern for next analysis takes place at the same time as analysis $_at_{n-1}$, light emission $_lt_{n+1}$ takes place as soon as the analysis $_at_{n-1}$ ends, then, the image data imaged at imaging $_rt_n$ is analyzed $_at_n$. It should be noted that, while analysis $_at_n$ may start at the same time as light emission $_lt_{n+1}$, as the light emission time of LED 34 is extremely short, there is not much difference in the total time from the light emission of LED 34 until dot pattern analysis unit 8 ends analysis of image data.

<Attaching a Pen>

Pen-shaped scanner 31 is attached with pen 37 as writing material. Usually, when printing with writing material such as a pen, the writing material is used in an inclined state. For this reason, the circumference of pen-shaped scanner 31 is formed so that the scanner can be inclined up to 45 degree. In this way, by imaging a medium surface near the leading end of pen 37, brushstroke, moving distance, and the like can be accurately analyzed when printing with pen 37 apart from the center of the imaging area. Further, by offset correction, which is described later, the brushstroke can be analyzed even more accurately.

Pen 37 as writing material can be used without leaving a writing trail on a medium by being retracted by a variety of methods. A technique used for a pen, such as a general ballpoint pen, can be used as is for the retracting method. For example, a retraction method by pushing or rotating can be used or a cap can be used for covering.

Further, the pens may be switchable as if a general three-color ballpoint pen. In such a case, in addition to exchanging pens of different colors, an eraser or correction pen may be used instead of the pen.

Further, projection for instruction 23 (a stylus pen) may be provided instead of pen 37 to image the vicinity of the writing by projection for instruction 23. A retraction space may be provided inside projection for instruction 23 to retract pen 37 to use projection for instruction.

<Offset Correction>

As shown in FIG. 17A, in pen-shaped scanner 31, XY coordinate values defined by a dot pattern imaged by imaging unit 7 and XY coordinate values defined by a dot pattern on a trajectory actually written by pen 37 are different. Further, the XY coordinate values defined by the dot pattern on the trajectory should be converted into xy coordinate values in the writing area on the medium surface to execute written input or operation instruction.

The following describes a method of calibrating XY coordinate values of a dot pattern imaged by imaging unit 7 into those of a dot pattern on a trajectory actually written by pen 37, and a method of converting XY coordinate values in the dot pattern coordinate system into xy coordinate values in the writing area coordinate system in handwriting input/output system 1 of the invention.

<Relationship Between the Writing Area Coordinate System and the Dot Pattern Coordinate System>

Figure 19:
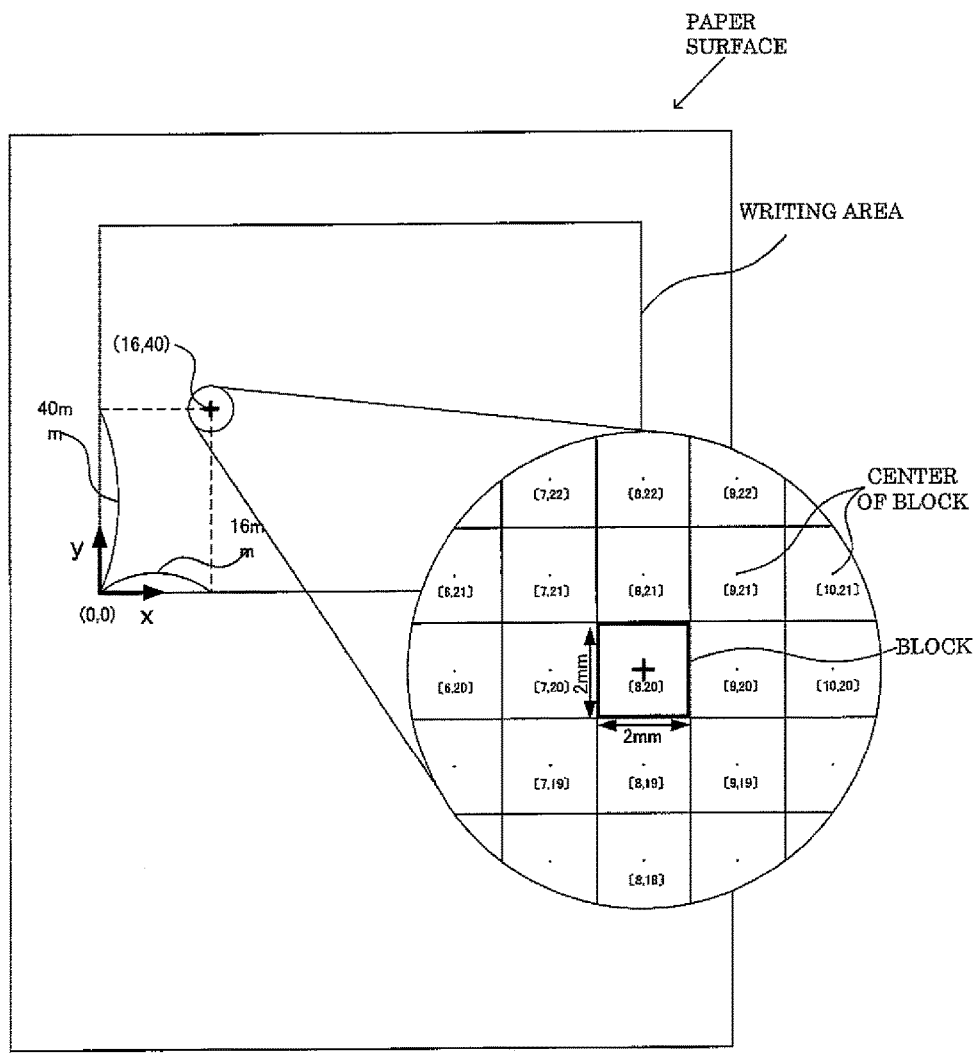
FIG. 19 is a diagram illustrating the function of the imaging unit used for the handwriting input/output system of the invention (3).

FIG. 19 shows an example of the writing area.

In the writing area coordinate system, lower left corner is defined as (0, 0). xy coordinate values in the writing area are expressed by mille meters. For example, coordinate position (16, 40) indicates a position moved from the lower left corner by 16 mm rightward and 40 mm upward.

Blocks of dot patterns, each of which defines one set of XY coordinate values in the dot pattern coordinate system, are continuously formed in the writing area. The XY coordinate values indicate the position of the central point of the block. The coordinate values in the dot pattern coordinate system are expressed as [X, Y] to be distinguished from the coordinate values in the writing area.

Figure 20:
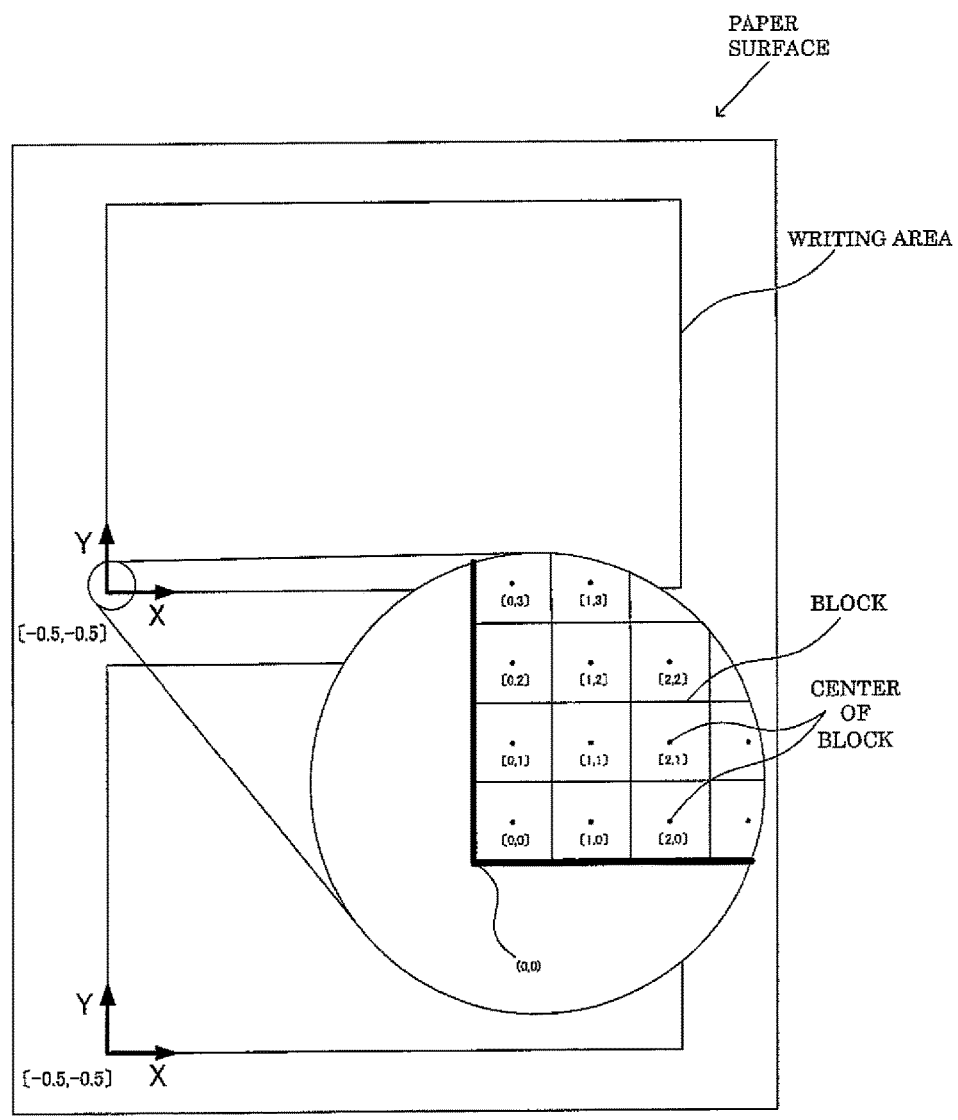
FIG. 20 is a diagram illustrating the function of the imaging unit used for the handwriting input/output system of the invention (4).

If the lower left corner of the writing area is defined as the origin (0, 0) in the coordinate system, and the lower left corner of the block of the dot pattern where [0, 0] are defined is adjusted to the origin (0, 0), the dot patterns are formed such that XY coordinate values at the lower left corner in the dot pattern coordinate system become [−0.5, −0.5] in any writing area as shown in FIG. 20. In such a case, a unique code value is defined in the dot pattern formed on each writing area to identify each writing area. The same code values may be used if there is no need to identify the writing areas from one another.

Figure 22:
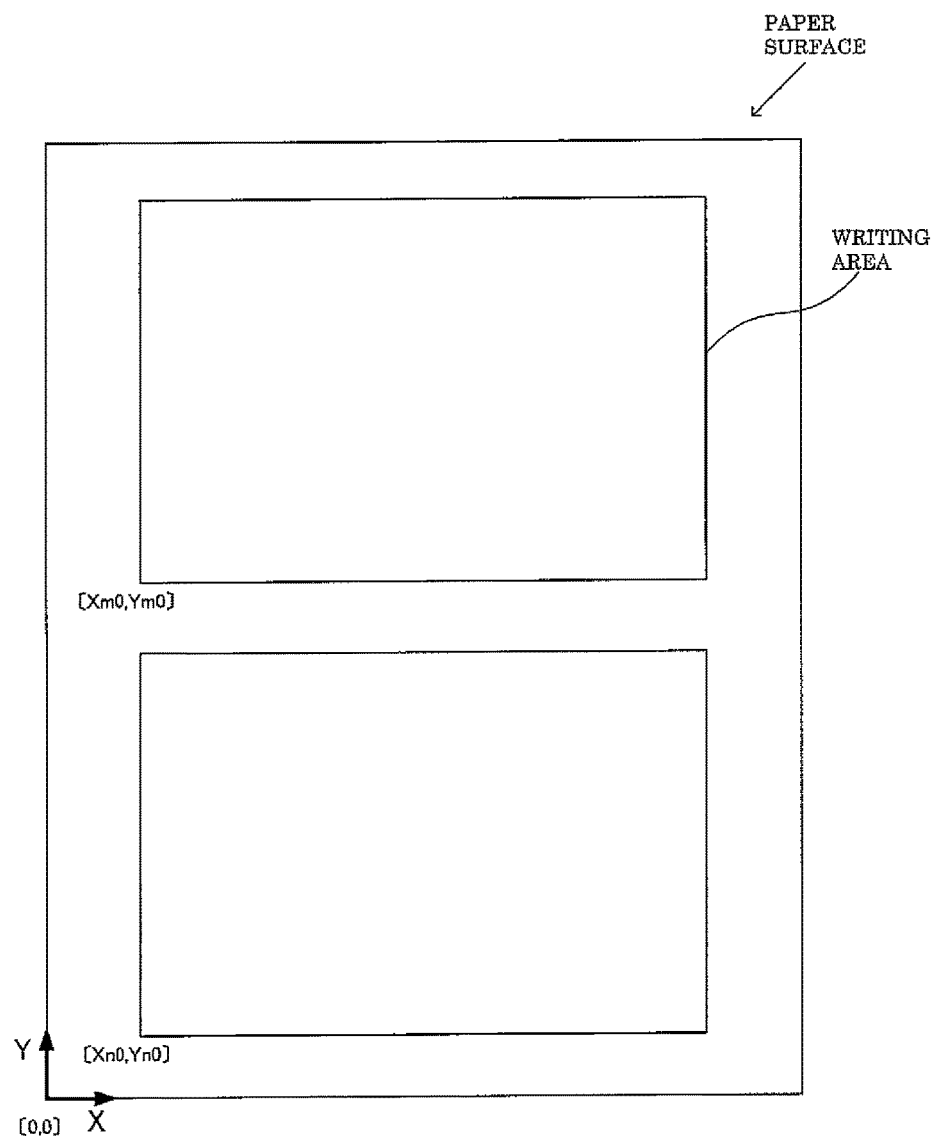
FIG. 22 is a diagram illustrating the function of the imaging unit used for the handwriting input/output system of the invention (6).

Further, as shown in FIG. 22, a dot pattern defining XY coordinate values is formed on the entire paper surface, and unique code values are defined in the writing areas in addition to the XY coordinate values. In such a case, XY coordinate values of the lower left corner of the writing area become [Xn0, Yn0] (n is a number identifying the writing area).

Next, if one side of each block is L mm, the XY coordinate values are converted into those in the writing area coordinate system as described below.

As shown in FIG. 20, if a dot pattern is formed by defining the XY coordinate values of the origin (0, 0) as [−0.5, −0.5], the coordinates [X, Y] in the dot pattern coordinate system become (X×L+L/2, Y×L+L/2) in the writing area coordinate system.

Figure 21:
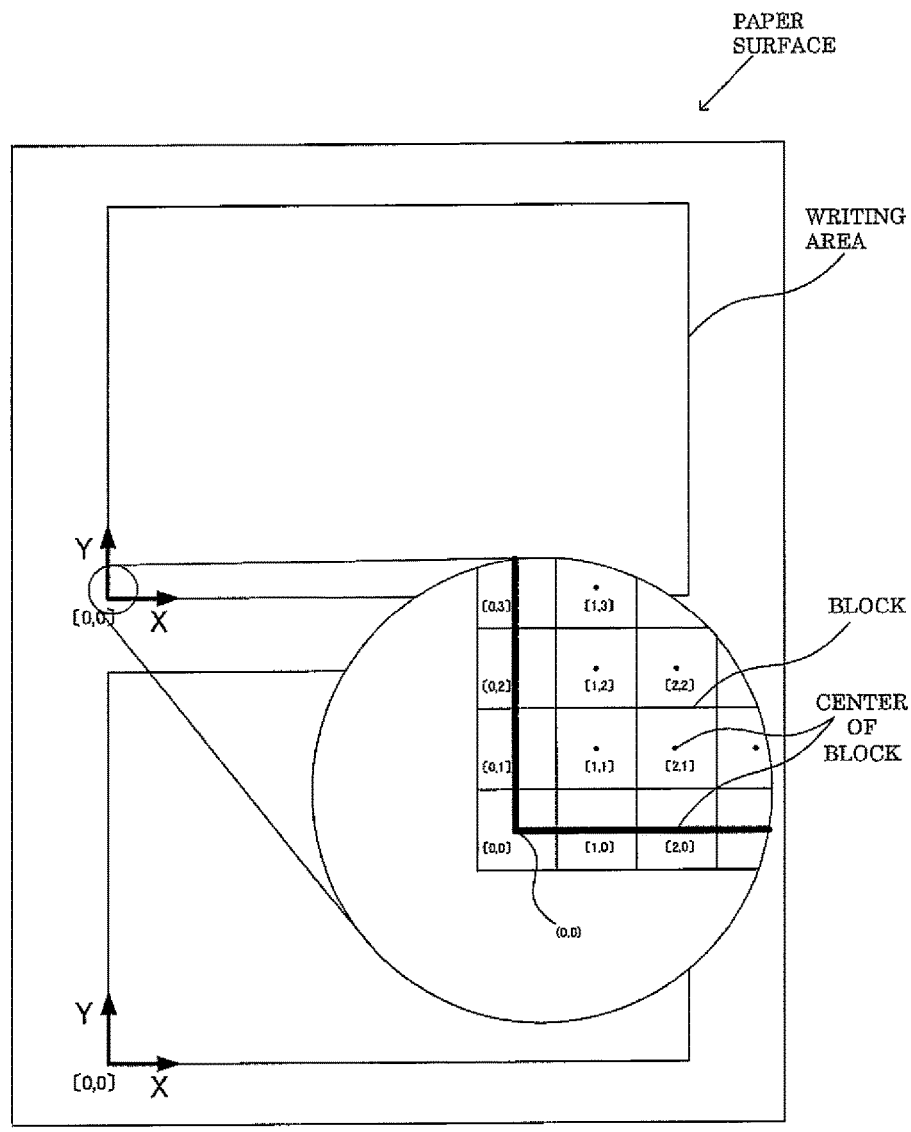
FIG. 21 is a diagram illustrating the function of the imaging unit used for the handwriting input/output system of the invention (5).

It should be noted that, as shown in FIG. 21, if the lower left corner of the writing area is defined as the origin (0, 0) in the coordinate system, and the central point of the block of a dot pattern that defines [0, 0] is adjusted to the origin, the coordinate values become (X×L, Y×L).

It should be noted that the relationship between the writing area coordinate system and the dot pattern coordinate system in the example of FIG. 21 is the same as the example in the enlarged view portion of FIG. 19.

As shown in FIG. 22, if the XY coordinate values at the lower left corner of the writing area are [Xn0, Yn0], coordinates [X, Y] in the dot pattern coordinate system become ((X−Xn0)×L, (Y−Yn0)×L) in the writing area coordinate system n.

<Calculating XY Coordinate Values [Xc, Yc] of the Center of the Imaging Area C in a Dot Pattern Coordinate System>

Figure 23:
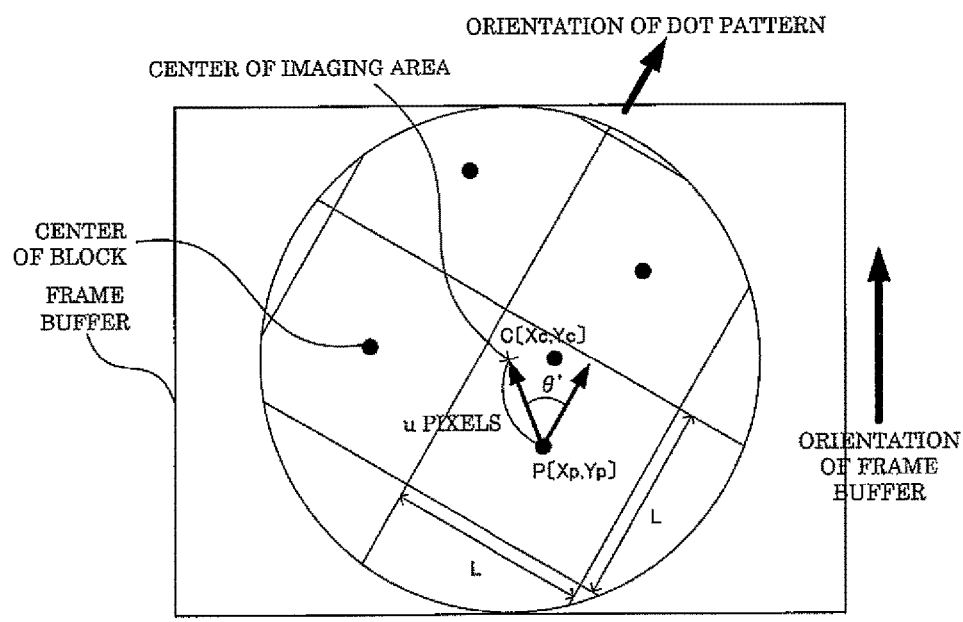
FIG. 23 is a diagram illustrating the function of the imaging unit used for the handwriting input/output system of the invention (7).

The method for calculating XY coordinate values [Xc, Yc] of the center of the imaging area is described with reference to FIG. 23.

The number of pixels M forming the distance between the centers of neighboring blocks is calculated by temporarily storing the captured image in a frame buffer of a predetermined resolution and analyzing the image. As the distance between the centers equals to length L of one side of the block, if the size per pixel of the captured image with reference to L is defined as value k in the dot pattern coordinate system, k=L/M.

Similarly, by analyzing the image, the number of pixels u comprising the distance between the center of the block P [Xp, Yp] closest to the center of the imaging area C and the center of the imaging area C is calculated. The distance CP from the center of the image area C to the center of the block that is closest to the center of the imaging area becomes CP=k×u.

Next, if the dot pattern is formed on a paper surface so that the orientation of the dot pattern (the orientation of the writing area) becomes upward direction of the writing area, the angle formed by the orientation of the dot pattern and PC vector is defined as θ' (rotation in anticlockwise direction is defined as the positive direction), [Xc, Yc]=[Xp−CP×sin θ', Yp+CP×cos θ'] is calculated.

<Calculating xy Coordinate Values Q (xq, yq) at the Pen Tip in the Writing Area Coordinate System (when the Pen Stands Perpendicular to the Paper Surface.)>

Figure 24:
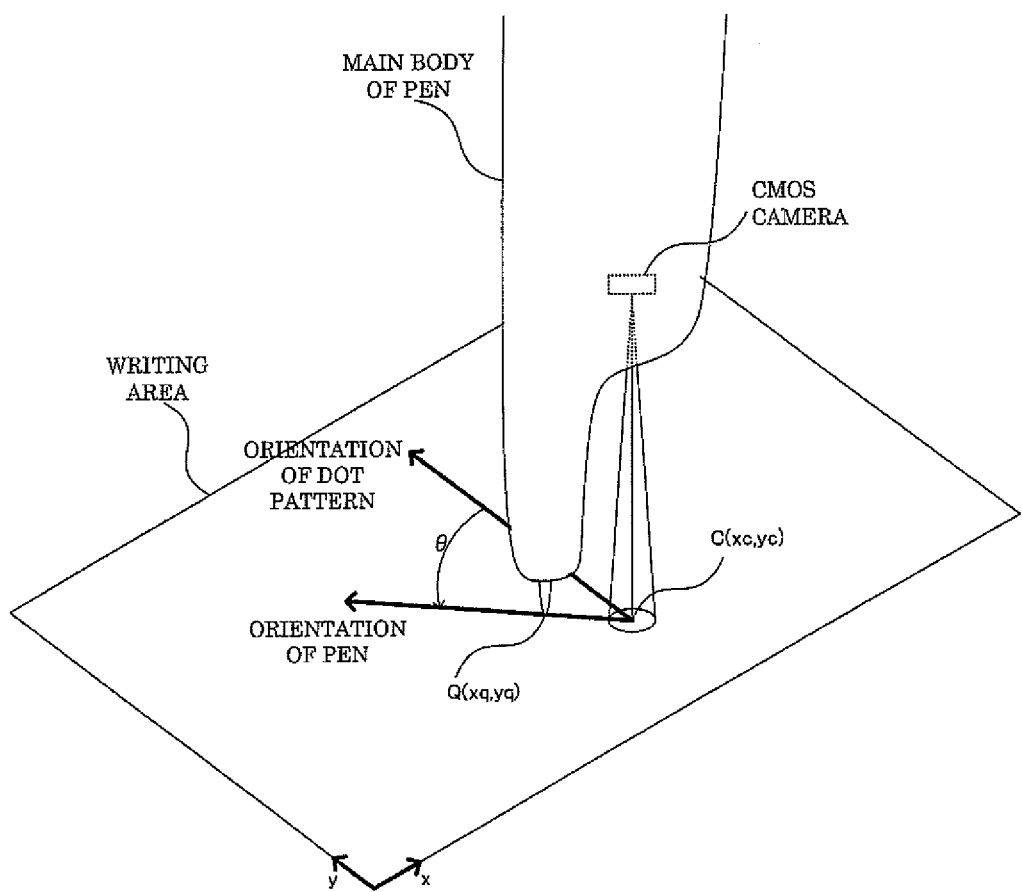
FIG. 24 is a diagram illustrating the function of the imaging unit used for the handwriting input/output system of the invention (8).
Figure 25:
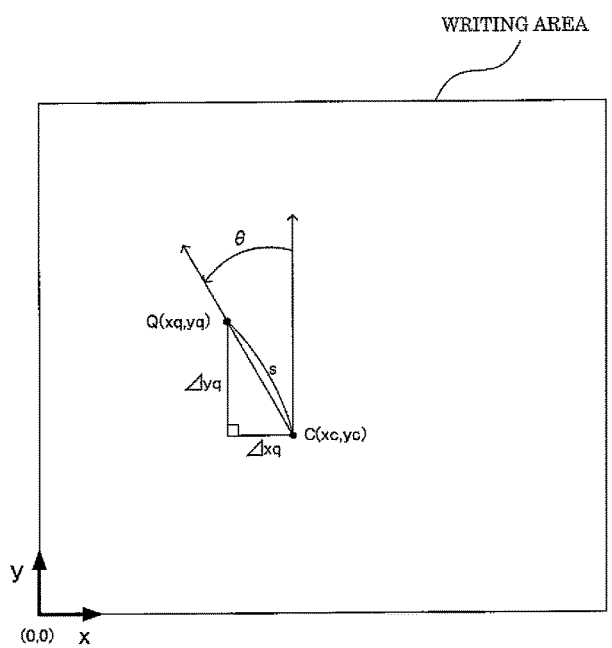
FIG. 25 is a diagram illustrating the function of the imaging unit used for the handwriting input/output system of the invention (9).

As shown in FIG. 24, the coordinate values at the center of the imaging area C in the writing area coordinate system are defined as (xc, yc) and the coordinate values at the pen tip on the medium surface are defined as Q(xq, yq). As shown in FIG. 25, if differences between x coordinate values and y coordinate values of point C and point Q are defined as Δxq and Δyq respectively, the following formula can be obtained:

$$\Delta xq = xq - xc$$

$$\Delta yq = yq - yc$$

When a dot pattern is formed so that the orientation of the dot pattern becomes upward direction of the writing area, the orientation of CQ vector with the center of the imaging area C as the starting point and the pen tip as the end point is defined as the orientation of scanner 31.

The angle formed by the orientation of the dot pattern and the orientation of pen-shaped scanner 31 is defined as θ (rotation in anticlockwise direction is defined as the positive direction).

Figure 26:
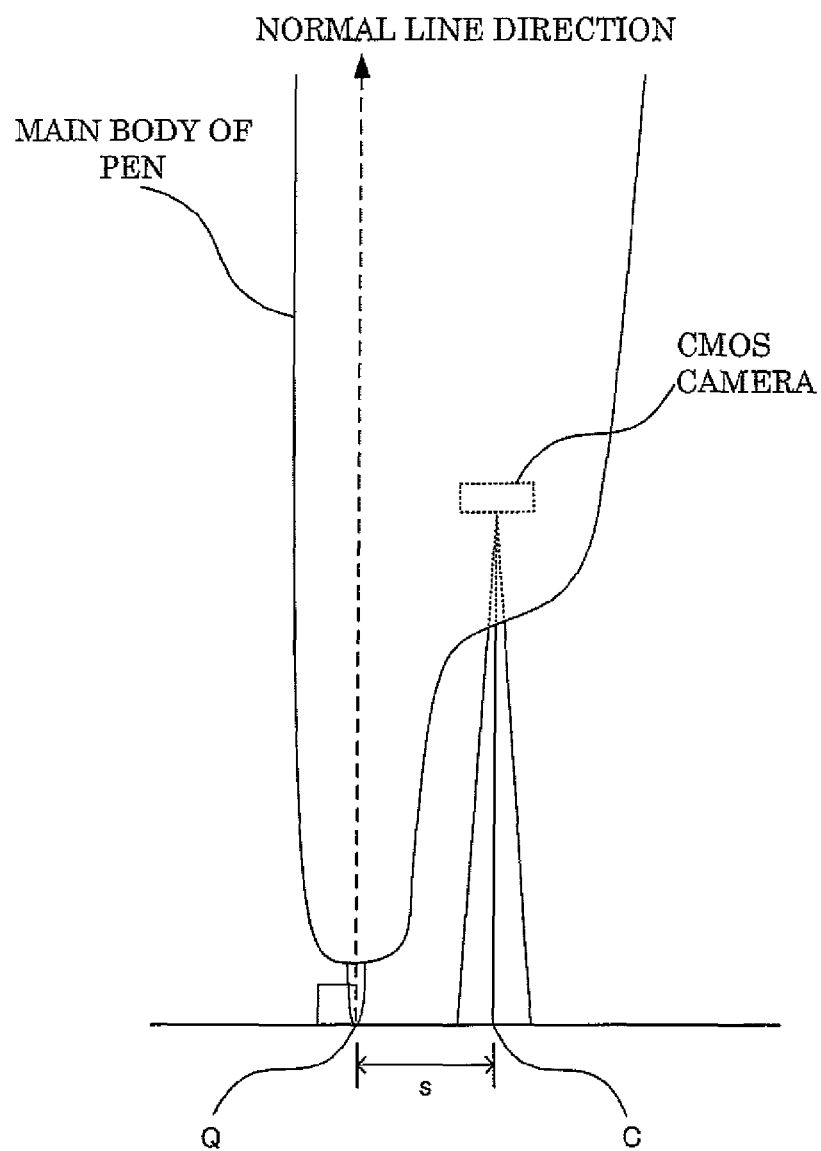
FIG. 26 is a diagram illustrating the function of the imaging unit used for the handwriting input/output system of the invention (10).

Further, as shown in FIG. 26, if the distance from the center of the imaging area C to the pen tip Q in a state in which pen-shaped scanner 31 stands perpendicular to the paper surface is defined as s, Δxq and Δyq become:

$$\Delta xq = -s \times \sin \theta,$$

$$\Delta yq = s \times \cos \theta.$$

Therefore, xq and yq become:

$$xq = xc - s \times \sin \theta,$$

$$yq = yc + s \times \cos \theta.$$

<Calculating xy Coordinate Values Q' (xq', yq') at the Pen Tip in the Writing Area Coordinate System (when the Pen is Inclined with Reference to the Paper Surface.)>

Figure 27:
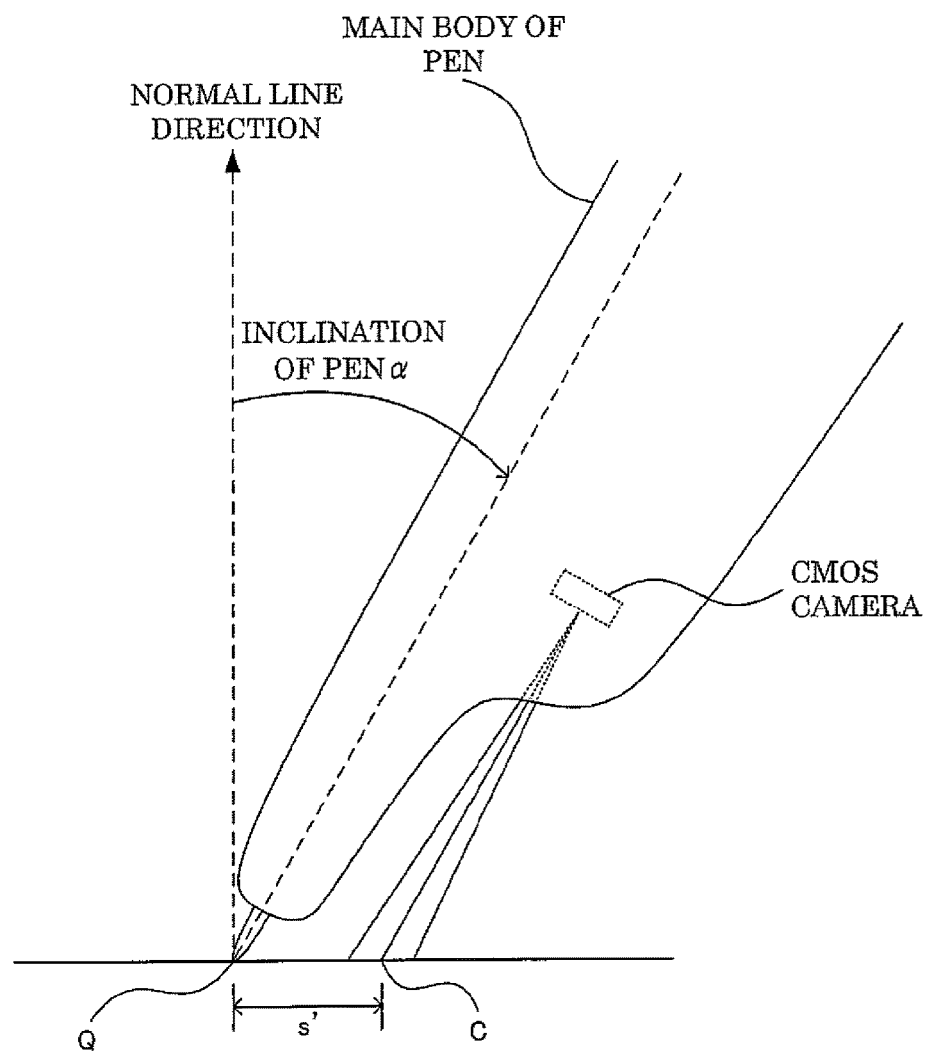
FIG. 27 is a diagram illustrating the function of the imaging unit used for the handwriting input/output system of the invention (11).

As shown in FIG. 27, if pen-shaped scanner 31 is inclined with reference to a paper medium, the distance from the center of imaging area C to the pen tip Q is different.

If the inclination of pen-shaped scanner 31 from the normal line direction of the paper surface is defined as α (hereafter referred to as "inclination of pen"), and the distance from the center of the imaging area to the pen tip is defined as s', s in the above formula can be replaced with s'. The following formula can be obtained:

$$xq' = xc - s' \times \sin \theta$$

$$yq' = yc + s' \times \cos \theta$$

Further, s'=s/cosα and if this is substituted into the above formula, the following formula can be obtained:

$$xq' = xc - s \times \sin \theta / \cos \alpha$$

$$yq' = yc + s \times \cos \theta / \cos \alpha$$

<A Distance from the Center of the Imaging Area to the Pen Tip when Using the Pen with the Pen Tip Retracted in the Main Body>

Figure 28:
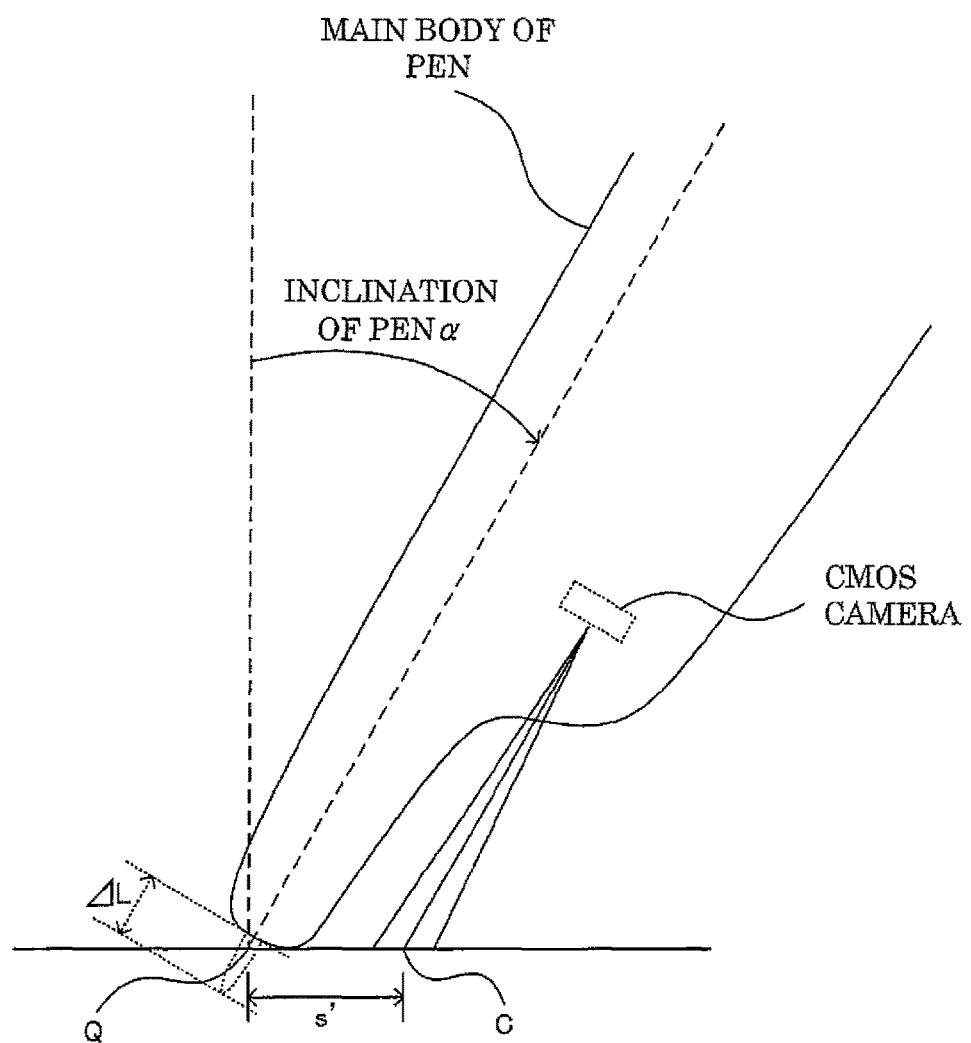
FIG. 28 is a diagram illustrating the function of the imaging unit used for the handwriting input/output system of the invention (12).

It should be noted that if the pen tip is retracted as shown in FIG. 28, while pen-shaped scanner 31 gets closer to the paper surface only by ΔL, s and s' are not affected and the same formula can be used.

<Calculating Inclination α of Pen>

To detect inclination α of the pen, inclination measuring means, such as inclination sensor, may be equipped on the main body.

Alternatively, inclination α of the pen can be calculated from relational expression α=f(ΔBL) by calculating brightness BLi, j=1, p at predetermined plurality of p points of the captured image, and using a difference in brightness ΔBL between the brightest point and the darkest point.

can be calculated from α=f(BLi, j=1, p) with a parameter of BLi, j using Fourier's function and sin function.

Further, α may be calculated by preparing a table that relates ΔBL to α in advance. It should be noted that the inclination direction of the pen can be obtained by measuring the direction from the darkest point of BLi, j=1, p to the brightest point thereof.

<Medium 2>

FIGS. 29 to 42 are diagrams illustrating medium 2 used for the handwriting input/output system 1 of the invention.

Figure 29:
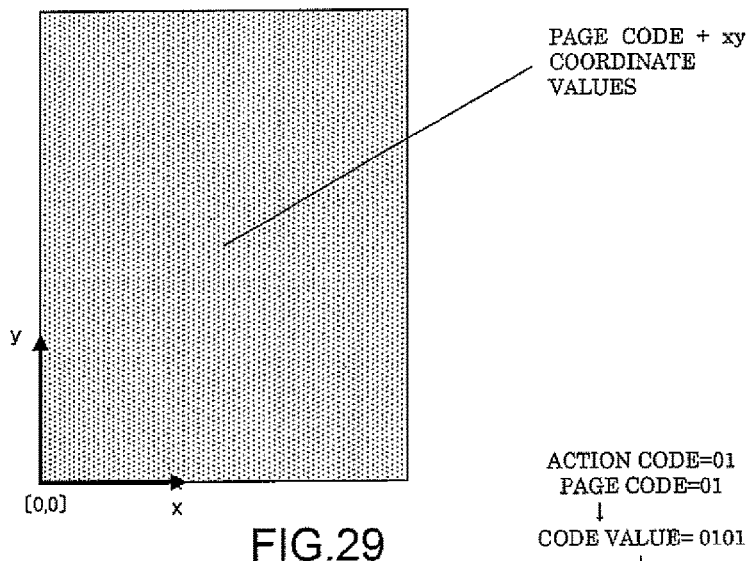
FIG. 29 is a diagram illustrating the function of the medium on which is formed the writing area used for the handwriting input/output system of the invention (1).

FIG. 29 is a diagram showing medium 2 printed (formed) with a dot pattern over the entire surface thereof to form the writing area.

Such a dot pattern defines XY coordinate values and a page code. Here, the page code means a code that identifies a medium using the code information.

Figure 30:
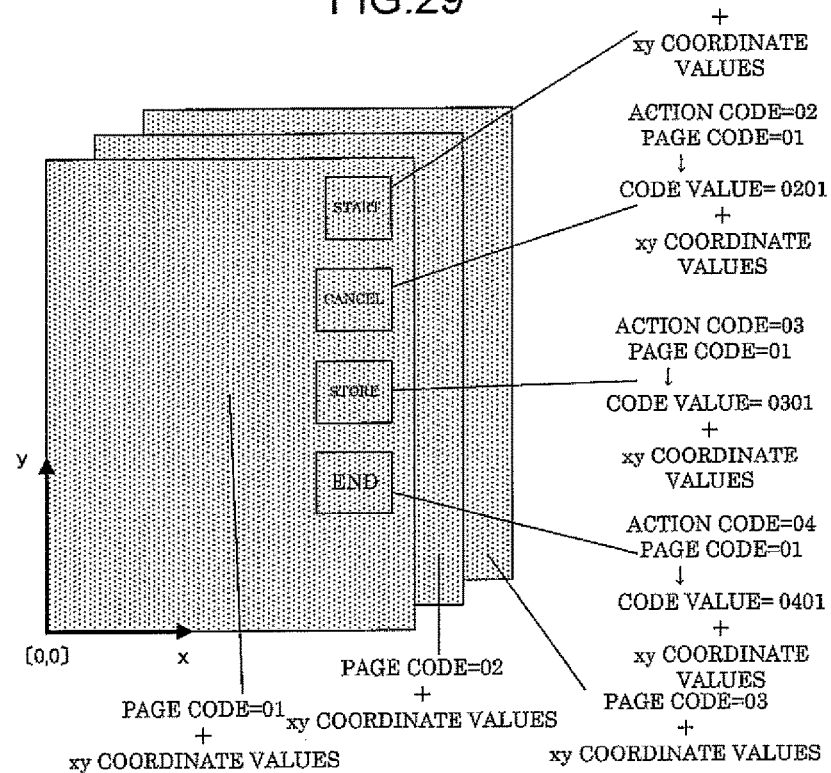
FIG. 30 is a diagram illustrating the function of the medium on which is formed the writing area used for the handwriting input/output system of the invention (2).

FIG. 30 is a diagram showing medium 2 on which, in the area printed with a dot pattern that defines a page code and XY coordinate values, another dot pattern that defines further action code is printed.

Here, the action code means a code for instructing a predetermined operation (particularly operation of application) to information processing unit 11 using the code information in terms of handwriting input/output to a specified medium. In this way, security can be enhanced and erroneous operations can be decreased.

The medium is a set of a plurality of sheets and a different page code is allocated to each sheet. The page code is, for example, "01" for page 1, "02" for page 2, and "03" for page 3.

On the area printed with a dot pattern that defines an action code, a text, graphic, photograph, and icon for illustrating the meaning of such an action code to users can be superimposed and printed. For example, the action code of the area where a text icon "START" is superimposed and printed instructs information processing unit 11 to start up the application for handwriting input/output. The action code of the area where a text icon "CANCEL" is superimposed and printed instructs information processing unit 11 to abandon (cancel) input result by the application for handwriting input/output or instructs information processing unit 11 to cancel the execution of a process when information processing unit 11 is to determine whether or not to execute the predetermined process. The action code of the area where a text icon "STORE" is superimposed and printed instructs information processing unit 11 to store the input result by the application for handwriting input/output. The action code of the area where a text icon "END" is superimposed and printed instructs information processing unit 11 to terminate the application for handwriting input/output.

Figure 31:
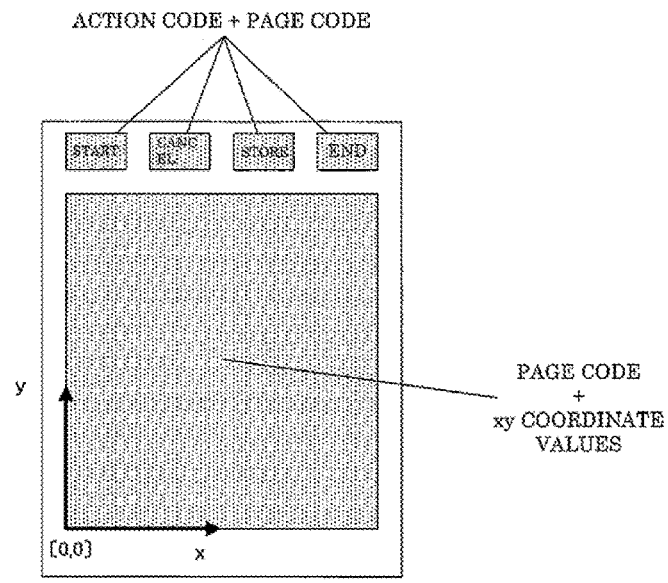
FIG. 31 is a diagram illustrating the function of the medium on which is formed the writing area used for the handwriting input/output system of the invention (3).

FIG. 31 is a diagram showing medium 2 on which the area printed with a dot pattern that defines XY coordinate values and a page code and the area printed with a dot pattern that defines an action code and a page code are divided. In such a case, a variety of instructions can be executed only to the page specified by the page code without selecting the target page of the medium. In this way, security can be enhanced and erroneous operations can be decreased.

Figures 32A, 32B:
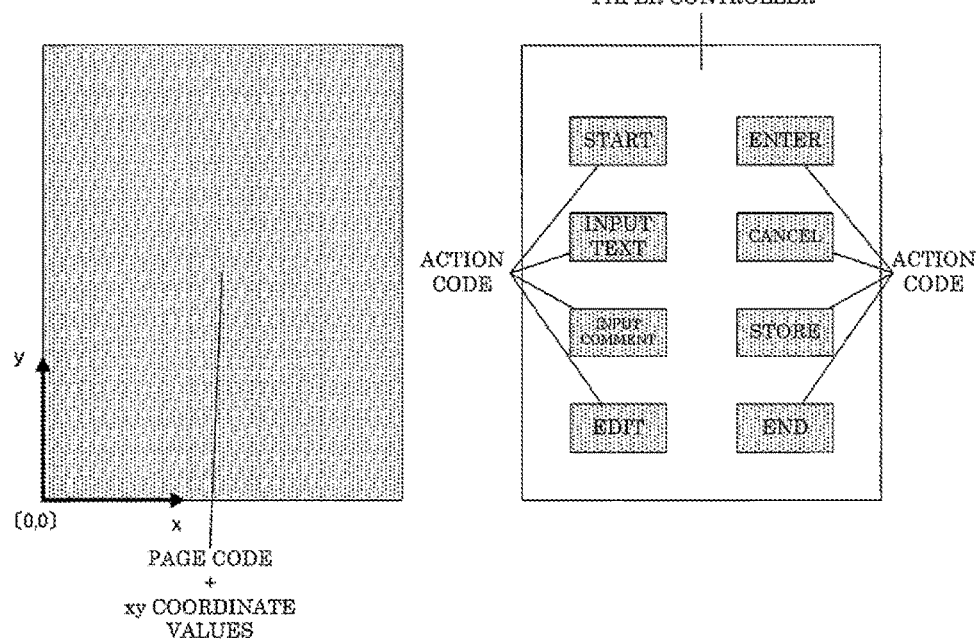
FIG. 32 is a diagram illustrating the function of the medium on which is formed the writing area used for the handwriting input/output system of the invention (4).

FIG. 32 is a diagram showing the first medium printed with a dot pattern that defines XY coordinate values and a page code and the second medium that is a paper controller printed with dot patterns that define only action codes. In such a case, a variety of instructions of handwriting input/output can be executed on any page of the medium. It should be noted that, when the writing area and the icon are provided on a different component, in addition to a paper controller as shown in FIG. 32, they can be provided on a sticker, a sticky note, or a card to be attached on a different medium.

The action code of the area superimposed and printed with a text icon "INPUT TEXT" instructs information processing unit 11 to input a letter, character, or figure of a text in an operation of the application for handwriting input/output. The action code of the area superimposed and printed with a text icon "INPUT COMMENT" instructs information processing unit 11 to input a letter, character, or figure of a comment in an operation of the application for handwriting input/output. The action code of the area superimposed and printed with a text icon "EDIT" instructs information processing unit 11 to edit a letter, character, or figure in an operation of the application for handwriting input/output (that is, it is possible to edit a file, such as a document and an image, prepared by an application other than the application for handwriting input/output). The action code of the area superimposed and printed with a text icon "ENTER" instructs information processing unit 11 to determine the execution of a process when information processing unit 11 is to determine whether or not to execute the predetermined process.

Figure 33:
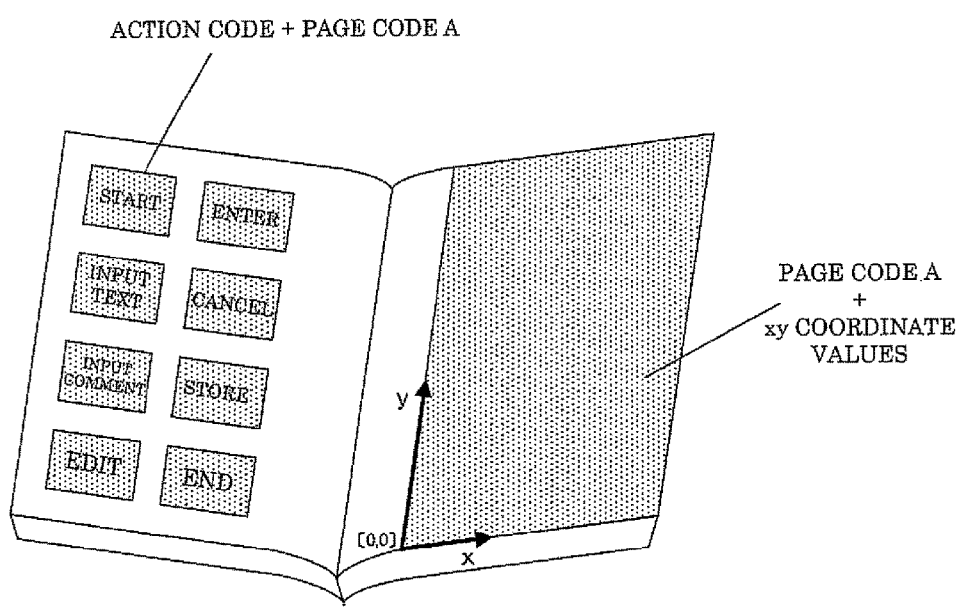
FIG. 33 is a diagram illustrating the function of the medium on which is formed the writing area used for the handwriting input/output system of the invention (5).

FIG. 33 is a diagram showing a booklet that includes the first medium printed with a dot pattern that defines XY coordinate values and page code A and the second medium that is a paper controller printed with a dot pattern that defines an action code and page code A.

In such a case, a dot pattern registering the same XY coordinates may be printed on the writing area of each page. This is because when performing writing operation, the writing area can be identified by using an icon of the controller area that registers an action code and a page code. In other words, the position of the writing area and the page can be changed without changing XY coordinate values. In such a case, a variety of instructions can be executed only to the page specified by the page code without selecting the target page of the medium. In this way, security is enhanced and erroneous operations can be decreased.

Alternatively, a dot pattern that defines an action code for instructing the information processing unit to start up the application for handwriting input/output may be printed over the entire writing area. In such a case, if writing is performed on a medium surface, the application for handwriting input/output automatically starts up.

Further, the writing area on the medium is not limited to one, and a plurality of writing areas can be defined. (When a plurality of writing areas are provided)

The following describes four examples of the case in which a plurality of writing areas are provided with reference to FIGS. 34 to 38.

First Example

Figure 34:
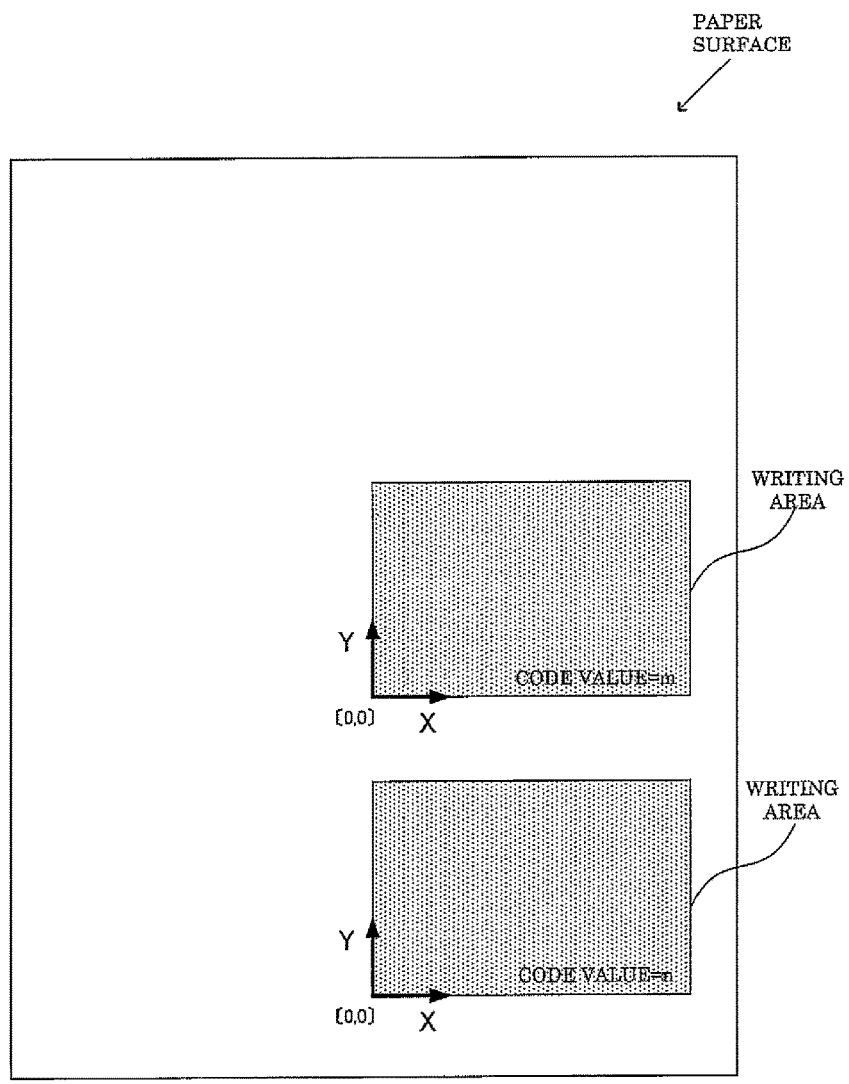
FIG. 34 is a diagram illustrating the function of the medium on which is formed the writing area used for the handwriting input/output system of the invention (6).

As shown in FIG. 34, the first example is a case in which a dot pattern that defines: XY coordinate values in a dot pattern coordinate system different from those of other writing areas; and, a code value that specifies the writing area, is formed on each of the plurality of writing areas In FIG. 34, a dot pattern that respectively defines XY coordinate values in the dot pattern coordinate system and code values m, n that specify the writing area is formed on each writing area.

By defining a plurality pieces of information in the code value, the code value can include, for example, a category number that categorizes a page number as well as the writing area.

If a page number is included, which writing area of which page can be determined. When there are selections of information, process instructions, choices, and the like that are to be processed as a common code, a defined page number or information that specifies the selection can be defined as a code value.

Figure 35:
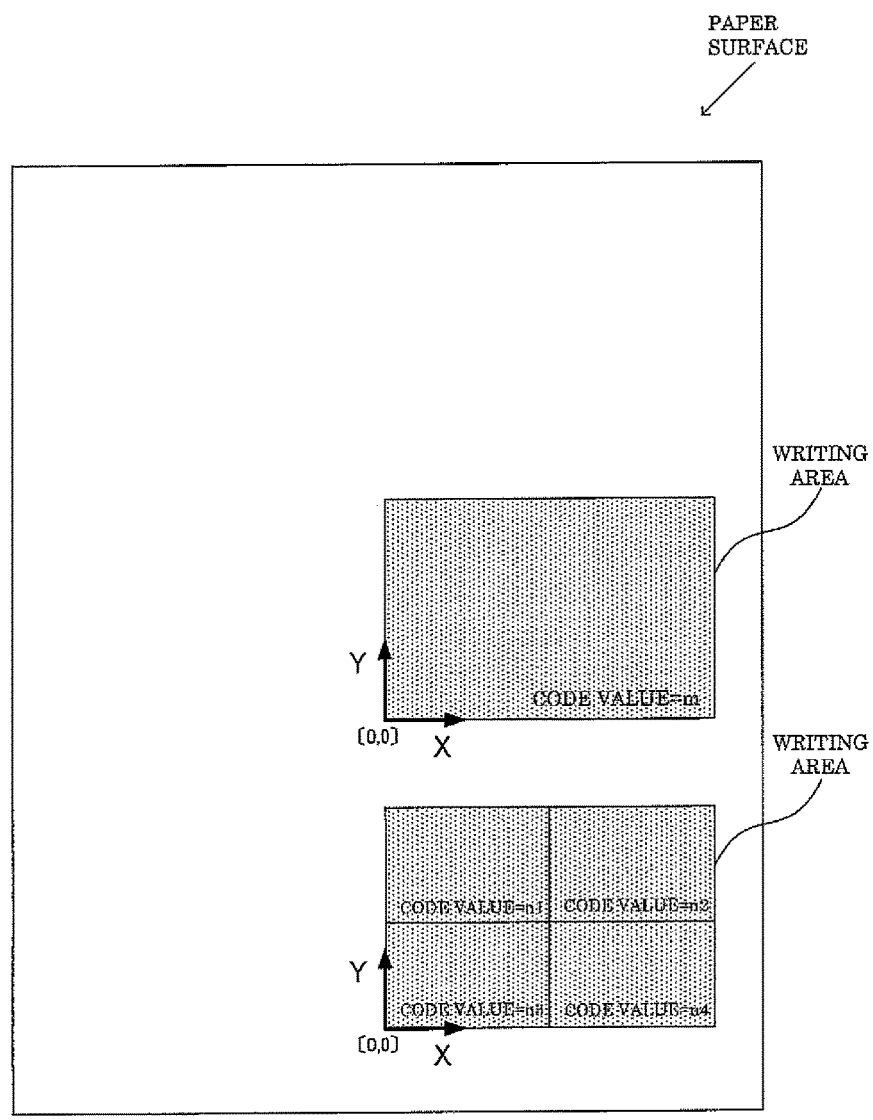
FIG. 35 is a diagram illustrating the function of the medium on which is formed the writing area used for the handwriting input/output system of the invention (7).

As shown in FIG. 35, the writing area can be divided to define a different code value. In FIG. 35, code values are n1, n2, n3, and n4. In this way, a plurality of selections can be set in one writing area.

This first example has a benefit that the lower left corner of each area always becomes 0 (the origin), making it easily to handle.

Second Example

Figure 36:
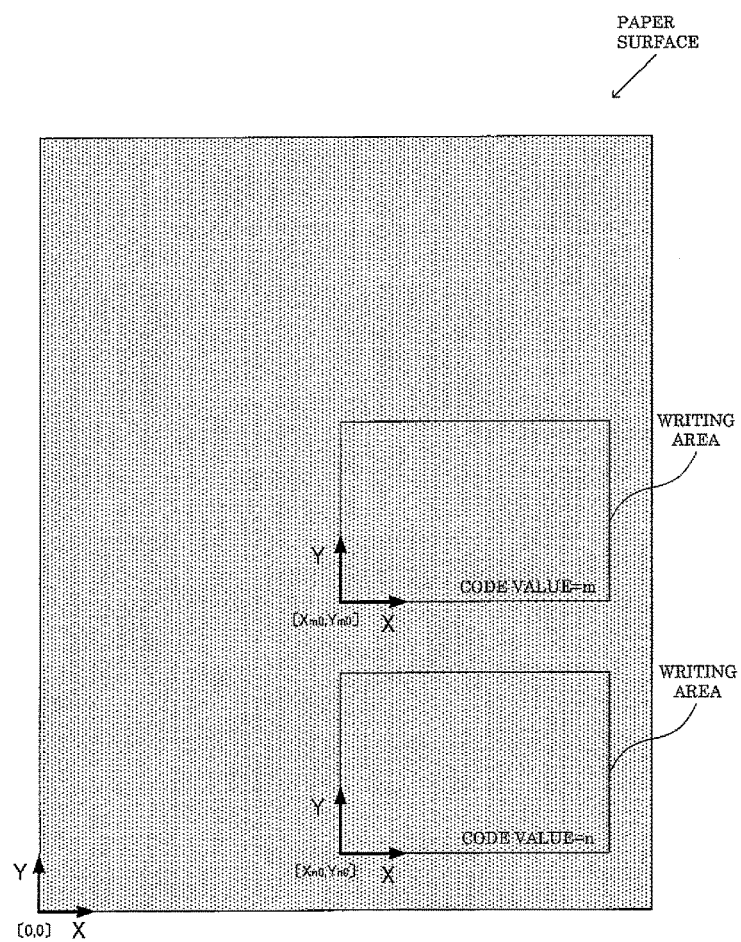
FIG. 36 is a diagram illustrating the function of the medium on which is formed the writing area used for the handwriting input/output system of the invention (8).

In the second example, as shown in FIG. 36, a dot pattern that defines XY coordinate values in a single dot pattern coordinate system is formed over the entire predetermined area, and the dot pattern of the writing area defines a code value as well as XY coordinates.

In FIG. 36, a dot pattern that defines XY coordinate values in a single dot pattern coordinate system with the lower left corner of a predetermined area as the origin is formed over the entire predetermined area. The two writing areas in this predetermined area define XY coordinate values of lower left corners, [Xm0, Ym0], [Xn0, Yn0], and code values m, n that specify the writing areas respectively.

As for the code value, similarly to the first example, the writing area can be divided to define a different code value.

It should be noted that the area formed with a dot pattern other than the writing areas cannot be written in.

According to the second example, where the writing area is laid out within the predetermined area can be easily understood by reading XY coordinate values.

Third Example

Figure 37:
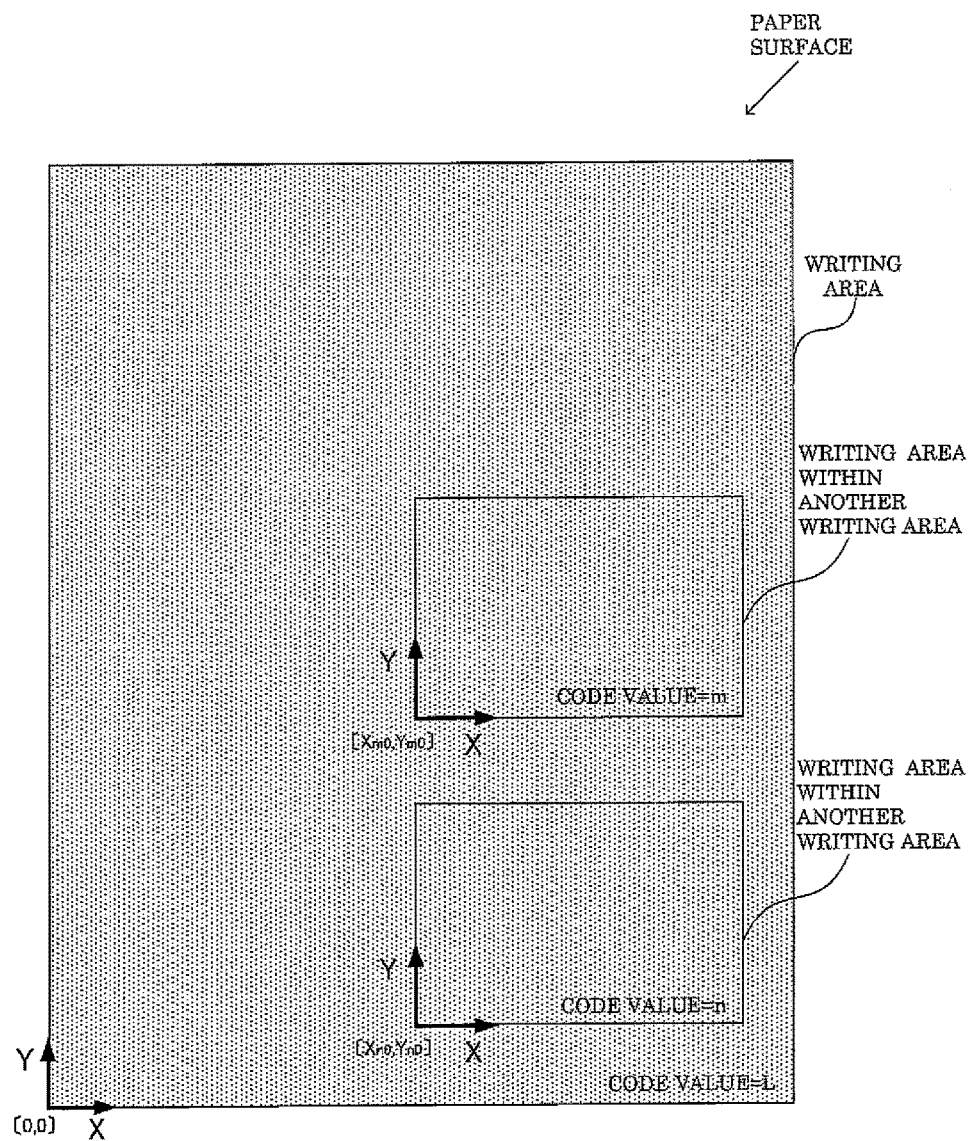
FIG. 37 is a diagram illustrating the function of the medium on which is formed the writing area used for the handwriting input/output system of the invention (9).

In the third example, as shown in FIG. 37, a writing area is further embedded in another writing area.

In FIG. 37, a dot pattern that defines XY coordinate values in a single dot pattern coordinate system with the lower left corner of a predetermined area as the origin and code value L that specifies the writing area is formed over the entire predetermined area. In the two writing areas in this predetermined writing area, XY coordinate values of the lower left corners [Xm0, Ym0], [Xn0, Yn0] and code values m, n that specify the writing areas are defined respectively.

According to this example, small writing areas, such as selection fields, can be easily located within a large writing area for freely writing texts and figures.

If this is to be realized by the first example, when forming a writing area inside another writing area, the writing area should be provided with a vacant portion, which complicates the task of forming the dot pattern.

Further, if a writing area can be formed within another writing area in a single coordinate system, writing can be performed irrespective of the writing area within another writing area by changing input modes. For example, a setting may be provided in which writing in a writing area within another writing area becomes valid only when the input modes were switched or a specific symbol was drawn.

As for the code value, likely to the first example, the writing area can be divided to define a different code value.

In this example, where the writing area is laid out can be easily understood by reading XY coordinate values.

Fourth Example

Figure 38:
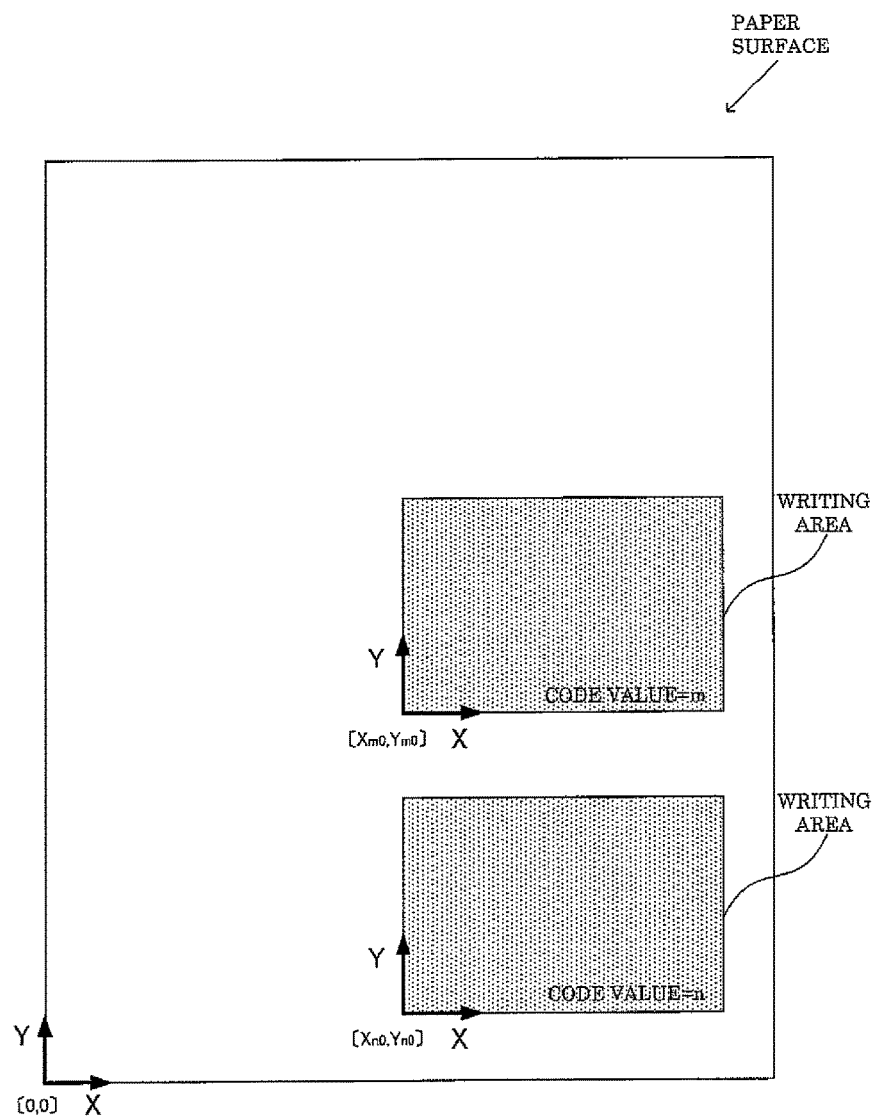
FIG. 38 is a diagram illustrating the function of the medium on which is formed the writing area used for the handwriting input/output system of the invention (10).
Figure 39:
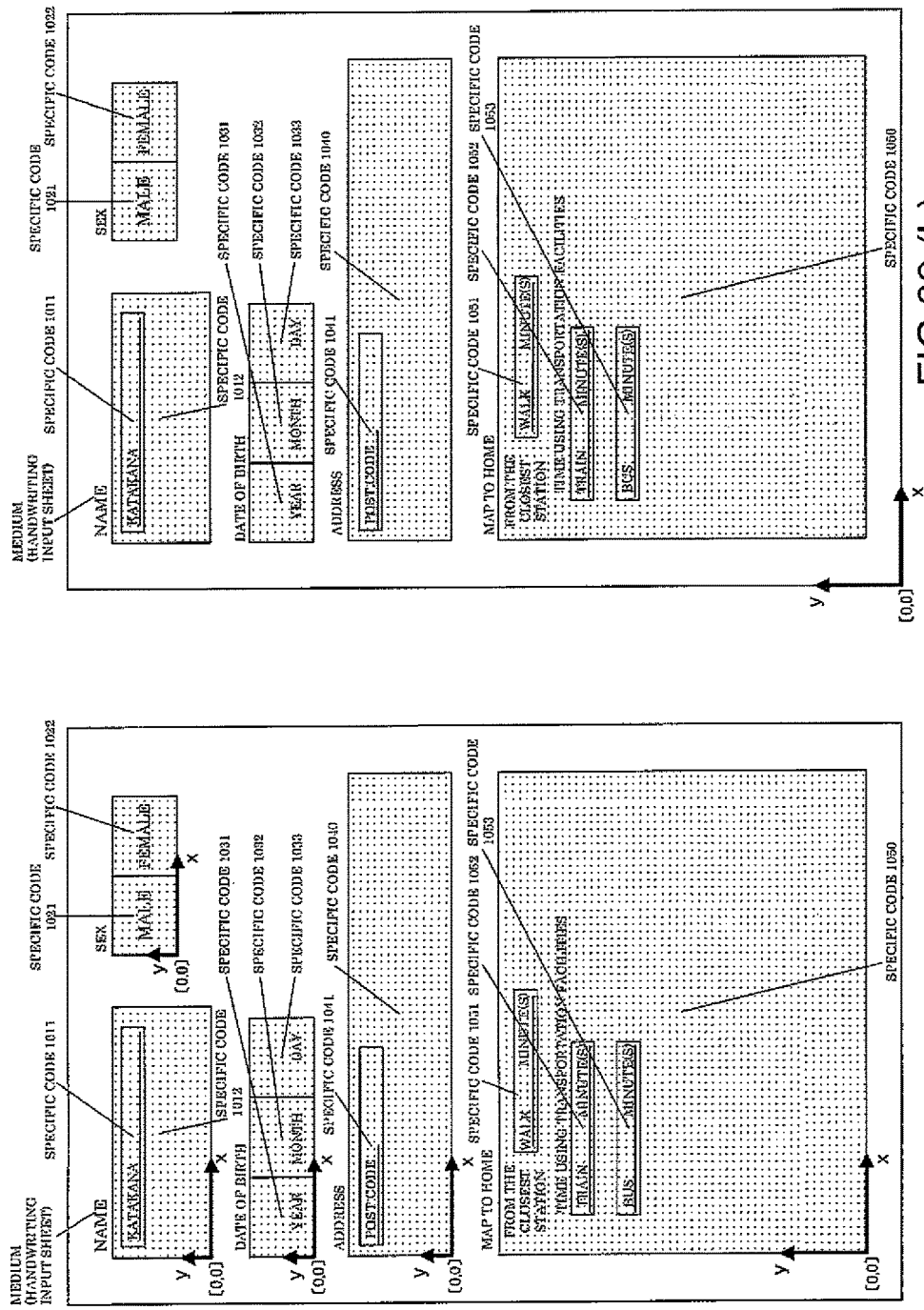
FIGS. 39A and 39B are diagrams illustrating the function of the medium on which is formed the writing area used for the handwriting input/output system of the invention (11).
Figure 41:
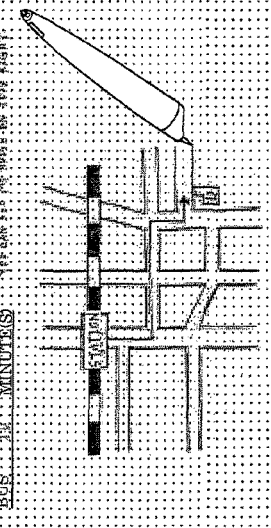
FIGS. 41A and 41B are diagrams illustrating the function of the medium on which is formed the writing area used for the handwriting input/output system of the invention (13).

In the fourth example, as shown in FIG. 38, a single dot pattern coordinate system is defined over the entire predetermined area, and the writing area is formed with a dot pattern that defines XY coordinate values in this coordinate system and a code value that specifies the writing area.

In FIG. 38, a single coordinate system with the lower left corner as the origin is defined in a predetermined area. In the two writing areas in this predetermined area, XY coordinate values of the lower left corners [Xm0, Ym0], [Xn0, Yn0] and code values m, n that specify the writing areas are defined respectively.

In this example, unlike the second example, no dot pattern is formed in an area other than the writing area.

In this example, if there are a mechanical of a print material, such as a graphic and a text, and a mechanical of a dot pattern, it is possible to prepare the mechanical of the dot pattern by mask processing that automatically lays out the writing area adjusted to the coordinate system of the mechanical of the print material by disposing a mask, enabling easy issuance of a dot pattern.

Further, as XY coordinate values are read out when reading a dot pattern, where the writing area is laid out in a predetermined area is understood, which can be used, for example, for a research of studying an advertisement effect depending on the location on a paper surface.

It will be appreciated that, while the above descriptions are all described using the dot pattern coordinate system, the same goes for the writing area coordinate system converted from the dot pattern coordinate system.

FIGS. 39A and 39B are diagrams showing a document, which is a specific example where a plurality of writing areas are defined on a medium.

FIG. 39A is a diagram showing such a document on which the XY coordinate values of the origin and a specific code that instructs specifying of a writing area are defined.

In FIG. 39A, "KATAKANA" writing area is defined within "NAME" writing area,

"POST CODE" writing area within "ADDRESS" writing area, "WALK MINUTE(S)," "TRAIN MINUTE(S)," "BUS MINUTE(S)" writing areas within "MAP TO HOME" writing area.

Further, "SEX" writing area is divided into "MALE" and "FEMALE" writing areas, "DATE OF BIRTH" writing area is divided into "YEAR," "MONTH," and "DAY."

Such layouts of the writing areas are made possible by allocating a different specific code to each area.

FIG. 39B is a diagram showing that, in such a document, XY coordinate values of the origin are not defined in each writing area and only a specific code that instructs specifying of the writing area is defined.

Having such a configuration, the position of written information can be located in the entire medium surface.

Figures 40A, 40B:
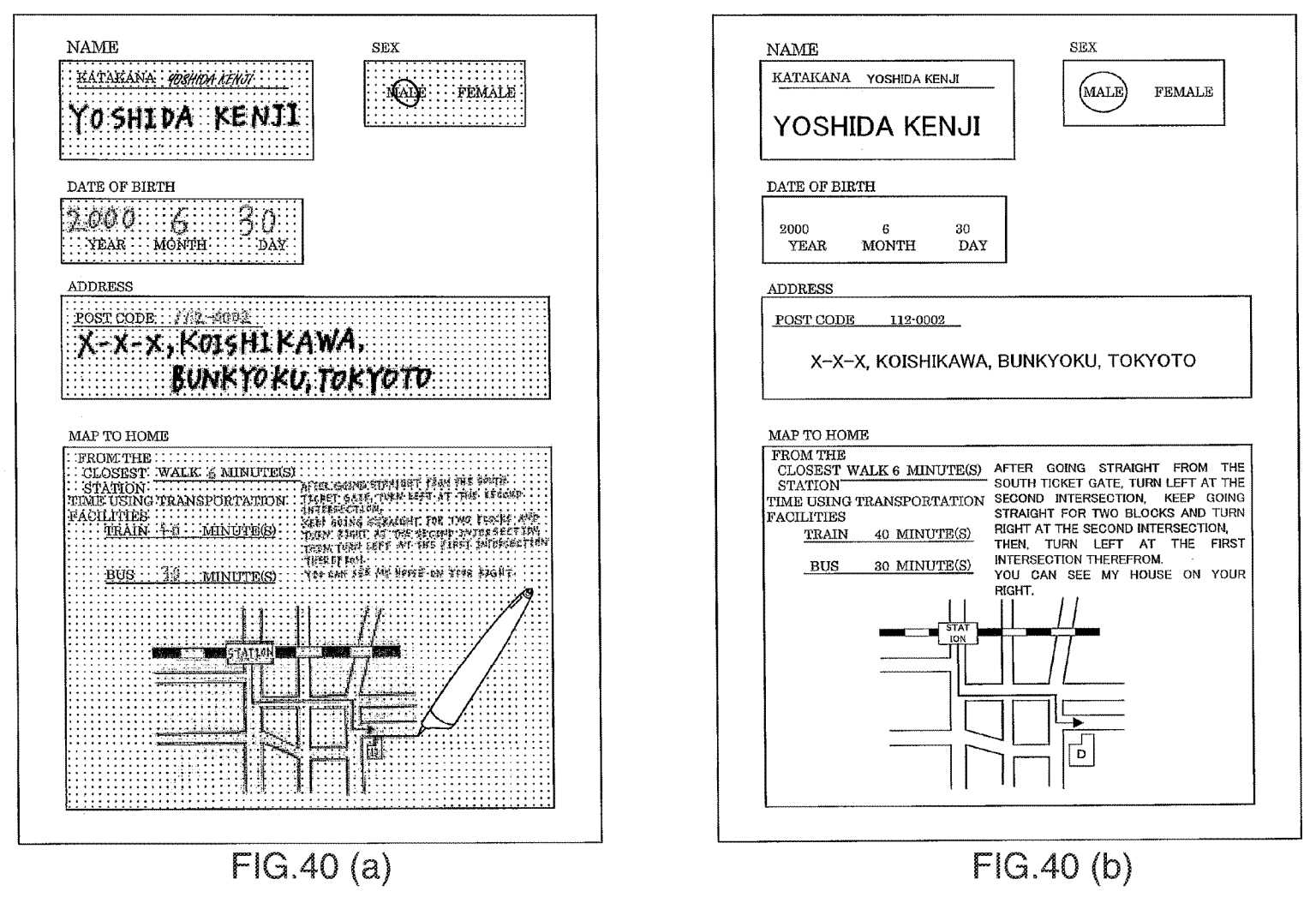

FIGS. 40A and 40B are diagrams showing the states of the documents of FIGS. 39A and 39B after actual handwritten input.

FIG. 40A is a diagram showing the document of FIG. 39A after actual handwritten input.

FIG. 40B is a diagram showing a state in which, after receiving handwritten input of FIG. 39A, the result of processing performed by information processing unit 11 is displayed on display 6 or output by printing.

While the details are described later, handwriting input/output system 1 of the invention performs output as shown in FIG. 40B by recognizing the letters, characters, and figures handwritten input by some methods.

<Printing a New Dot Pattern>

In handwriting input/output system 1 of the invention, additional handwriting input can be performed on a print material that is reflected handwritten input by information processing unit 11.

FIG. 41A is a diagram showing medium 2 on which trajectory information recognized by trajectory recognition unit 9 and a dot pattern are superimposed and printed. While not shown in the drawings, medium 2 shown in FIG. 41A may be newly printed with a dot pattern different from the dot pattern printed on medium 2 on which handwriting input is first performed.

FIG. 41B is a diagram showing medium 2 on which the result of processing performed by information processing unit 11 is printed by superimposing and printing a dot pattern thereon. While not shown in the drawings, medium 2 shown in FIG. 41B may be newly printed with a dot pattern different from the dot pattern printed on medium 2 on which handwriting input is first performed.

<Braille, Bank>

Also, medium 2 may be further provided with guide bank 38 (narrow convex portion) or Braille 39.

Figure 42:
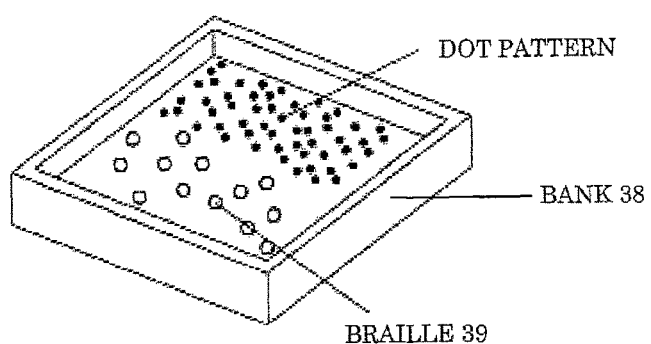
FIG. 42 is a diagram illustrating the function of the medium on which is formed the writing area used for the handwriting input/output system of the invention (14).
Figure 43:
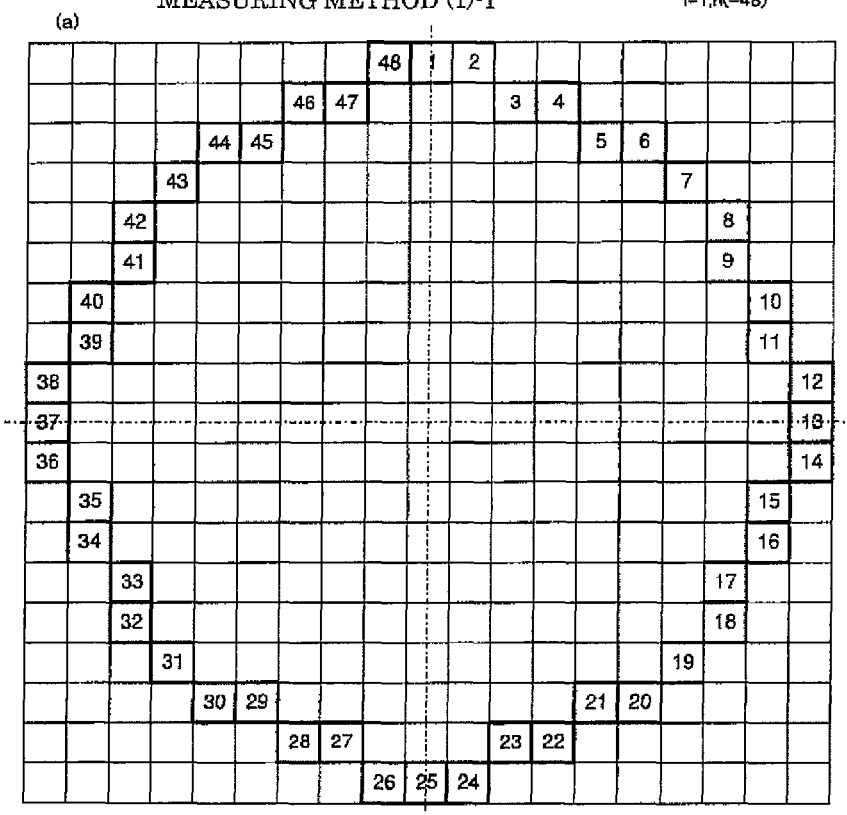
FIG. 43 is a diagram illustrating the method for calculating the direction and angle of the inclination of the imaging unit used for the handwriting input/output system of the invention (1).
Figure 45:
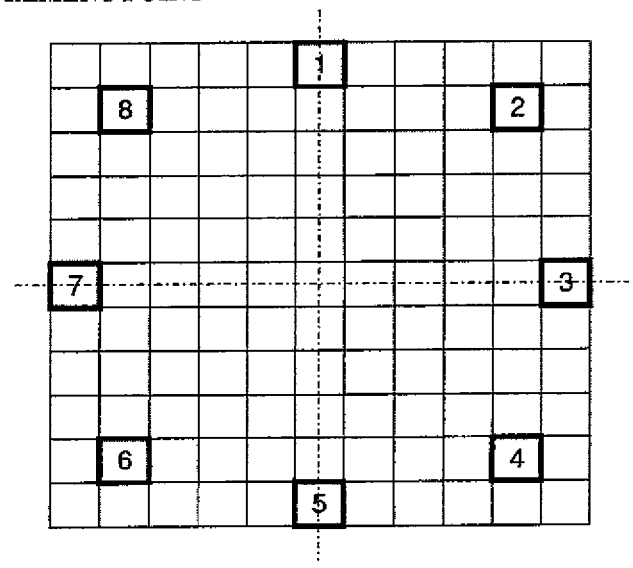
FIG. 45 is a diagram illustrating the method for calculating the direction and angle of the inclination of the imaging unit used for the handwriting input/output system of the invention (3).
Figure 47:
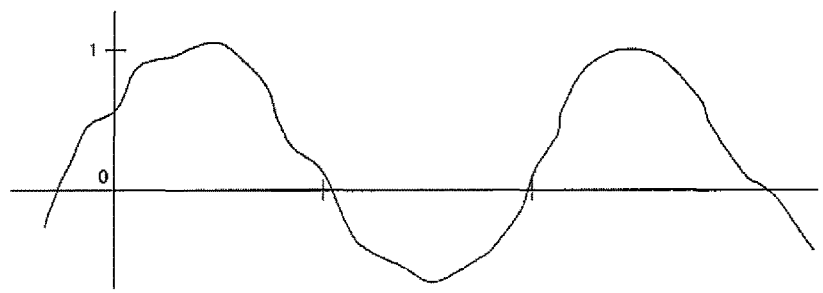
FIG. 47 is a diagram illustrating the method for calculating the direction and angle of the inclination of the imaging unit used for the handwriting input/output system of the invention (5).

FIG. 42 shows a writing area with guide bank 38 provided on the periphery, and the projections of Braille 39 are provided together with a dot pattern on the writing area. Having guide bank 38 in this way, even when a visually impaired user uses the handwriting input/output, the user can understand the position of the writing area. Having Braille 39 and the dot pattern in the same area, even when a visually impaired user uses the handwriting input/output, input efficiency close to equivalent to physically unimpaired people can be maintained.

<Dot Pattern Analysis Unit>

Dot pattern analysis unit 8 calculates XY coordinate information and code information defined by a dot pattern by analyzing the code of the image data according to the information input/output method using a dot pattern used in the above-described GRID1.

In handwriting input/output system 1 of the invention, as the code of the trajectory written (traced) by a user on the medium with imaging unit 7 is sequentially analyzed by dot pattern analysis unit 8, the XY coordinate information and code information express this trajectory (trajectory information).

<Trajectory Recognition Unit>

Trajectory recognition unit 9 recognizes a letter, character, and figure written on the medium based on the change in trajectory information.

The method of recognizing the trajectory is a method of handling a letter, character, and figure as a graphic and referring to the XY coordinate patterns of the letter, character, and figure in database, just as in general OCR (Optical Character Reader).

Here, particularly in this invention, the content to be written in the writing area can be specified in advance using code information. That is, by referring to a letter, character, and/or figure information pattern table that is categorized in advance, the trajectory information can be recognized with high accuracy. Specifically, if only Arabic numerals are designated to be written in advance, trajectory recognition unit 9 refers only to the table of Arabic numerals whereby the recognition rate improves. If no Arabic numeral is recognized, all letters, characters, and figures in database may be referred to as usual.

Further, after performing the above-described trajectory recognition, the semantic information of the letter, character, and/or figure written in the writing area or a word formed by one or plurality of letters and characters can be converted into a semantic information code by referring to a predefined semantic information code table (a dictionary). That is, if "Tokyoto Bunkyoku" in kanji is written in, trajectory recognition unit 9 recognizes the pattern of each kanji letter "To" "Kyo" "To" "Bun" "Kyo" "Ku," then refers to a semantic information code table (a dictionary) and converts into a semantic information code defined as corresponding to "Tokyoto" and a semantic information code defined as corresponding to "Bunkyoku." In this way, the information processing unit can recognize that the name of places "Tokyoto," "Bunkyoku" were input.

In addition, referring to the semantic information code table (a dictionary) also assists pattern recognition of letters and characters. For example, when the letter "To" of "Tokyo" in kanji is poorly written by a user and hard to be recognized by trajectory recognition unit 9 as to whether "To" or "Sha" in kanji is written, if the word "Tokyo" is defined in the semantic information code table and the word "Shakyo" is not defined (the word "Shakyo" normally does not exist), trajectory recognition unit 9 can recognize that the user wrote the letter "To."

<Timer>

Handwriting input/output system 1 of the invention may further comprise timer 15. Timer 15 has a function to detect time information.

Here, time information is under the following conditions:
in the order of the writing history touched and drawn by imaging unit 7 on the writing area
a collection of time from when imaging unit 7 touches on the writing area until separates from writing area 7, ignoring time during which imaging unit 7 is apart from the writing area after starting writing. That is, except for time during which imaging unit 7 is apart from the writing area, time for handwriting input/output and the order is described based on the time when (1) starts and ends. In this way, time when a letter or character is written can be understood, accuracy of character recognition is improved, and the character input speed of the subject person can be understood.

By recording all times when imaging unit 7 touches on and separates from the writing area, it is understood that how long it was taken to answer a questionnaire or select a product. Then, by comparing with the ordinary case, difficulty of a question and the way of thinking, the character, age, and sex of the writer can be understood.

Also, by understanding the moving speed of the pen, brushstroke of a letter or character or difficulty of writing the letter or character can be analyzed, and, further, mental state and physical state of the writer can be anticipated.

<Angle Measuring Unit, Angle Change Recognition Unit>

Handwriting input/output system 1 of the invention may further comprise angle measuring unit 16 and angle change recognition unit 17. Angle measuring unit 16 and angle change recognition unit 17 measure and recognize the inclination of imaging unit 7 with reference to the medium surface.

As for the method of measuring angle and recognizing a change in angle, the above-described calculation method of inclination α of the pen can be used as is. In such a case, even if imaging unit 7 does not comprise the pen, the inclination can be measured and recognized. Also, as shown in FIGS. 43 to 47, the inclination calculation method disclosed in the invention of an information output device according to Japanese Patent Application No. 2005-267565 (PCT/SG2006/000267) can be used. However, other methods than these may also be used.

It should be noted, in recognizing a change in angle with reference to the medium surface by imaging unit 7, the criteria of measuring and recognizing an inclination can be an angle when imaging unit 7 touches on the medium surface as well as an angle when imaging unit 7 stands perpendicular to the medium surface.

<Rotation Angle Reading Unit; Rotation Angle Change Recognition Unit>

Handwriting input/output system 1 of the invention may further comprise rotation angle reading unit 18 and rotation angle change recognition unit 19. Rotation angle reading unit 18 and rotation angle change recognition unit 19 read out and recognize the rotation angle when the imaging light axis of imaging unit 7 stands generally perpendicular and is rotated.

While the method for calculating an angle formed by the orientation of a dot pattern and the orientation of imaging unit 7 was described in the section describing the offset correction, this method can be used as a method for reading and recognizing the rotation angle regardless of the existence of the pen. That is, as the dot pattern is always oriented a certain direction, a difference between angle $\theta_1$ formed by the orientation of the dot pattern and the orientation of imaging unit 7 when standing imaging unit 7 perpendicular to the medium surface and imaging for the first time and angle $\theta_2$ formed by the orientation of the dot pattern and the orientation of imaging unit 7 after predetermined time has elapsed (anticlockwise rotation is defined as the positive direction) can be read out and recognized as the rotation angle.

<Method for Identifying Touching Motion and Flicking Motion>

FIGS. 48A to 48D describe a method for determining a motion of touching on the writing area by imaging unit 7 (touching motion) and a motion of flicking imaging unit 7 off the writing area from the state in which imaging unit 7 touches on the writing area (flicking motion) in handwriting input/output system 1 of the invention.

As shown in FIG. 48A, when imaging unit 7 touches on the writing area, the dot pattern of the writing area can be imaged at the moment when imaging unit 7 touches on the writing area. Then, if imaging unit 7 separates from the writing area, as irradiation light from LED 34 will not reflect on the medium surface any more, C-MOS sensor 35 does not detect the irradiation light from LED 34 (reflection from the medium surface) and, as the result, the dot pattern cannot be imaged as shown in FIG. 48C.

Figure 49:
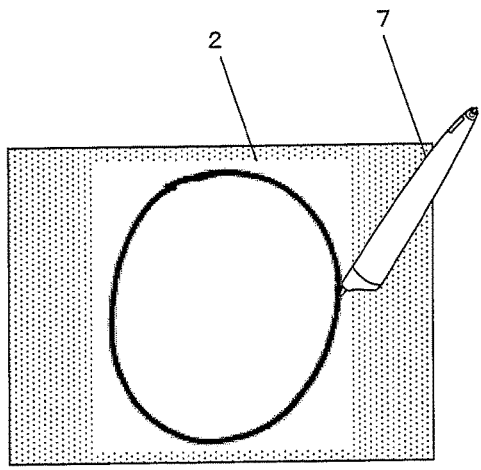
FIGS. 49A to 49E are diagrams illustrating the first operation in the handwriting input/output system of the invention.
Figure 49:
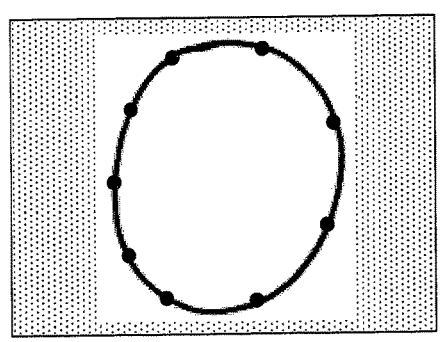
Figure 49:
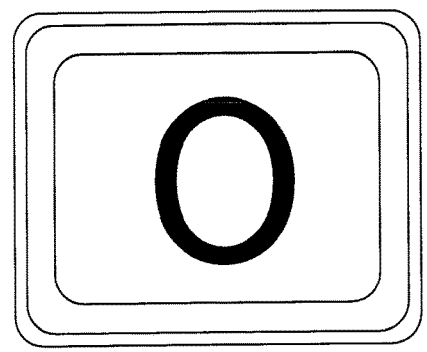
Figure 49:
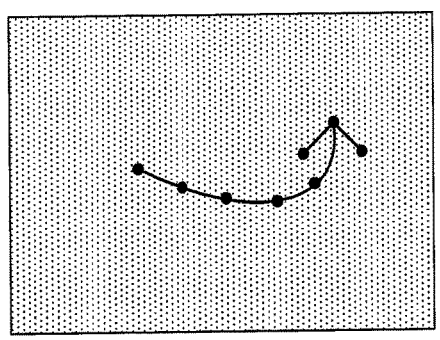
Figure 49:
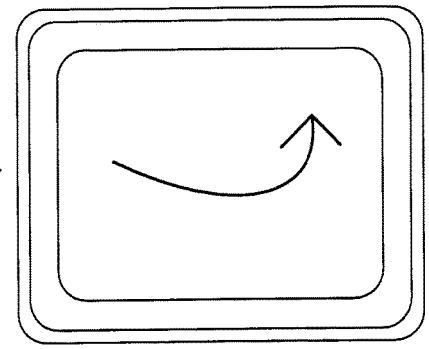

As shown in FIG. 48B, when imaging unit 7 is flicked off the writing area from the state in which imaging unit 7 touches thereon, the dot pattern of the writing area can be imaged at the moment imaging unit 7 touches on the writing area, until which the same goes with the touching motion on the writing area. Then, if imaging unit 7 is flicked off the writing area from the state in which imaging unit 7 touches on the writing area, as the leading edge of imaging unit 7 is still oriented toward the writing area for a predetermined time period, the irradiation light from LED 34 reflects on the medium surface. While C-MOS sensor 35 images the dot pattern of the medium surface, as the moving speed of imaging unit 7 is fast, the dot pattern is blurry imaged as shown in FIG. 49D and cannot be analyzed.

That is, imaging unit 7 analyzes image data imaged after a predetermined time period has elapsed (e.g., in 0.2 seconds) with reference to the moment when imaging unit 7 imaged the dot pattern by touching the writing area and analyzed the image data. If imaging unit 7 does not image a dot pattern (does not detect the reflection light), process instruction unit 10 regards imaging unit 7 as performing the touching motion and transmits information processing unit 11 a process instruction that had been defined in advance as corresponding to the touch motion. If imaging unit 7 images the dot pattern (detects the reflection light), yet the dot pattern is blurred and cannot be analyzed, process instruction unit 10 regards imaging unit 7 as performing the flicking motion and transmits information processing unit 11 a process instruction that had been defined in advance as corresponding to the flicking motion. If the dot pattern can be analyzed, as shown in FIG. 49E, normal handwriting input operation will be performed.

<Process Instruction Unit>

Process instruction unit 10 transmits a process instruction as well as trajectory information based on information recognized by trajectory recognition unit 9 to information processing unit 11.

An instruction to specify a page based on the page code, an instruction to specify a certain writing area based on the specific code, and a variety of instructions based on the action codes, which are defined by the dot pattern printed on the medium surface as described above, are actually instructed by process instruction unit 10 to information processing unit 11.

Also, while the details are described later, process instruction unit 10, instructs information processing unit 11 to execute a variety of operations of the application for handwriting input/output.

Further, process instruction unit 10 instructs information processing unit 11 to execute predetermined processes based on the measured and recognized results by angle measuring unit 16 and angle change recognition unit 17 and the read and recognized results by rotation angle reading unit 17 and rotation angle change recognition unit 19.

<Information Processing Unit>

Information processing unit 11 executes a variety of processes according to the process instructions performed by handwriting input/output system 1 of the invention.

<Server>

Handwriting input/output system 1 of the invention may access server 5 that stores a variety of information if needed.

<Trajectory Recognition Server>

Server 5 can store, for example, information for trajectory recognition. As is employed by a general OCR (Optical Character Reader), a plurality of letters, characters, and figures are defined by being related with XY coordinate patterns and stored.

Also, the letters, characters, and figures are defined by being related with category codes for categorizing them and stored.

Further, by referring to a semantic information code table (a dictionary), letters, characters, and figures are defined and stored by being related with semantic information codes for outputting a word comprising one or a plurality of letters and characters, a figure, or a combination thereof.

Handwriting input/output system 1 of the invention can easily manage even enormous amount (number) of writing areas as the writing areas can be specified using code information as well as XY coordinate information. Particularly, it is significantly advantageous when storing written information in a shared global server that can be used by anonymous people.

<Other Servers>

It goes without saying that server 5 can store a variety of information including a sound, text, image, moving picture, application and other information, in addition to information for trajectory recognition. For example, server 5 can store the application for handwriting input/output. That is, if information processing unit 11 does not have the application for handwriting input/output, the application for handwriting input/output can be searched in the server and executed, provided, however, the application for handwriting input/output on the server may be executed in priority.

It should be noted that the application for handwriting input/output in another information processing unit 11 may be executed instead of the one on server 5.

It will be appreciated that, in addition to the above embodiment, server 5 can be implemented in many ways by modifying the embodiment.

<Application for Handwriting Input/Output>

The following describes the application for handwriting input/output to be run in handwriting input/output system 1 of the invention.

This application is a system that reflects writing on the medium surface to the computer by executing a variety of operations.

Writing on the medium surface may be performed by instructions of process instruction unit 10 to information processing unit 11 on a real time basis while watching display 6 that displays the process result, or performed without watching display 6 and process instruction unit 10 may instruct information processing unit 11 after the writing.

<Writing Operation>

The following describes the writing operation in handwriting input/output system 1 of the invention.

The writing operation is performed by writing a letter, character, or figure to be input in the writing area on the medium surface using imaging unit 7.

Imaging unit 7 images a dot pattern superimposed and printed on the writing area at a predetermined time interval while imaging unit 7 is moving on the medium surface. The subsequent procedure is as described above.

The following describes each operation executed by handwriting input/output system 1.

<Method of Recognizing a Letter, Character, and Figure>

FIGS. 49A to 49E are conceptual views illustrating the first operation of inputting a letter of a text by handwriting.

As shown in FIG. 49A, if a letter is written in the writing area using imaging unit 7, imaging unit 7 sequentially images the dot patterns on the trajectory and dot pattern analysis unit 8 obtains trajectory information comprising XY coordinate information and code information as shown in FIG. 49B.

It should be noted that, while FIG. 49B shows spacing between the imaging positions of dot patterns on the trajectory being wide for convenience of explanation, the spacing is actually smaller.

As shown in FIG. 49C, information processing unit 11 executes the first operation based on the result of recognition on the basis of the trajectory information, and outputs the result on display 6.

When recognizing a figure as shown in FIG. 49D, the recognition method is the same as the one for recognizing a letter or character. The recognition result is displayed on display 6 as shown in FIG. 49E.

Alternatively, XY coordinate information calculated by dot pattern analysis unit 8 may be input/output as is without recognizing a letter, character, or figure. In this case, handwriting input/output system 1 of the invention functions as a pen tablet.

<Second Operation>

As shown in FIG. 50, the second operation is an operation of inputting letters and characters of a comment by handwriting. It should be noted that, while the comment portions are enclosed by dashed lines for convenience of explanation in FIG. 50, the dashed lines do not have to be actually drawn.

The method for recognizing a letter, character, and figure is the same as the one of the first operation.

Information processing unit 11 recognizes the letters and characters of the comment input by the second operation as a comment different from the text.

Figure 51:
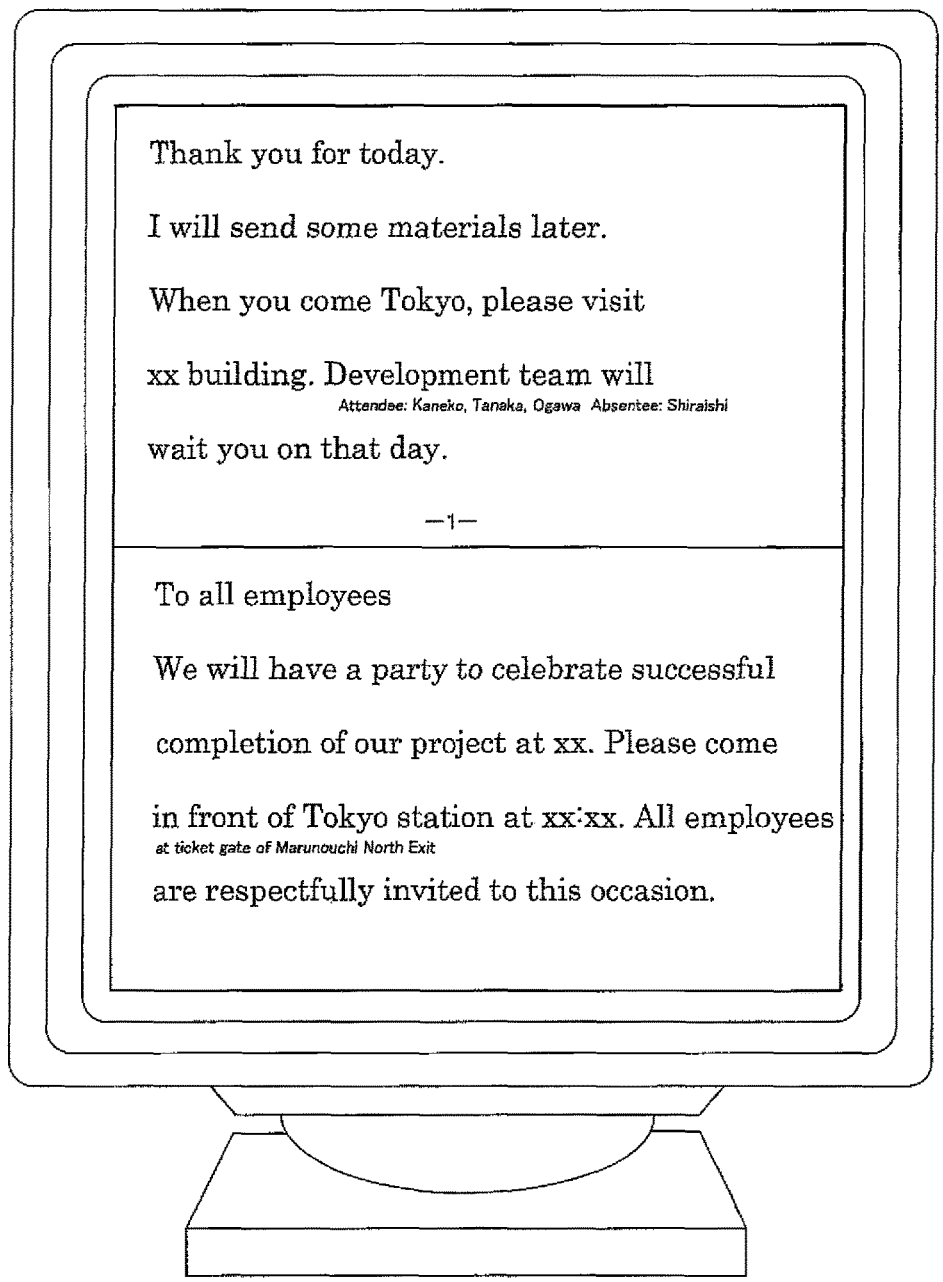
FIG. 51 is a diagram illustrating the second operation in the handwriting input/output system of the invention (2).
Figure 52:
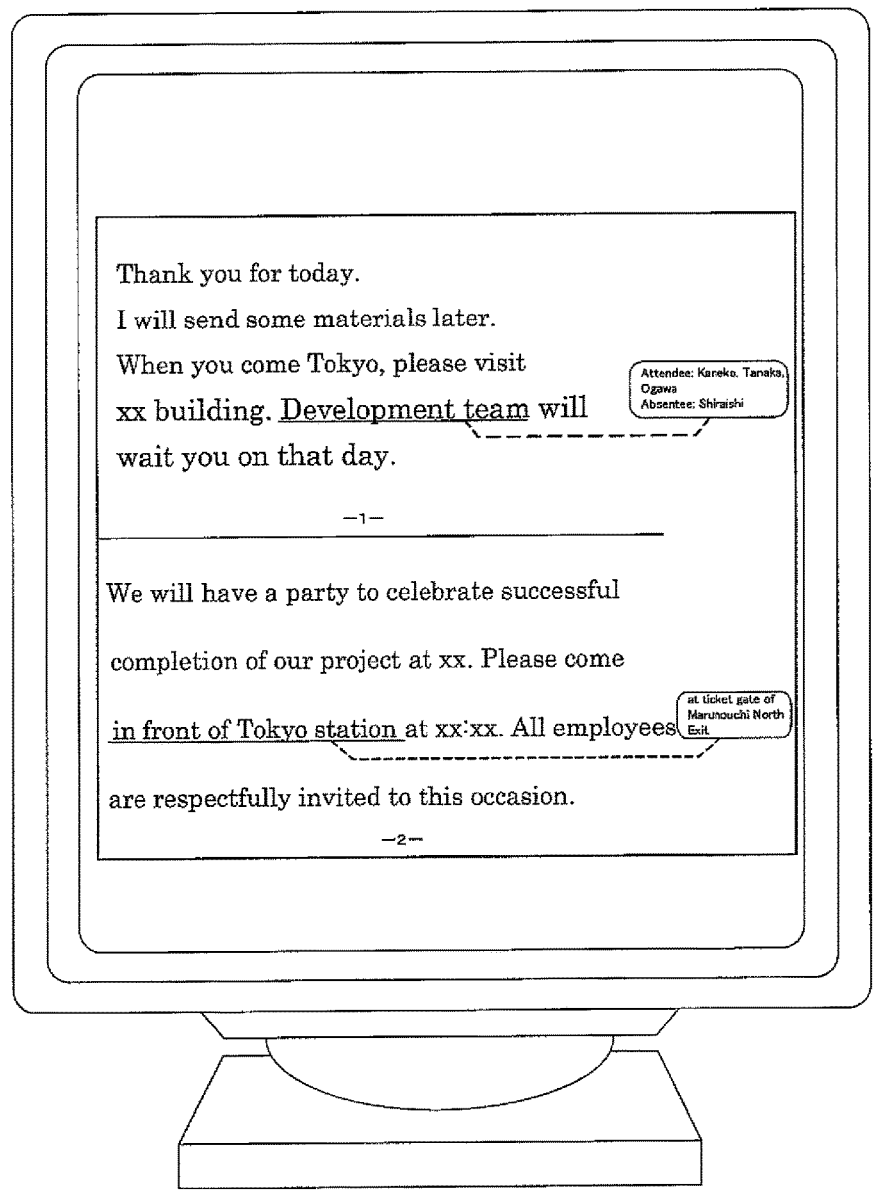
FIG. 52 is a diagram illustrating the second operation in the handwriting input/output system of the invention (3).

With regard to the comment, a description between lines may be reflected by information processing unit 11 as is as shown in FIG. 51, or alternatively, a part of a text where a comment is desired to be inserted may be specified by an underline and the comment may be listed beside the text by information processing unit 11 as shown in FIG. 52.

<Third Operation>

The third operation is an operation for editing a handwritten input letter or character.

Each editing is performed by writing a letter, character, or figure, which is defined in advance as an edit mark by information processing unit 11, using imaging unit 7.

A method for recognizing a letter, character, or figure is the same as the one for the first operation.

FIG. 53 is a diagram illustrating the edit mark used in the editing operation as the third operation of the invention.

A line forming one enclosed area means an edit mark that selects a letter, character, or figure within the area.

Two pairs of lines that do not enclose area means an edit mark that selects a letter, character, or figure between the two pairs of lines.

A tick mark means an edit mark that specifies the target of cutting when cutting and pasting.

Double lines mean an edit mark of deleting (erasing).

"Delete" means an edit mark of deleting (erasing).

"Stet" means cancellation of "Delete" edit mark.

Zigzag line with more than three up and down patterns means an edit mark of cancelling.

Double headed arrow means an edit mark of switching the selected letters, characters, or figures.

Single headed arrow means an edit mark of directly specifying the pasting destination.

Characters (A), (B), (C) means an edit mark that copies (cuts) the selected letter, character, or figure with flag and specifies the pasting position apart from the original position.

However, it will be appreciated that edit marks other than above may also be defined.

FIG. 54 is a diagram showing medium 2 before executing the third operation. Medium 2 is described a text handwritten input by executing the first operation or a text printed as the result of the handwriting input.

Figure 55:
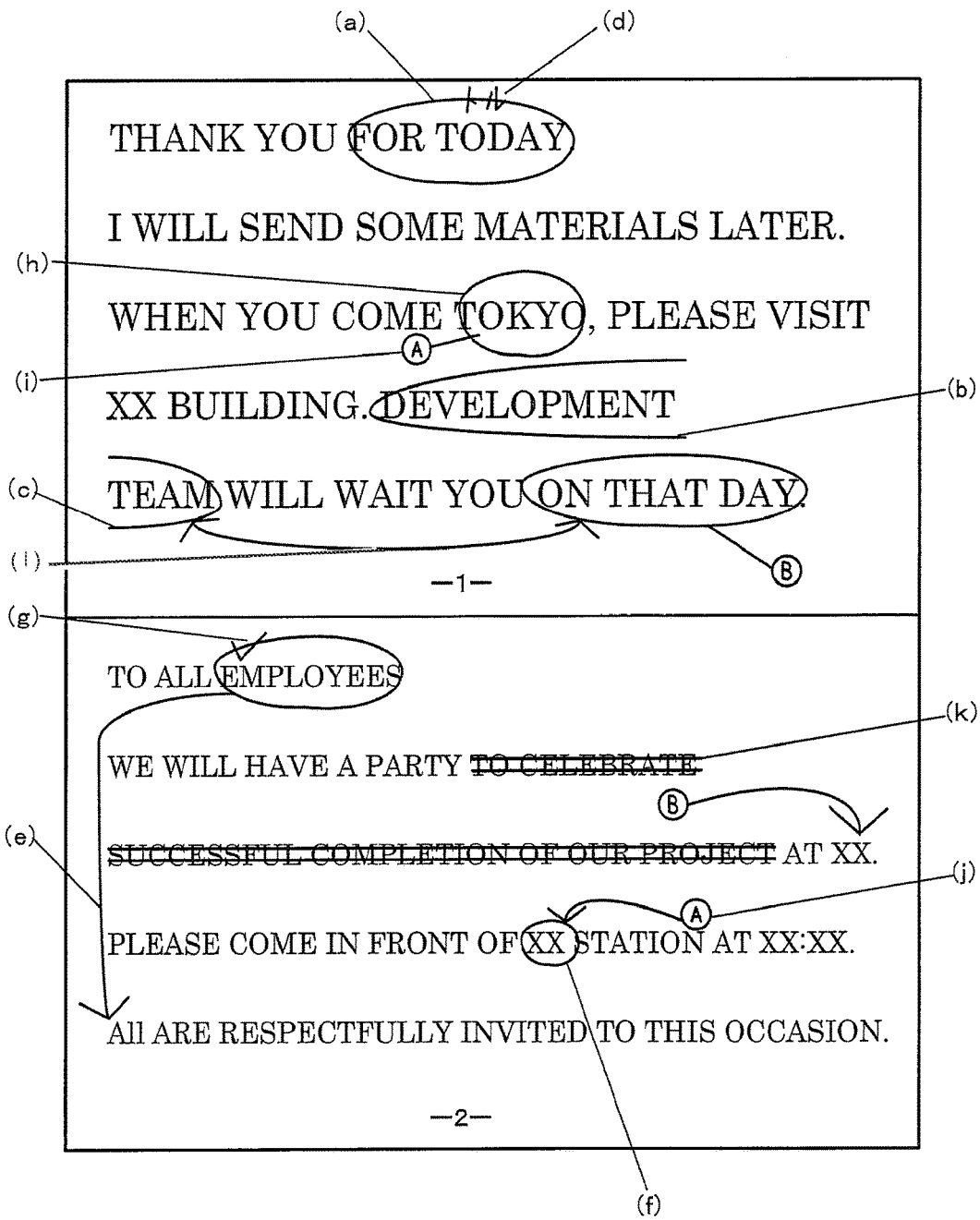
FIG. 55 is a diagram illustrating the third operation in the handwriting input/output system of the invention (3).

FIG. 55 is a diagram illustrating an editing state on medium 2 by the third operation.

If a line enclosing the area is drawn as (a) in FIG. 55, the application for handwriting input/output recognizes the area enclosed by the line as one editing subject.

If a line that does not enclose area and is of a parenthesis-like shape is drawn as (b) in FIG. 55, and if a corresponding line of an ending parenthesis-like shape is drawn in the following area as (c) in FIG. 55, the application for handwriting input/output recognizes the in-between area as one editing subject. Particularly, these lines are used when the editing subject is more than one line.

If, after selecting an editing subject, "Delete" is drawn as (d) in FIG. 55 on the line indicating the editing subject, the application for handwriting input/output deletes the letters or characters of the editing subject.

If, after selecting an editing subject, an arrow that specifies from the editing subject to a predetermined position is drawn as (e) in FIG. 55, the application for handwriting input/output cuts and pastes or copies and pastes the editing subject to the specified area. Here, pasting can be not only inserted in-between letters and characters (or line head or line end), but also performed by specifying the pasting destination as an editing subject as (f) in FIG. 55 to delete and overwrite the original letters and characters.

In this case, if the edit mark of tick for deleting is additionally drawn on the line indicating the editing subject to be copied as (g) in FIG. 55, the application for handwriting input/output processes as cutting and pasting the editing subject, as the result, the subject is deleted as being cut. If the tick is not additionally drawn as (h) in FIG. 55, the application for handwriting input/output processes as copying and pasting.

If edit marks, such as (A), (B), as flags are additionally drawn on an editing subject as (i) in FIG. 55, the editing subject is copied with flag (A), (B), and can be arbitrary pasted any number of times thereafter. Further, the editing subject can be pasted to a separate position such as somewhere in a different page as (j) in FIG. 55.

If double lines are drawn over letters and characters as (k) in FIG. 55, the application for handwriting input/output deletes the letters and characters struck out by the double lines.

If two editing subjects are connected by the edit mark of double-headed arrow as (1) in FIG. 55, the application for handwriting input/output swaps the editing subjects.

Figure 56:
FIG. 56 is a diagram illustrating the third operation in the handwriting input/output system of the invention (4).

FIG. 56 is a diagram showing a text to which is reflected, by the application for handwriting input/output, the result of editing by the third operation on medium 2.

Figure 57:
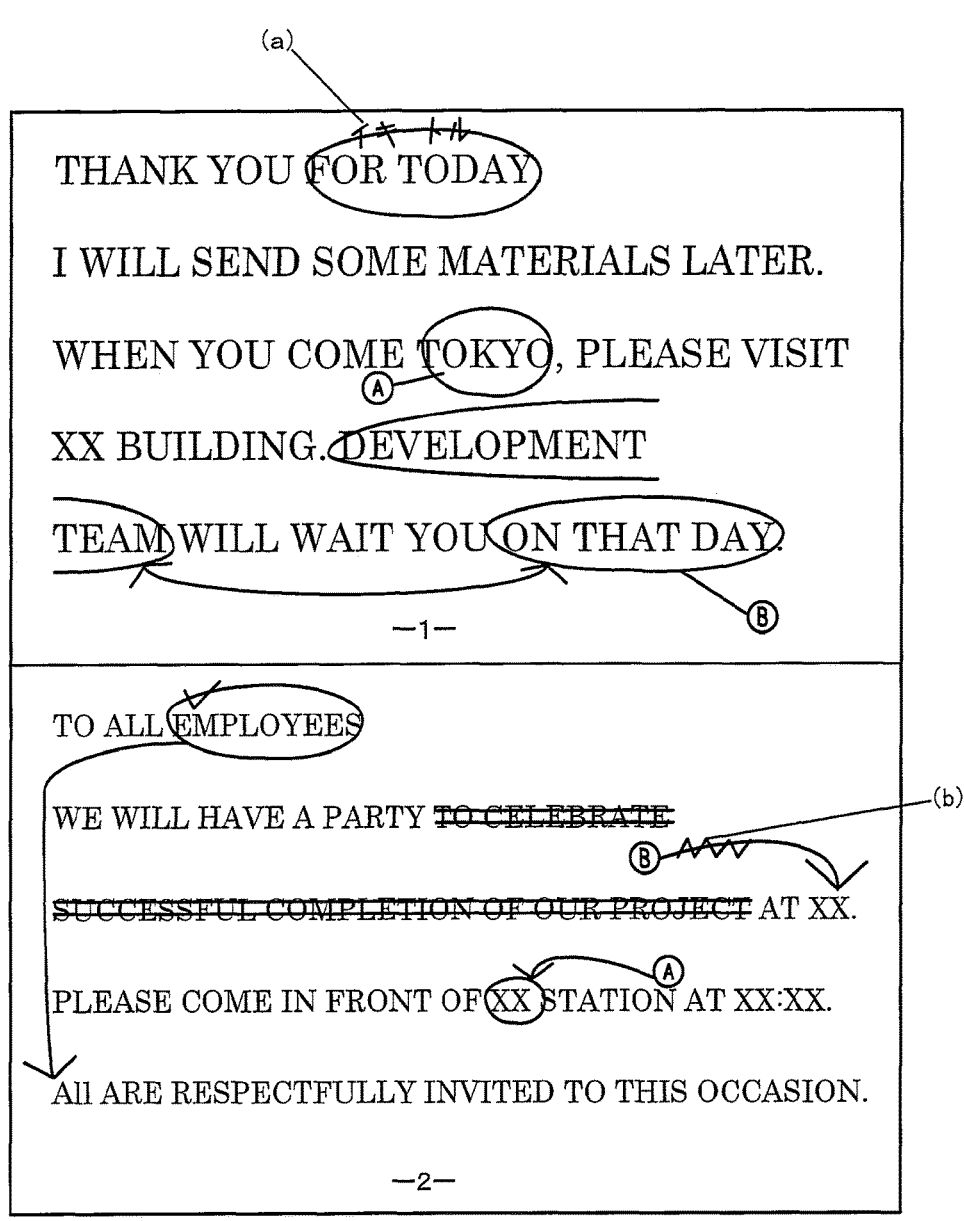
FIG. 57 is a diagram illustrating the third operation in the handwriting input/output system of the invention (5).
Figure 60:
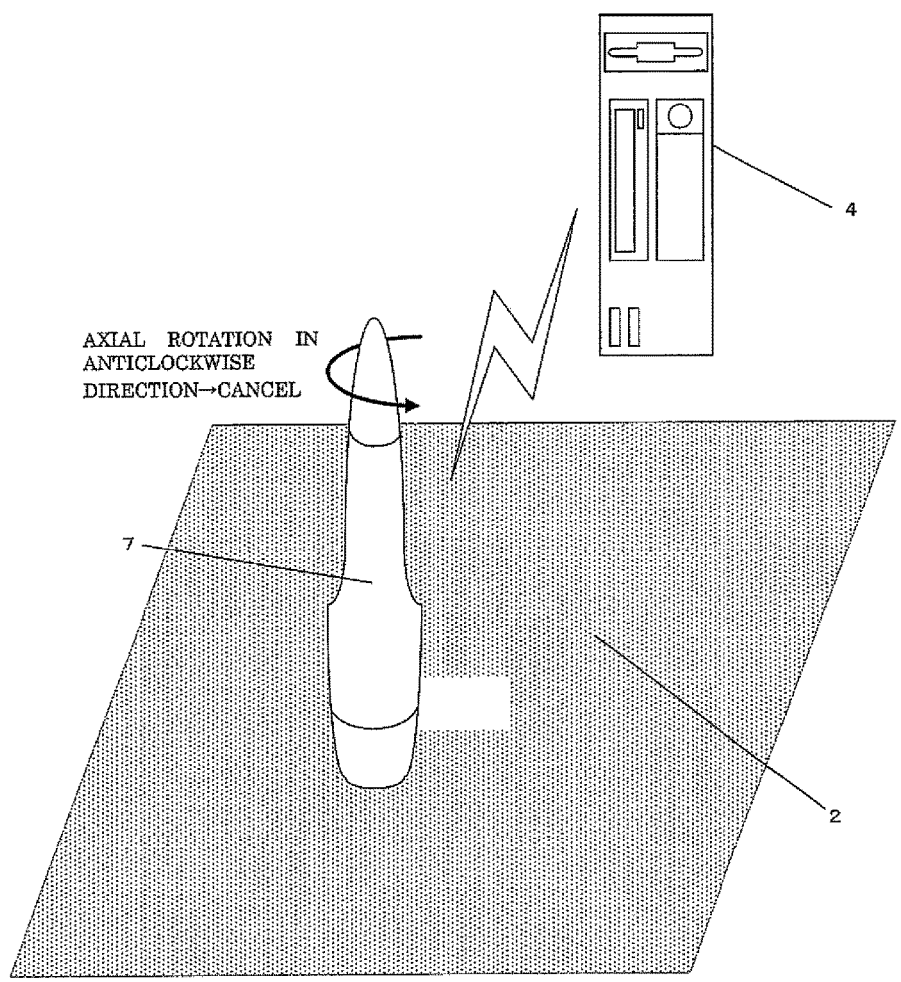
FIG. 60 is a diagram illustrating a method of canceling the changed content of a file by rotating motion of the imaging unit in the handwriting input/output system of the invention.

FIG. 57 is a diagram illustrating an operation that, after performing the editing by the third operation as shown in FIG. 60, cancels the editing and restores to the state before the editing.

If a zigzag line that is the edit mark of cancellation is added to the area where the edit mark of tick is once added and deleted as (a) in FIG. 57, the application for handwriting input/output cancels the deletion of the once deleted area and the area is restored.

If, after once copying and pasting by adding the edit mark of (A) mark, a zigzag line is added to the edit mark of arrow that specifies a pasting destination as (b) in FIG. 57, the application for handwriting input/output restores the state before inserting letters and characters by copying and pasting.

Figure 58:
FIG. 58 is a diagram illustrating the third operation in the handwriting input/output system of the invention (6).

FIG. 58 is a diagram showing a text to which is reflected, by the application for handwriting input/output, the result of the cancellation of editing by the third operation on medium 2.

<Hierarchical Relationship Among Operations>

The following describes the hierarchical relationship among operations.

The third operation may be an operation performed in parallel with the first and second operations.

In such a case, the third operation simultaneously edits the letters and characters of a text and the letters and characters of a comment.

On the other hand, the third operation may be a sub operation that depends on the first and second operations respectively.

In such a case, only the letters and characters of the text is edited when performing the third operation as a sub operation that depends on the first operation, and only the letters and characters of the comment is edited when performing the third operation as a sub operation that depends on the second operation.

It will be appreciated that handwriting input/output system 1 of the invention can be modified and implemented to execute a variety of operations if necessary, in addition to the above-described first to third operations.

<Storing to a Computer>

Figure 59:
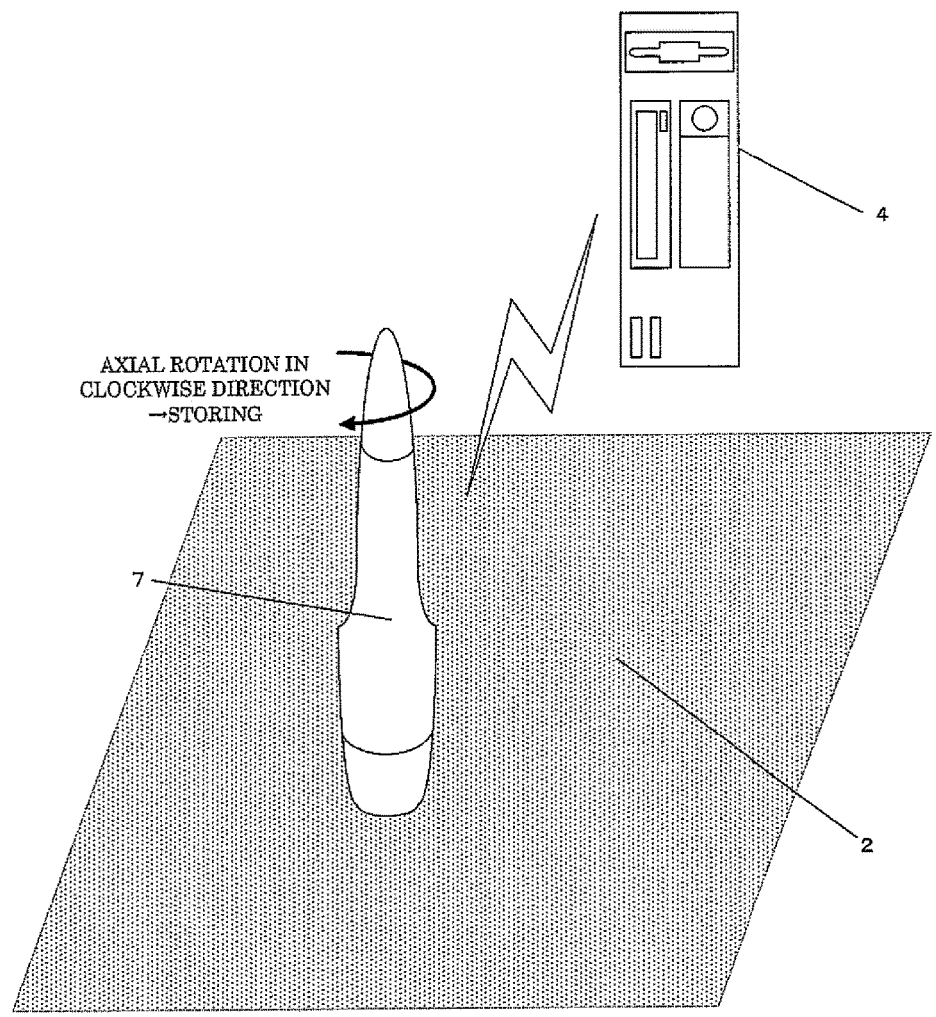
FIG. 59 is a diagram illustrating a method of storing the changed result of a file by rotating motion of the imaging unit in the handwriting input/output system of the invention.

As shown in FIG. 59, by rotating imaging unit 7 in a clockwise direction by a predetermined rotation angle (e.g., 10 degree or more) while touching on the medium surface, process instruction unit 10 instructs information processing unit 11 to store the result of input letters and characters and text composition (the result of changed file content). If imaging unit 7 itself has a function capable of recording an editing history, imaging unit 7 transmits the result of the above text composition to information processing unit 11.

As shown in FIG. 60, by rotating imaging unit 7 in an anticlockwise direction by a predetermined rotation angle (e.g., 10 degree or more) while touching on the medium surface, process instruction unit 10 instructs information processing unit 11 to abandon the result of input letters and characters and text composition (the result of changed file content).

To recognize rotation of imaging unit 7, the above-described method of reading rotation angle and recognizing a change in rotation angle are used.

<Starting Up and Terminating an Application>

Figure 61:
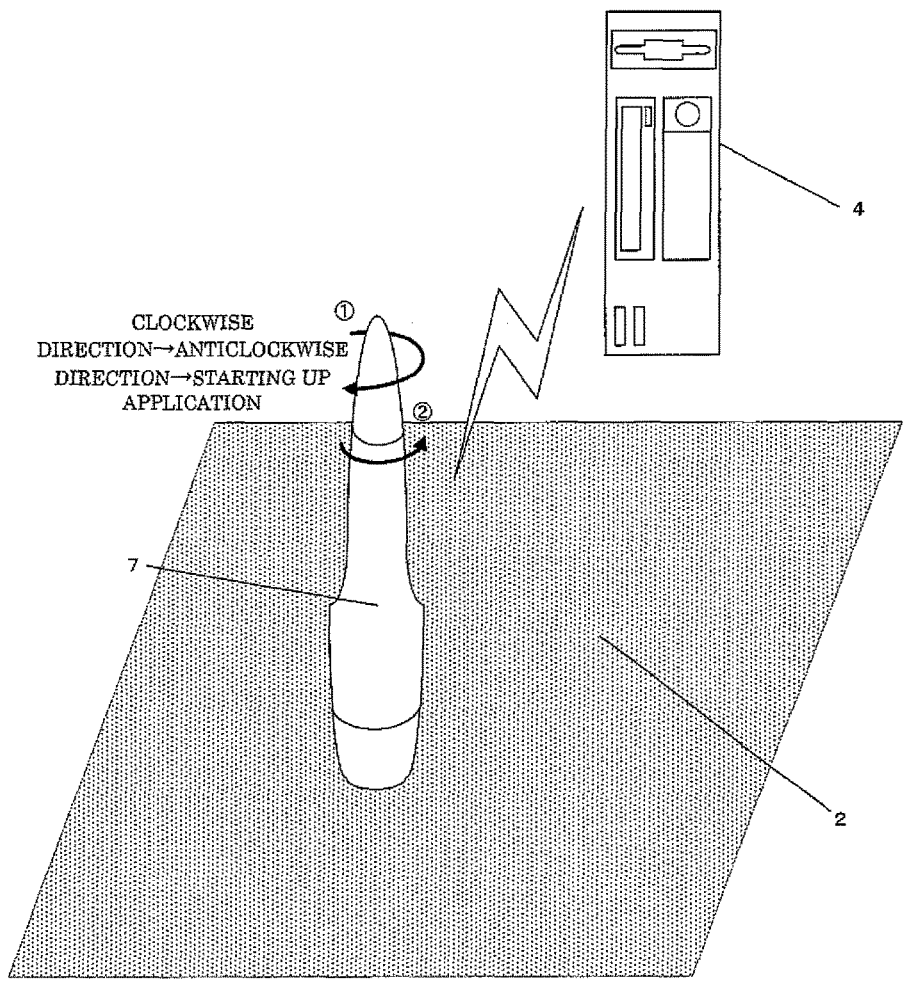
FIG. 61 is a diagram illustrating a method of starting up the application by rotating motion of the imaging unit in the handwriting input/output system of the invention.

As shown in FIG. 61, by rotating imaging unit 7 in a clockwise direction by a predetermined rotation angle (e.g., 10 degree or more) while touching on the medium surface, then rotating imaging unit 7 in an anticlockwise direction by a predetermined rotation angle (e.g., 10 degree or more) within predetermined time (e.g., one second or less), process instruction unit 10 instructs information processing unit 11 to start up the application for handwriting input/output.

Figure 62:
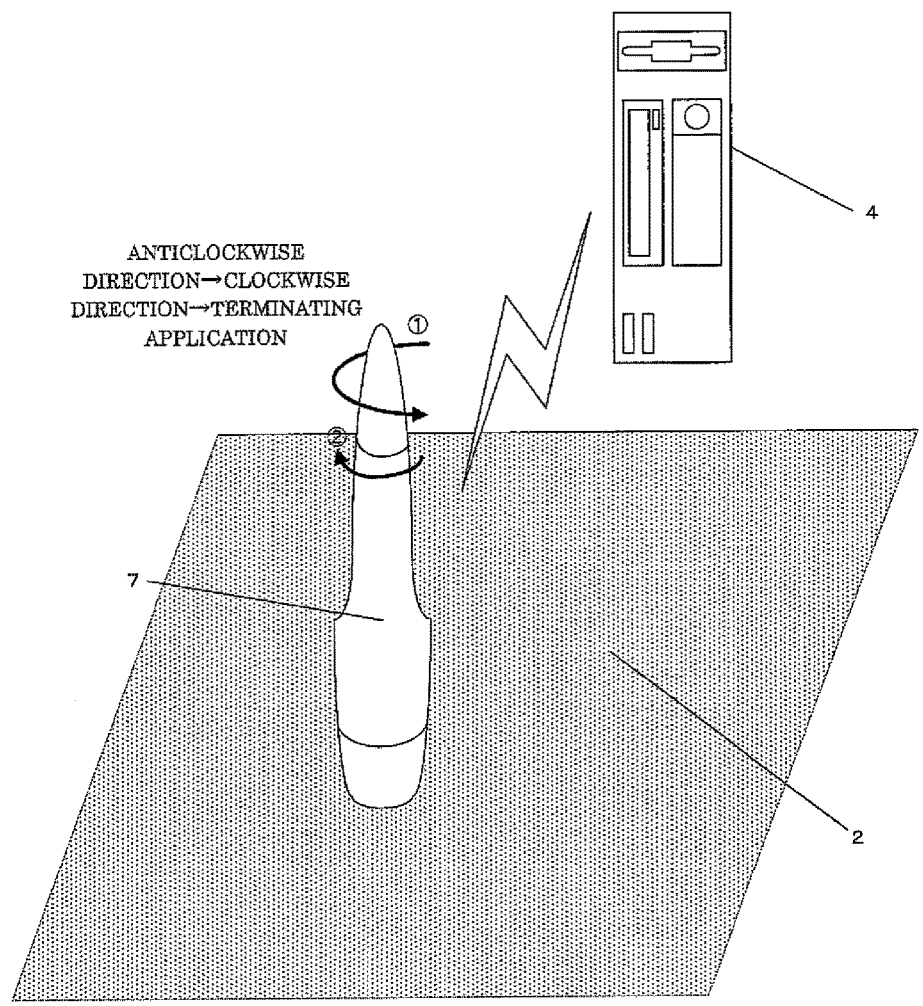
FIG. 62 is a diagram illustrating a method of terminating the application by rotating motion of the imaging unit in the handwriting input/output system of the invention.

As shown in FIG. 62, by rotating imaging unit 7 in an anticlockwise direction by a predetermined rotation angle (e.g., 10 degree or more) while touching on the medium surface, then rotating imaging unit 7 in a clockwise direction by a predetermined rotation angle (e.g., 10 degree or more) within predetermined time (e.g., one second or less), process instruction unit 10 instructs information processing unit 11 to terminate the application for handwriting input/output.

<Operation Switching Motion: Method 1>

The following describes the first method of switching operations with reference to FIGS. 63A to 63D.

This method uses the above-described method of measuring angle and recognizing a change in angle.

Figure 63:
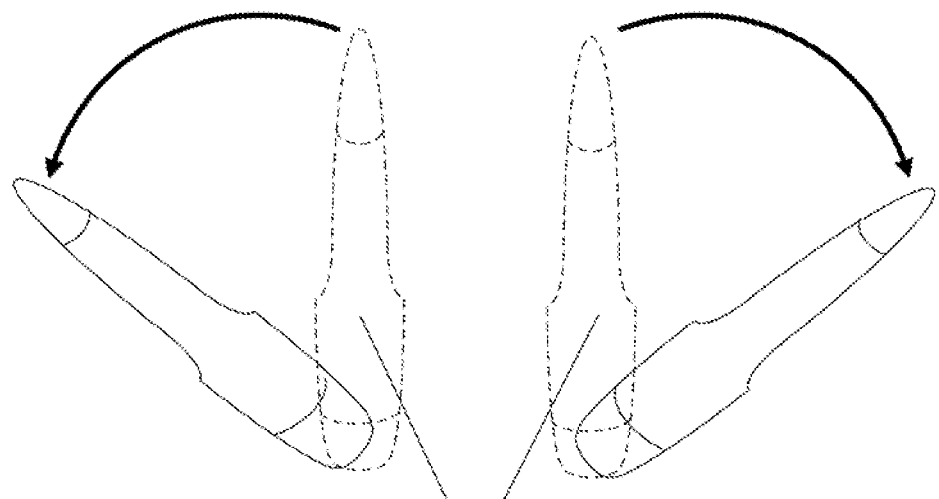
FIGS. 63A to 63D are diagrams illustrating a method of switching operations by tilting motion of the imaging unit in four directions in the handwriting input/output system of the invention (1).
Figure 63:
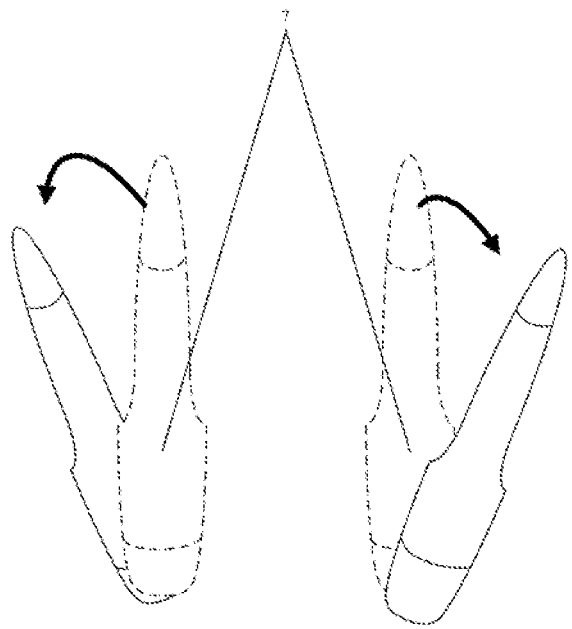

As shown in FIG. 63A, by standing imaging unit 7 on the medium surface and inclining on the left side of the medium surface only by a predetermined angle (e.g., 15 degree or more) with reference to the angle formed by medium surface and imaging unit 7, process instruction unit 10 instructs information processing unit 11 to start the first operation of inputting a text by handwriting.

As shown in FIG. 63B, by standing imaging unit 7 on the medium surface and inclining it on the right side of the medium surface only by a predetermined angle (e.g., 15 degree or more) with reference to the angle formed by medium surface and imaging unit 7, process instruction unit 10 instructs information processing unit 11 to start the second operation of inputting a comment by handwriting.

As shown in FIG. 63C, by standing imaging unit 7 on the medium surface and inclining it on the upper side of the medium surface only by a predetermined angle (e.g., 15 degree or more) with reference to the angle formed by medium surface and imaging unit 7, process instruction unit 10 instructs information processing unit 11 to start the third operation of editing a text and a comment.

As shown in FIG. 63D, by standing imaging unit 7 on the medium surface and inclining it on the lower side of the medium surface only by a predetermined angle (e.g., 15 degree or more) with reference to the angle formed by medium surface and imaging unit 7, process instruction unit 10 instructs information processing unit 11 to terminate the running operation and start the predetermined normal operation (running at the time of staring up).

Figure 64:
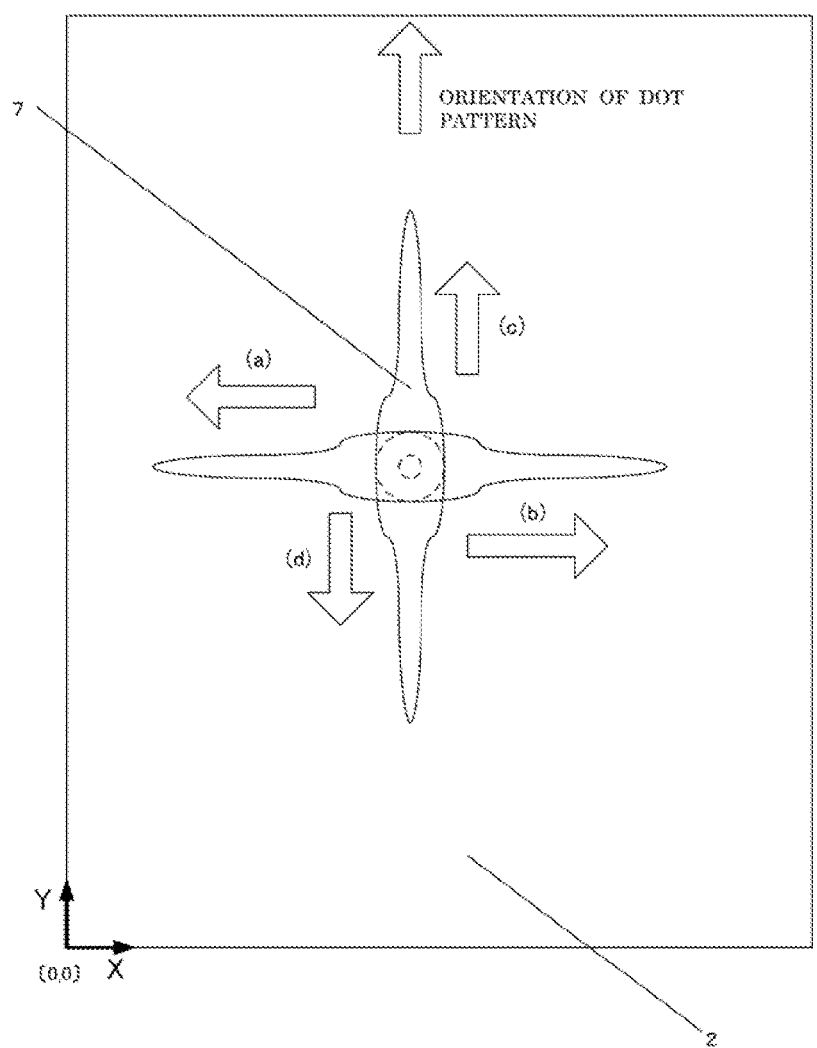
FIG. 64 is a diagram illustrating a method of switching operations by tilting motion of the imaging unit in four directions in the handwriting input/output system of the invention (2).

FIG. 64 is a plan view that is viewed from immediately above, complementing the description of the first method of switching operations.

<Operation Switching Motion: Method 2>

The following describes the second method of switching operations.

Switching of operations may be performed by input means, such as a button, equipped on the main body of imaging unit 7.

In addition to imaging unit 7, switching of operations may be performed via external input means, such as a mouse and a keyboard.

<Operation Switching Motion: Method 3>

The following describes the third method of switching operations.

Imaging unit 7 of an embodiment capable of storing a plurality of pen tips thereinside and switching them may switch operations in conjunction with switching motion of the pen tips.

In such a case, as each operation can be colored, each operation can be easily distinguished on the medium.

Further, when equipping an eraser or a correction pen instead of the pen tip, information processing unit 11 may correspondingly erase a letter, character, or figure instead of writing.

<Determination, Cancellation>

Figure 65:
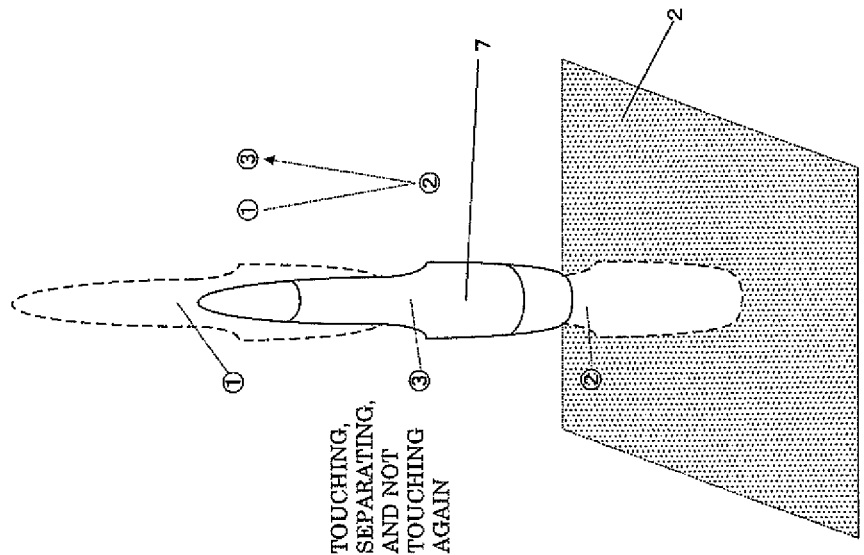
FIGS. 65A and 65B are diagrams illustrating touch motion of the imaging unit in the handwriting input/output system of the invention.
Figure 65:
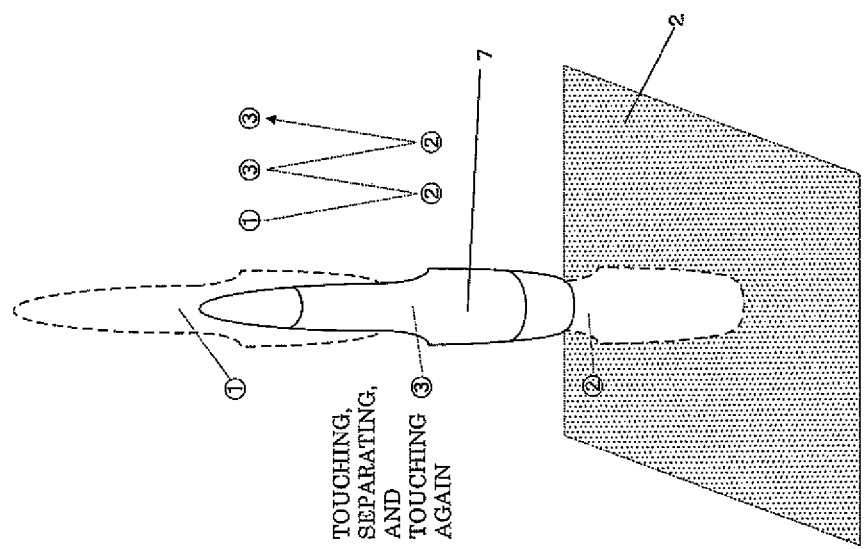

When information processing unit 11 is to determine whether or not to execute a predetermined process, if imaging unit 7 stands perpendicular to the medium surface, touches on the medium surface once, then, touches again the medium surface within predetermined time (e.g., one second or less) as shown in FIG. 65A, process instruction unit 10 instructs information processing unit 11 to determine execution of a process.

If imaging unit 7 stands perpendicular to the medium surface, touches on the medium surface once, then, does not touch again the medium surface within predetermined time (e.g., within one second) as shown in FIG. 65B, process instruction unit 10 instructs information processing unit 11 to determine cancellation of execution of a process.

<Other Usages>

While the above configurations are devised based on the assumption that the writing history remains in medium 2, handwriting input/output system 1 of the invention may be configured without leaving a writing history in medium 2 and handwriting input may be performed while watching display 6.

<Sound Recognition>

While the present invention is a handwriting input/output system, sound recognition and voice guidance functions may be added to assist handwriting input.

<Sound Recording Unit>

Figure 66:
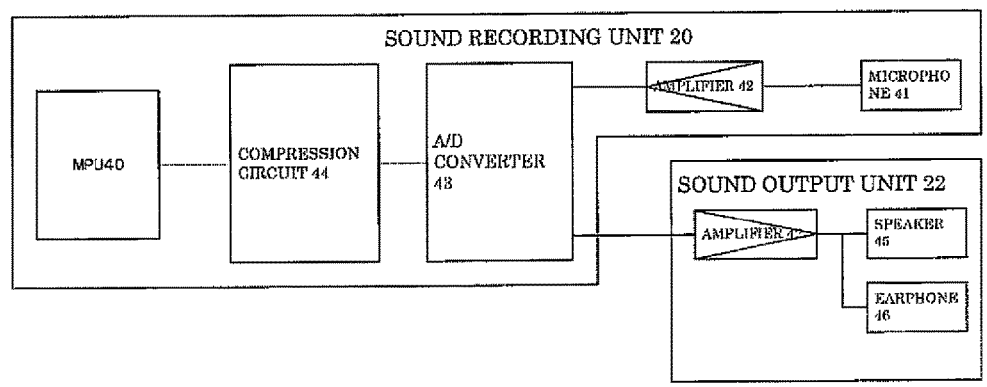
FIG. 66 is a block diagram illustrating the configuration of the sound recording unit and sound output unit in the handwriting input/output system of the invention.

Sound recording unit 20 is configured centering on a micro processing unit (MPU) 40 as shown in FIG. 66. Under the control of the micro processing unit (MPU) 40, sound information input from microphone 41 is processed by A/D converter 43 and compression circuit 44 through amplifier 42, then, stored as digital sound information.

<Sound Recognition Unit>

Sound recognition unit 21 converts recorded sound information to corresponding text information, and process instruction unit 10 transmits information processing unit 11 a process instruction based on the text information together with the text information.

In such a case, by imaging a dot pattern that defines a category code prior to the sound recognition, accuracy of the sound recognition can be enhanced. That is, when searching the database and outputting text information, text information in the sound recognition information table corresponding to the category code is referred to without referring to all text information, thereby enhancing the accuracy of sound recognition.

For example, if "Ueno" is pronounced, it is difficult to determine whether that means the name of a place or the name of a person. However, if "Ueno" is pronounced and input as sound information after a category code signifying "Address" was imaged, sound information of "Ueno" as well as the category code signifying inputting of an address is transmitted to information processing unit 11.

<Switching to Sound Recording Mode>

If handwriting input/output system 1 of the invention records sound instead of handwritten input, switching to the sound recording mode is required by performing a predetermined operation. The following describes the method of switching to the sound recording mode.

<Tracing a Specific Symbol>

As the first method of switching to the sound recording mode, there is a method of switching to the sound recording mode by writing (tracing, drawing) a specific symbol that signifies switching of imaging unit 7 to the sound recording mode. Sound recording unit 20 starts recording sound when trajectory recognition unit 9 recognizes the trajectory of the specific symbol signifying switching of imaging unit 7 to the sound recording mode, and transmits to sound recording unit 20 (or transmitting through process instruction unit 10).

<Flicking the Pen>

Figure 67:
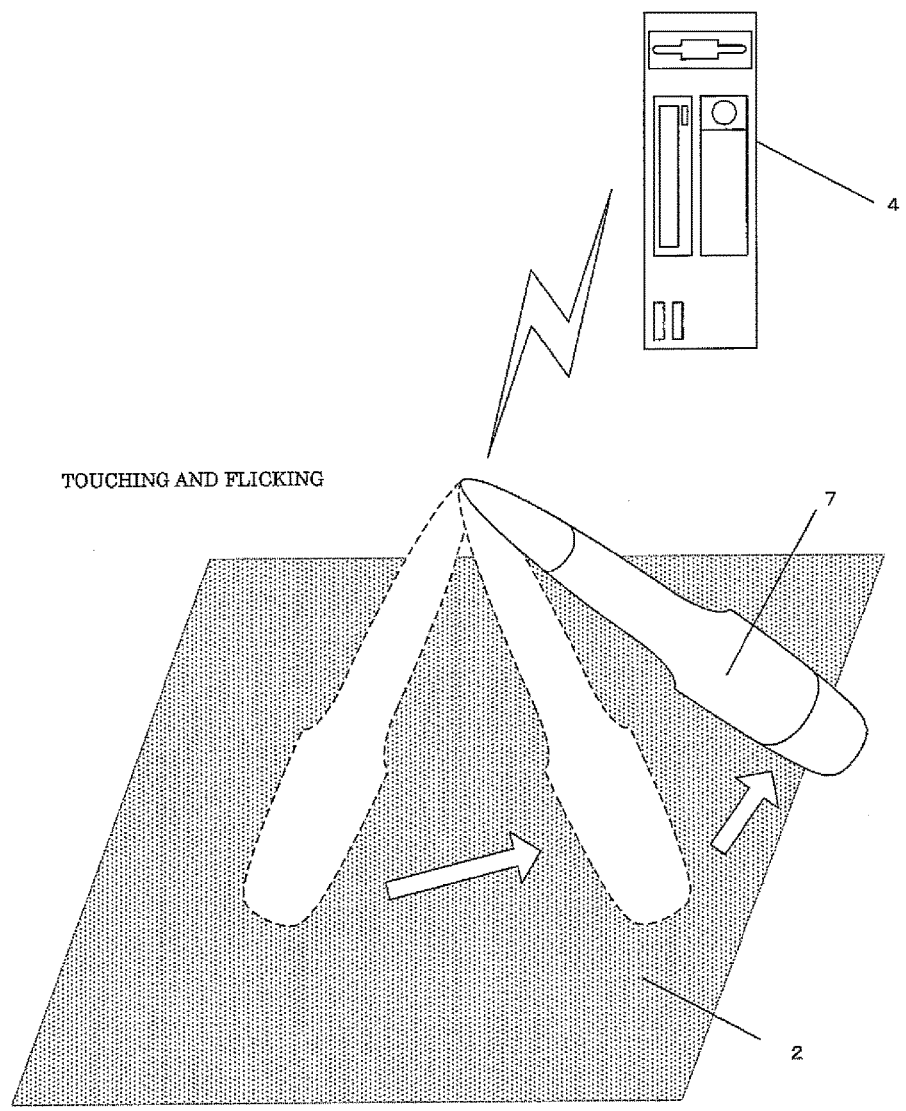
FIG. 67 is a diagram illustrating flicking motion of the imaging unit in the handwriting input/output system of the invention.

As the second method of switching to the sound recording mode, as shown in FIG. 67, there is a method of switching to the sound recording mode by a flick motion of imaging unit 7 from the state it touches on the writing area of the medium surface.

<Switching by Sound Recognition>

As the third method of switching to the sound recording mode, there is a method of switching to the sound recording mode by recording a predetermined sound by sound recording unit 20 and recognizing the predetermined sound by sound recognition unit 21.

When operation is performed by the above methods, process instruction unit 10 instructs information processing unit 11 to input sound instead of handwritten input in the application for handwriting input/output.

<Sound Output Unit>

Sound output unit 22 reproduces a predetermined audio file according to an instruction from process instruction unit 10. The audio file that is digitized and stored in advance is output from speaker 45 or earphone 46 through A/D converter 42 and amplifier 42.

<Voice Guidance>

Handwriting input/output system 1 of the invention may provide voice guidance to a user inputting by handwriting using code information.

That is, as the dot pattern printed on the writing area is defined with a voice guidance code that instructs information processing unit 11 to reproduce sound, if handwriting input is started (imaging unit 7 images a dot pattern), the audio file related in advance to the voice guidance code is played by sound output unit 22.

However, the voice guidance code and the corresponding audio file may also be used for other purposes than voice guidance.

<Grid Sheet>

FIGS. 68 to 72F are explanatory views showing embodiments of using a grid sheet as an information input assistance sheet by attaching it on a display in handwriting input/output system 1 of the invention. This grid sheet is a transparent sheet on which a dot pattern is formed and functions as a touch panel when overlaid and attached on a monitor surface.

Using a grid sheet disclosed in Japanese Patent Application No. 2007-230776 (PCT/JP2008/002188) as medium 2, the medium can be attached on the monitor surface of display 6 to use the monitor surface as a touch panel, provided, however, means other than the grid sheet may be employed.

In addition to using a grid sheet as medium 2, the grid sheet may be used by being overlaid on medium 2. Such a using method is particularly effective, firstly, when a user wants to edit a text or image printed (written) on a medium that is not specially made for handwriting input/output using handwriting input/output system 1 of the invention, secondly when a user hesitates to press imaging unit 7 against the monitor surface.

Figure 68:
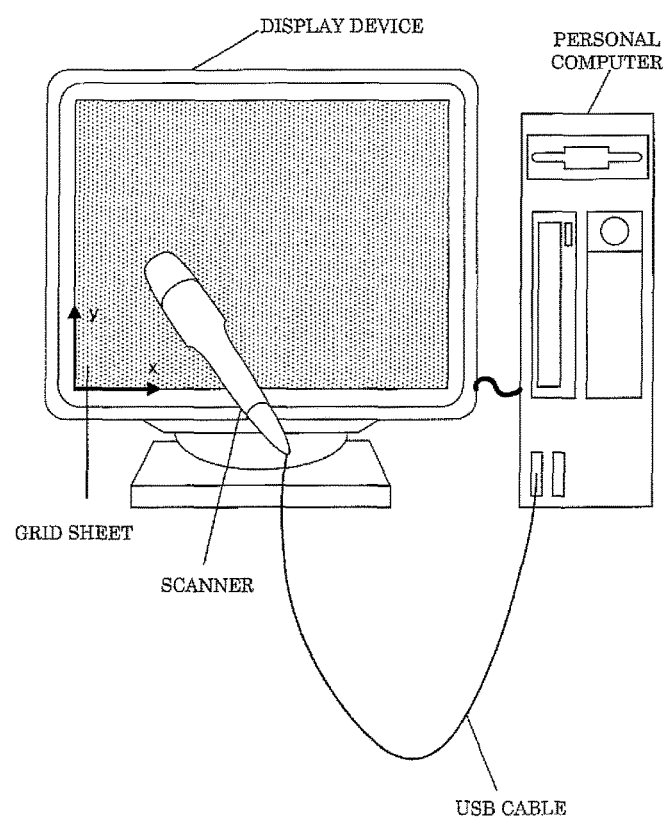
FIG. 68 is a diagram illustrating a grid sheet that is an embodiment of the medium used for the handwriting input/output system of the invention (1).
Figure 69:
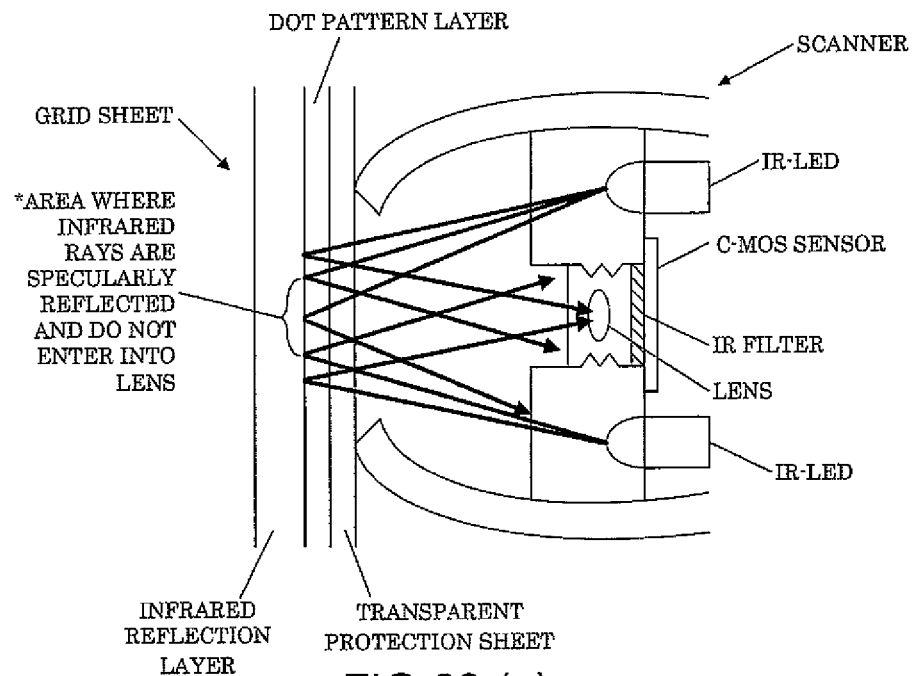
FIGS. 69A and 69B are diagrams illustrating the grid sheet that is an embodiment of the medium used for the handwriting input/output system of the invention (2).
Figure 69:
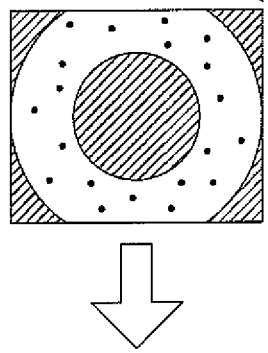

FIGS. 68 to 69B are explanatory views showing an embodiment of using a grid sheet by attaching it on display 6.

FIG. 68 is a diagram of using a grid sheet with an information processing device that is a general purpose computer system. In this embodiment, the grid sheet is attached on a display screen of a personal computer or the like, such as a liquid crystal display (LCD) or a CRT (cathode-ray tube) display. The grid sheet is formed as a transparent film and printed with a dot pattern. While the details are described later, this dot pattern is formed by making XY coordinate values and/or code values into a pattern based on a predetermined algorithm. A scanner as dot pattern reading means is connected to the main body of the computer. A user touches the grid sheet using the scanner in accordance with the instructions on the screen seen through the grid sheet. The scanner reads out the dot pattern, transmits the dot pattern to the personal computer through a USB cable. The central processing unit (CPU) of the personal computer analyzes the dot pattern, calculates XY coordinate values on the grid sheet, then, converts the XY coordinate values to xy coordinate values on the display. In this way, touch panel-style input is realized based on the coordinate value information.

According to this, this sheet realizes touch panel style input, allowing providing a convenient touch panel with low cost. Further, when browsing Internet sites, even information to which link information is not set can be referred to by searching relevant information.

It should be noted that, while FIG. 68 uses a personal computer as an information processing device, the present invention is not limited to this, and the information processing device may be a personal computer, PDA, television receiving device, front and rear projectors, game machine, karaoke machine, mobile telephone terminal, POS terminal, ATM, KIOSK terminal, car navigation system, pachinko, watch, smartphone, or the like. In these devices, the grid sheet is placed on the displaying screen of the display or the screen to make a touch panel-style inputting device.

FIGS. 69A and 69B are section views showing the internal structure of the grid sheet described in FIG. 68.

FIG. 69A is a longitudinal section view showing a state in which the scanner is used to touch the grid sheet.

As shown in FIG. 69A, the grid sheet has a laminated structure comprising an infrared reflection layer, a dot pattern layer, a transparent protection sheet (a protection layer) in the order from the display device side.

The infrared reflection layer is made of a transparent sheet for evaporation made of material that transmits visible light, such as vinyl, polyvinyl chloride, polyethylene terephthalate, and polypropylene, evaporated with infrared reflection material. The infrared reflection layer reflects infrared light, that is irradiated from the infrared irradiation means of the scanner and transmitted through the transparent protection sheet, back to the scanner and transmits visible light. In this way, the irradiation light can be limited only to infrared light irradiated from the infrared irradiation unit, allowing imaging of only bright and clear dot patterns and accurate analysis of the dot codes.

The dot pattern layer is printed with a dot pattern in which dots made of infrared absorbing material, such as carbon ink, are arranged in accordance with a predetermined rule as described later.

The transparent protection sheet is made of material that transmits visible light and infrared rays, such as vinyl, polyvinyl chloride, polyethylene terephthalate, and polypropylene. If a dot pattern is repeatedly touched by the scanner, the dots are worn off, causing a problem of making the dot pattern hard to read accurately. To solve the problem, a transparent protection sheet is provided to prevent dots from wearing and dirt, allowing the sheet to be used for a long period of time.

The scanner incorporates an IR-LED as infrared irradiation means, IR filter that cuts off a predetermined wavelength element of the reflection light, C-MOS sensor as imaging element, and a lens. The scanner images the reflection light of the irradiation light irradiated on the grid sheet. As described above, as the dot pattern is printed with ink having an infrared absorbing characteristic, only the dot portion is imaged in black in the image captured by the C-MOS sensor.

Figure 70A:
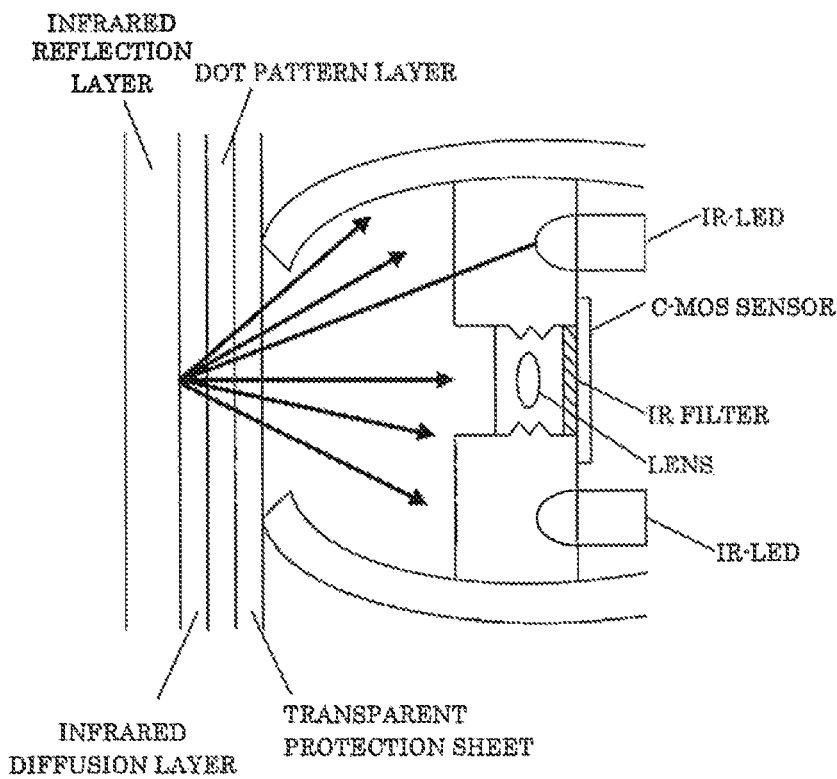
FIGS. 70A and 70B are diagrams illustrating the grid sheet that is an embodiment of the medium used for the handwriting input/output system of the invention (3).
Figure 70B:
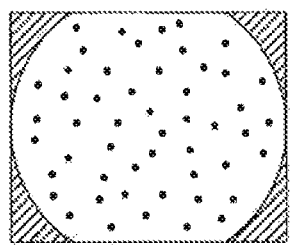
Figure 72:
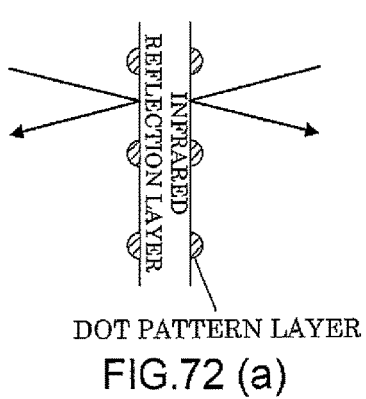
FIGS. 72A to 72F are diagrams illustrating the grid sheet that is an embodiment of the medium used for the handwriting input/output system of the invention (5).
Figure 72:
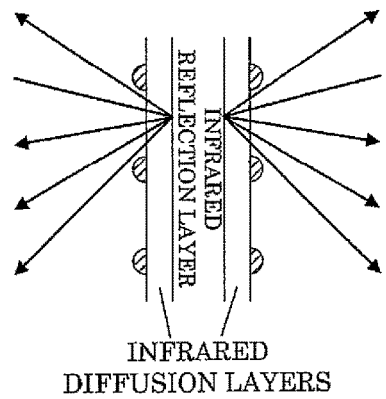
Figure 72:
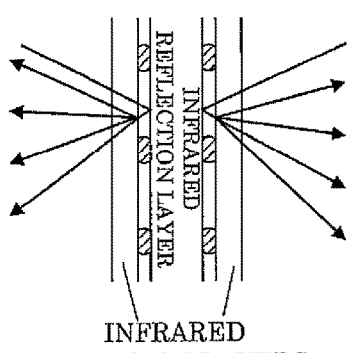
Figure 72:
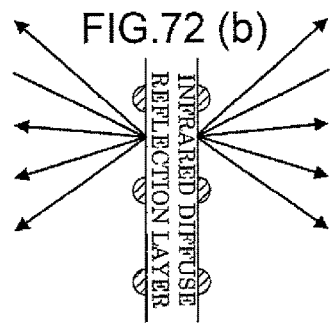
Figure 72:
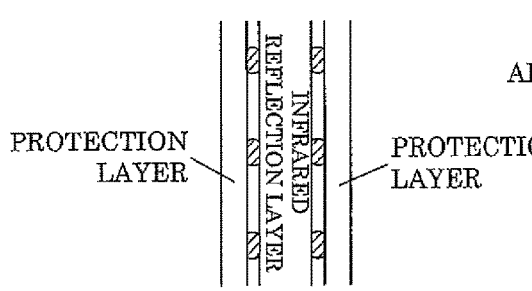
Figure 72:
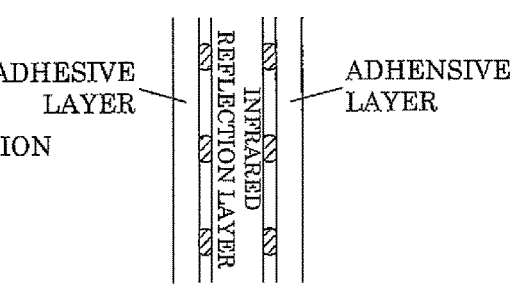

In this case, a reflection layer specularly reflected off the infrared reflection layer does not enter into the lens as shown in FIG. 69A and imaged in black at the center as shown in FIG. 69B. For this reason, the entire dot pattern cannot be imaged. Therefore, infrared light is required to be diffusely reflected to be entered into the lens. That is, as shown in FIG. 70A, an infrared diffusion layer is provided between the dot pattern printed layer and infrared reflection layer. This infrared diffusion layer is formed of transparent or translucent material. In this way, as shown in FIG. 70B, infrared light irradiated from IR-LED is specularly reflected off the infrared reflection layer, diffused by the infrared diffusion layer, then, as the result, the reflection light of all imaging area enters into the lens.

It should be noted that, while the infrared diffusion layer is provided on the grid sheet in FIG. 70, the invention is not limited to this, and a filter made of infrared diffusing material may be provided on the imaging opening of the scanner.

FIGS. 71A to 71G are section views showing a variety of structures of the grid sheet.

FIG. 71A is a grid sheet comprising: an infrared reflection layer having a characteristic of reflecting infrared light and transmitting visible light; and a dot pattern layer. As shown in FIG. 71A, infrared light irradiated from the infrared irradiation means is first absorbed at the part on which the dots of the dot pattern layer are formed (hereafter, referred to as the dot portion), and transmits other area. Next, the transmitted infrared light is specularly reflected off the infrared reflection layer, then, transmits other part than the dot portion of the dot pattern layer.

FIG. 71B is a grid sheet provided with an infrared diffusion layer, which transmits visible light as well as diffuses the infrared light, inbetween the infrared reflection layer and the dot pattern layer. As shown in FIG. 71B, infrared light irradiated from the infrared irradiation means is first absorbed at the dot portion of the dot pattern layer, and transmits other area thereof. Next, the transmitted infrared light is diffused by the infrared diffusion layer, specularly reflected off the infrared reflection layer, diffused again by the infrared diffusion layer, then, transmits other part than the dot portion of the dot pattern layer.

FIG. 71C is a grid sheet provided with an infrared diffusion layer, which transmits visible light as well as diffuses infrared light, on one side of the dot pattern layer, that is, opposite side to the infrared reflection layer. As shown in FIG. 71C, infrared light irradiated from the infrared irradiation means is first diffused at the infrared diffusion layer, absorbed at the dot portion of the dot pattern layer, then transmits other area thereof. Next, the transmitted infrared light is specularly reflected off the infrared reflection layer, transmits other part than the dot portion of the dot pattern layer, and diffused by the infrared diffusion layer.

FIG. 71D is a grid sheet comprising: an infrared diffuse reflection layer having a characteristic of diffusely reflecting infrared light from one side and transmitting visible light; and a dot pattern layer. As shown in FIG. 71D, infrared light irradiated from the infrared irradiation means is absorbed at the dot portion of the dot pattern layer, then transmits other area thereof. Next, transmitted infrared light is diffusely reflected by the infrared diffuse reflection layer and transmits other part than the dot portion of the dot pattern layer.

FIG. 71E is a grid sheet shown in FIG. 71A provided with a protection layer having a characteristic of transmitting infrared light and visible light on the outer surface of the dot pattern layer side of the grid sheet. Having such a protection layer prevents the dots from wearing and dirt, enabling longer useful life of the sheet.

It should be noted that the protection layer may be provided on the outer surface of the dot pattern layer side of the grid sheet shown in FIGS. 71B to 71D in addition to the grid sheet of FIG. 71A.

FIG. 71F is a grid sheet shown in FIG. 71A further having a characteristic of reflecting infrared light coming from the opposite side to the dot pattern layer. Having such a characteristic, infrared light from the display screen or screen attached with the grid sheet of the invention can be cut off and the irradiation light can be limited only to infrared light irradiated from the infrared irradiation means. In this way, only bright and clear dot patterns can be imaged and the dot code can be correctly analyzed.

It should be noted that not only the grid sheet in FIG. 71A but also the grid sheets shown in FIGS. 71B to 71E may also have a characteristic of reflecting infrared light coming from the opposite side (the other side) to the dot pattern layer.

FIG. 71G is a grid sheet shown in FIG. 71A further provided with an adhesive layer on the other side to the dot pattern layer side of the infrared reflection layer. The adhesive layer is made of detachable material. The adhesive layer is only required when using the grid sheet by attaching it to a display device or a medium, and not required when using the grid sheet by placing it on a printed material or by sandwiching it. Having such an adhesive layer, easy attachment of the grid sheet to a display or the like can be realized.

It should be noted that the adhesive layer may be provided not only on the grid sheet in FIG. 71A, but also on the other side to the dot pattern layer side of the infrared reflection layers of the grid sheets shown in FIGS. 71B to 71E.

FIGS. 72A to 72F show other embodiments of the grid sheet. These embodiments feature dot pattern layers provided on both sides of the sheets.

FIG. 72A is a grid sheet comprising: an infrared reflection layer having a characteristic of reflecting infrared light from each side thereof off to each direction as well as transmitting visible light; and dot pattern layers provided on both sides of the infrared reflection layer. In this way, both sides of the sheet can be used and so convenience is improved.

FIG. 72B is a grid sheet provided with infrared diffusion layers, which transmit visible light and diffuse infrared light from each direction, between the infrared reflection layer and the dot pattern layer of each side.

FIG. 72C is a grid sheet provided with infrared diffusion layers on the further outer surface of the each side of the dot pattern layers on the infrared reflection layer.

FIG. 72D is a grid sheet comprising: an infrared diffuse reflection layer; and dot pattern layers provided on both sides of the infrared diffuse reflection layer.

FIG. 72E is an information input assistance sheet which is the grid sheet shown in FIG. 72A provided with protection layers, having a characteristic of transmitting infrared light and visible light coming from each direction, on both outer surfaces thereof.

It should be noted that the protection layers may also be provided on both outer surfaces of the grid sheets shown in FIGS. 72B to 72D in addition to the one in FIG. 72A.

FIG. 72F is a grid sheet shown in FIG. 72A further provided with adhesive layers on opposite sides of the dot pattern layer sides of the infrared reflection layer, that is, on both outer sides of the grid sheet.

It should be noted that the adhesive layers may also be provided on both outer surfaces of the grid sheets shown in FIGS. 72B to 72E in addition to the one in FIG. 72A.

Details of each layer of the grid sheets in FIGS. 72A to 72F and details of how to reflect light are the same as described above, and so not described here.

It should be noted that, in the grid sheets shown in FIGS. 72A to 72F, different coordinate values and/or code values may be made into a pattern between the dot pattern layers on one side and the other side of the infrared reflection layer or infrared diffuse reflection layer.

In addition, in the grid sheets shown in FIGS. 71A to 72F, a text, illustration, photograph, and the like may be superimposed and printed on the dot pattern layers or other layers with ink made of infrared transmitting material or infrared reflecting material.

<Problem with Grid Sheet>

As described above, if an infrared diffuse reflection layer is not provided on the grid sheet, light is specularly reflected off the sheet surface, creating an area where infrared reflection does not enter around the center of the imaging element, which generates an "eyeball phenomenon" in which a black eye is imaged at the center as shown in FIG. 69B. Thus, a diffuse reflection layer is required to be provided and which increases the cost.

<Means to Solve the Problem>

Figure 73:
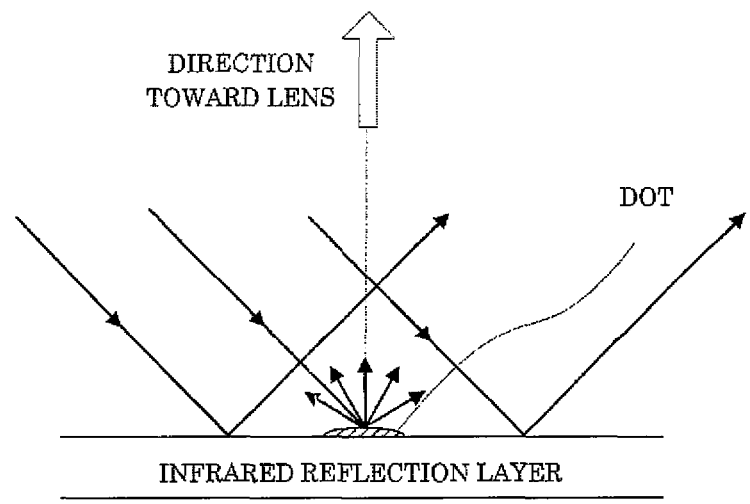
FIGS. 73A and 73B are diagrams illustrating the grid sheet used for the information input system of the invention (1).
Figure 73:
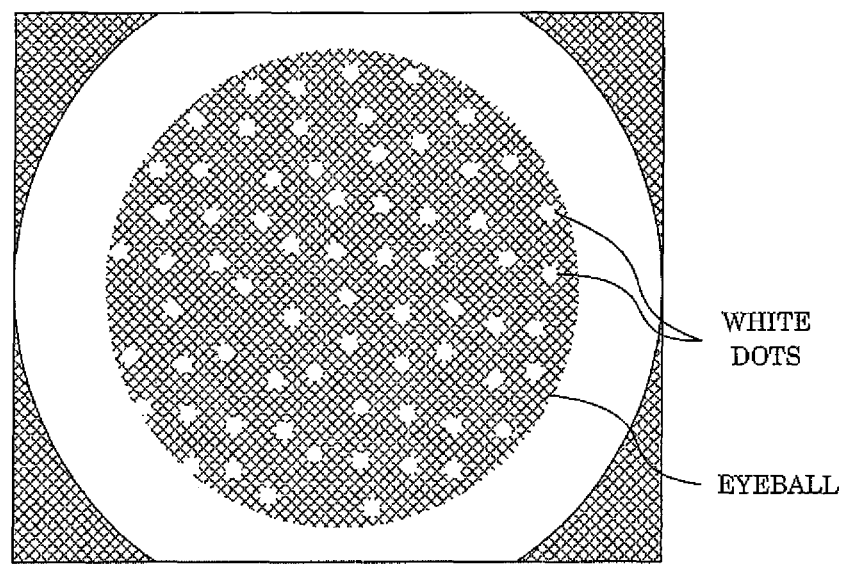

Therefore, a method of forming a dot pattern using diffuse reflection material (diffuse reflection ink) is used for a grid sheet without a diffuse reflection layer. In this method, as the dots formed with diffuse reflection material diffusely reflect infrared light to every direction as shown in FIG. 73A, the incident infrared light to the dots always enters the imaging element. In this way, as shown in FIG. 73B, the captured image shows that the dot pattern is detected as white dots in the black eyeball area.

<Method of Determining White Dots and Black Dots>

An algorithm capable of determining conventional black dots printed on a normal medium surface and also recognizing the above-described white dots printed on a grid sheet without a diffuse reflection layer.

As one of the simplest methods, there can be considered a method of, when starting analyzing white dots, inverting all black and white (negative and positive) of a captured image and using an analysis algorithm for analyzing black dots. For example, if brightness of incident light is expressed using eight bits (black:0-white:255) at each pixel of an image and if the brightness level of arbitrary pixel (pixel number i, j) is defined as $BL(i, j)$, brightness level (i, j) of the image with inverted black and white can be obtained from the following formula:

$$(i,j) = 255 - BL(i,j)$$

However, this method requires black and white inversion calculation for all pixels, which raises a problem of requiring additional calculation time.

Alternatively, instead of using this method, the following describes details of a method of determining white and black dots using an algorithm of changing a threshold for black dots to analyze white dots in the eyeball area.

Figure 74:
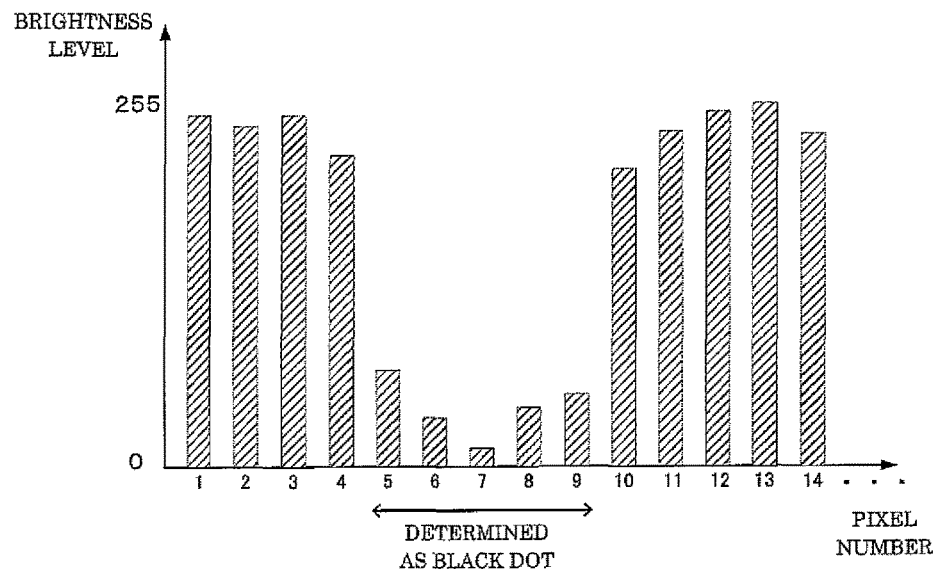
FIGS. 74A and 74B are diagrams illustrating the grid sheet used for the information input system of the invention (2).
Figure 74:
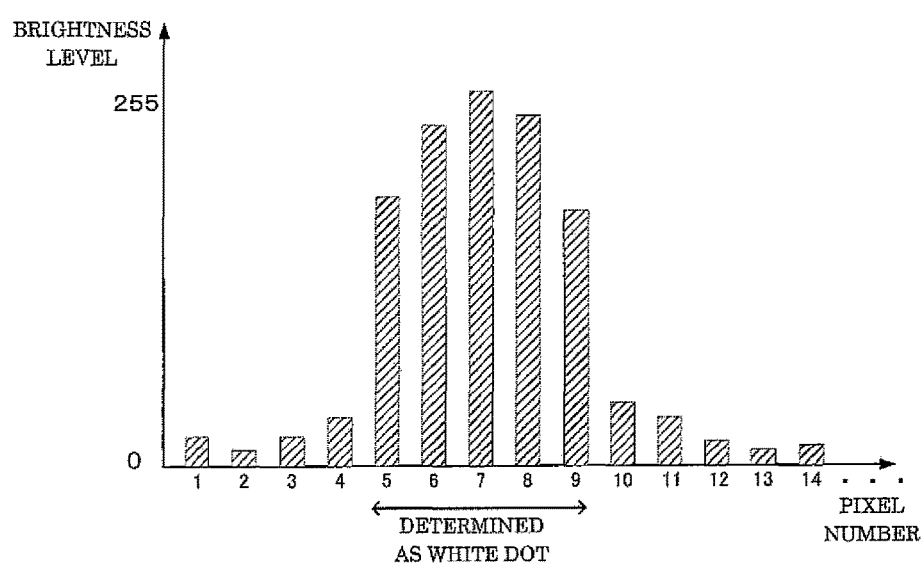

First, an analysis algorithm for determining black dots is described with reference to FIG. 74A. This algorithm is a scan-line algorithm performed per line, calculating differences of brightness between pixels that are apart at a predetermined interval starting from the left end to rightward direction, determining whether the difference exceeds or falls below the positive/negative threshold, determining the pixel on the right side as a dot if the difference falls below the negative threshold, and determining the dot starts from that pixel. Likewise, if the difference exceeds the positive threshold, the algorithm determines that the pixel on the right side is not a dot, and determines that the dot ends at the previous pixel. Here, if dots are determined with the threshold of absolute quantity, when an image is captured by inclining the scanner, dark part and bright part are generated. Lowering in brightness at dark part becomes significant and dots at dark part cannot be determined. However, as described above, using thresholds for determining a difference in brightness between two points, dots can be determined accurately even at dark part of the image.

Here, the reason for using the difference between pixels that are apart at a predetermined interval instead of the difference in brightness between neighboring pixels, is that, as a brightness difference is small around the outline with an image captured with blurred dot outline, if the distance between pixels for extracting a difference is too close, the difference is small and does not exceed the threshold, disabling determination of dots.

For example, if this predetermined interval is "4," and a difference between pixel number i and pixel number i+4 on line j is $\Delta BL(i, j)$, $\Delta BL(i, j)$ can be obtained by the following formula:

$$\Delta BL(i,j)=BL(i+4,j)-BL(i,j)$$

The threshold to be used is defined as $\phi$ ($\phi>0$). It should be noted that, if brightness is expressed by eight bits (bright level 0-255), $\phi$=approx. 25-50 at bright area, and $\phi$=approx. 8-16 at dark area are appropriate.

In this way, by dynamically changing the threshold for dark area with small brightness difference from dot portion and the threshold for bright area with large brightness difference from dot portion, the dots can be more accurately determined.

Here, if, in relation to threshold $\phi$, $\Delta BL(i, j)$ is $\Delta BL(i, j)<-\phi$, it is determined that a dot starts from the pixel of i+4 position. If $\Delta BL(i, j)>0$, it is determined that a dot ends at the pixel of i+3 position.

This threshold determination is inverted in the algorithm for analyzing the positions of white dots.

That is, if, in relation to the same threshold $\phi$, $\Delta BL(i, j)$ is $\Delta BL(i, j)>\phi$, it is determined that a dot starts from the pixel of i+4 position. If $\Delta BL(i, j)<-\phi$, it is determined that a dot ends at the pixel of i+3 position.

Using this method, positions of white dots can be easily determined without inverting black and white of all pixels.

<Configuration of Pen Scanner with Enlarged Eyeball Part>

If white dots are read out by a scanner using a grid sheet, the size of the black eye part should be increased to enlarge the area of detecting a dot pattern.

Now, the configuration of a scanner that makes larger black eye part is described.

Figure 75:
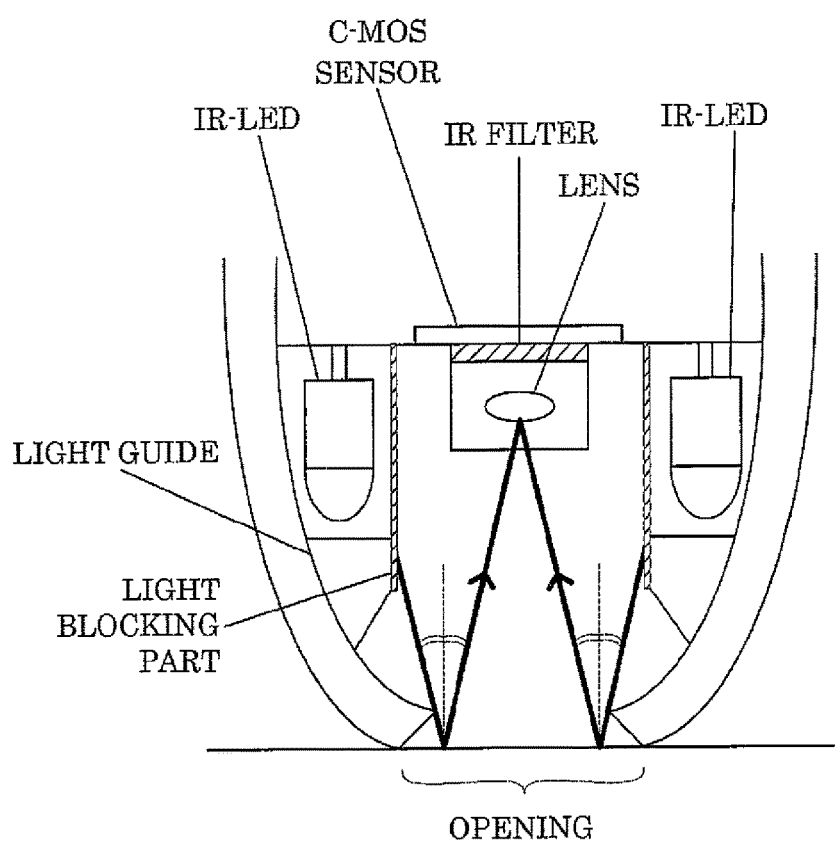
FIG. 75 is a diagram illustrating the grid sheet used for the information input system of the invention (3).

As shown in FIG. 75, on the assumption of a light path through which infrared light emitted from around the inner side of the open end of the image opening can be specularly reflected off the grid sheet and enter into the imaging element, a light guide is provided outside the light path to evenly irradiate the entire medium surface. In this way, infrared light emitted from the light guide is specularly reflected off the grid sheet to make large area of the captured image the black eye part. Here, a light blocking part should be provided at the position shown in FIG. 75 to prevent excessive infrared light from being specularly reflected off the grid sheet and entering into the imaging element. It should be noted that, if the scanner is inclined, while the black eye area becomes smaller due to the structure, the imaging area is enlarged and the number of imaged white dots increases, enabling analyzing a dot code without a problem.

<Method of Determining Whether in Contact with a Medium or Not>

If the codes on a medium are kept being read while the scanner is in contact with the medium surface, for example, if a user slightly shifts the reading position without intention, the scanner reads out a code different from the user's intention and reproduces a different content. To eliminate such a situation, the scanner may be configured to ignore a code different from the code read for the first time. However, when tracing a medium surface using the scanner as in handwriting input, codes (coordinate values) being read one after another should be input. In such a case, coordinate values may always be processed as normal input when a new coordinate value is read for the next time while ignoring errors. Further, if the scanner is configured to input the same code that was read for the second time as the code that was read for the first time when an error once occurs due to a slight movement of the scanner, the scanner keeps starting the same content over and over again (playing, such as repeating "hello, hello, hello . . . ," occurs), disabling appropriate operation.

Thus, it is necessary to determine whether the scanner is in contact with the medium surface, and as long as the scanner is in contact with the medium surface, ignore the same code that is read for the second time (a different code may also be ignored), and continue the execution of a content or an instruction corresponding to the code that was read by the scanner for the first time when the scanner became in contact with the medium surface. It will be appreciated that if the scanner is once separated from the medium surface and becomes in contact with the medium surface again, the ongoing content and instruction is terminated and execution of the content and instruction corresponding to the newly read code (whether it is the same code or a different code) is started. It should be noted that if the code cannot be read even the scanner is in contact with the medium surface, the execution of ongoing content and instruction continues.

If this method is used and only black dots arranged on the medium surface are to be read, brightness at the center part of the read image may be simply measured to determine that the pen is in contact with the medium surface if it is bright, and determine that the pen is not in contact with the medium surface if it is dark. The reason why only brightness of the center part is measured is because decrease in brightness is small at the center part even when the scanner is inclined, thus, not affecting the determination, and the measurement time can be minimum by defining only the center part as the measurement area.

However, with the scanner that can read both black dots and white dots, as the center part of the read image is dark when reading white dots, it is erroneously determined that the pen is not in contact with the medium surface.

Figure 76:
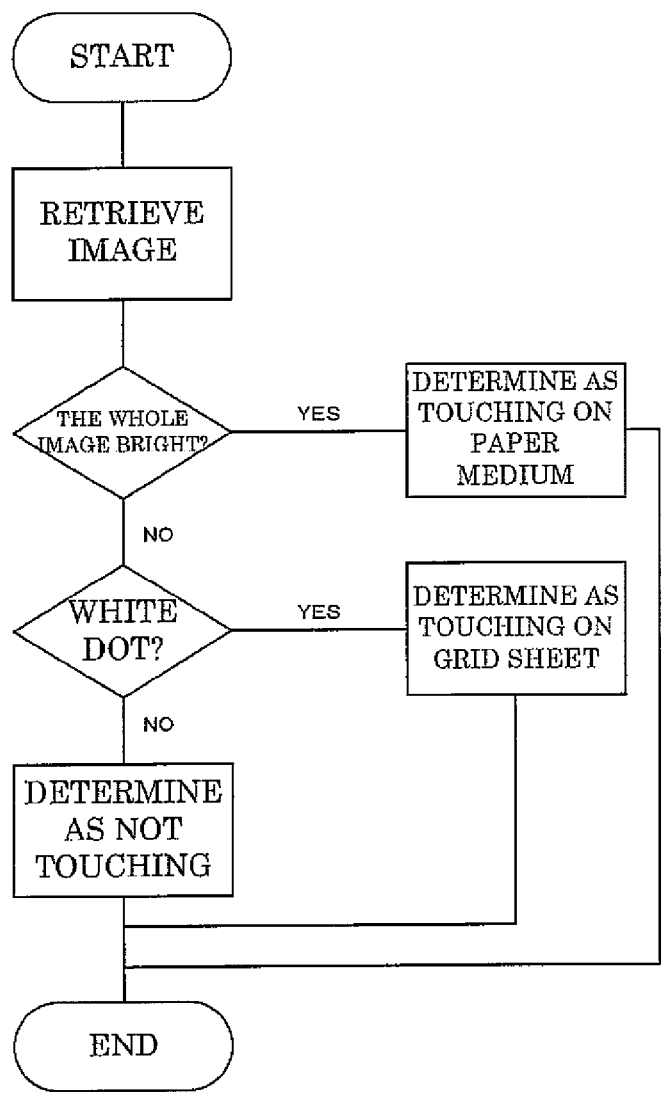
FIG. 76 is a diagram illustrating the grid sheet used for the information input system of the invention (4).

So, the following describes a method of determining whether the scanner that can read both black and white dots is in contact with either a normal medium surface (e.g., print medium surface) or a grid sheet, or not in contact with any of them, with reference to FIG. 76.

First, an image is captured by the imaging element (S10).

Whether the center part of the captured image is bright or not is measured (S20), and if the center part is bright, it is determined that the scanner is in contact with a normal medium surface (S25). The measurement of whether the center part of the image is bright or not is determined by whether or not the brightness at the center part of the image exceeds a predetermined threshold or not.

If the center part is not determined as bright, white dots are searched in the image (S30). If white dots are detected, it is determined that the scanner is in contact with the grid sheet (S35).

If it is determined that there is no white dot, it is determined that the scanner is not touching the medium surface (S40).

After determining S25, S35, and S40, the analysis ends.

Figure 77:
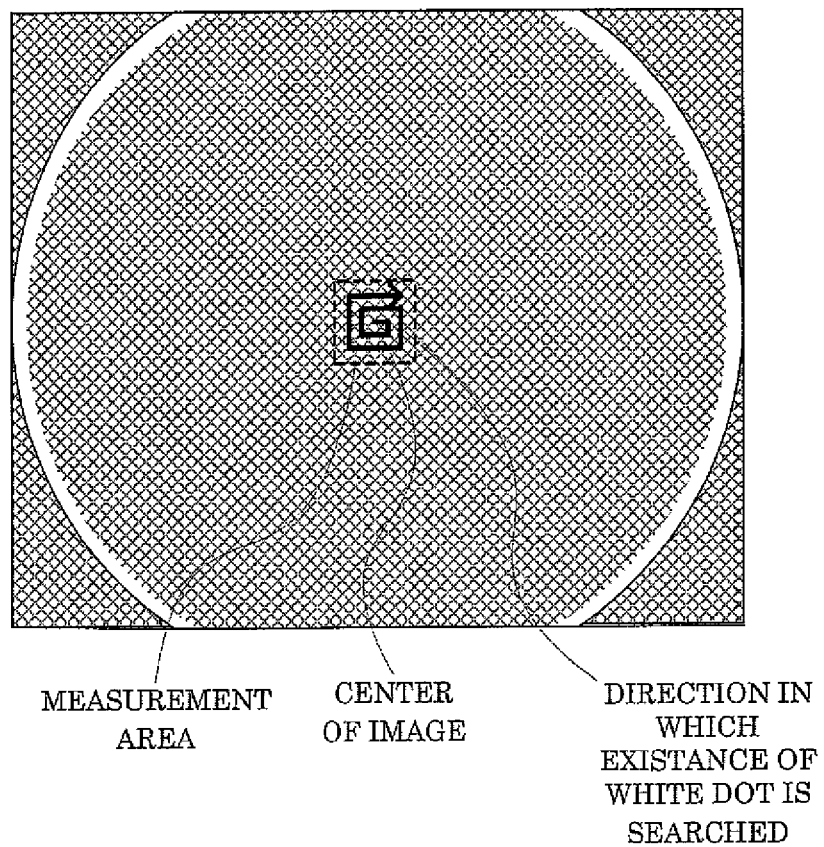
FIG. 77 is a diagram illustrating the grid sheet used for the information input system of the invention (5).

To search white dots in a dark part area in S30, whether peripheral pixels form white dots is determined in a spiral manner from the center of the captured image within a predetermined area (minimum area where a predetermined amount of dots always exist) as shown in FIG. 77.

If it is determined that the scanner is in contact with a normal medium surface in S25 above, analysis of black dots (a conventional algorithm) is started. If it is determined that the scanner is in contact with a grid sheet in S35, analysis of white dots (a new algorithm) is started.

<Newly Added Features Under the Priority Claim Based on Patent Application>

<Afterimage Characteristic of Imaging Element>

It should be noted, for the electrical charge of the element shown in FIG. 17C, the way in which afterimage of imaging element 12 disappears within predetermined time $t_k$ may be slower in addition to the one shown in FIG. 17C.

<Shape of Writing Area>

Figure 78:
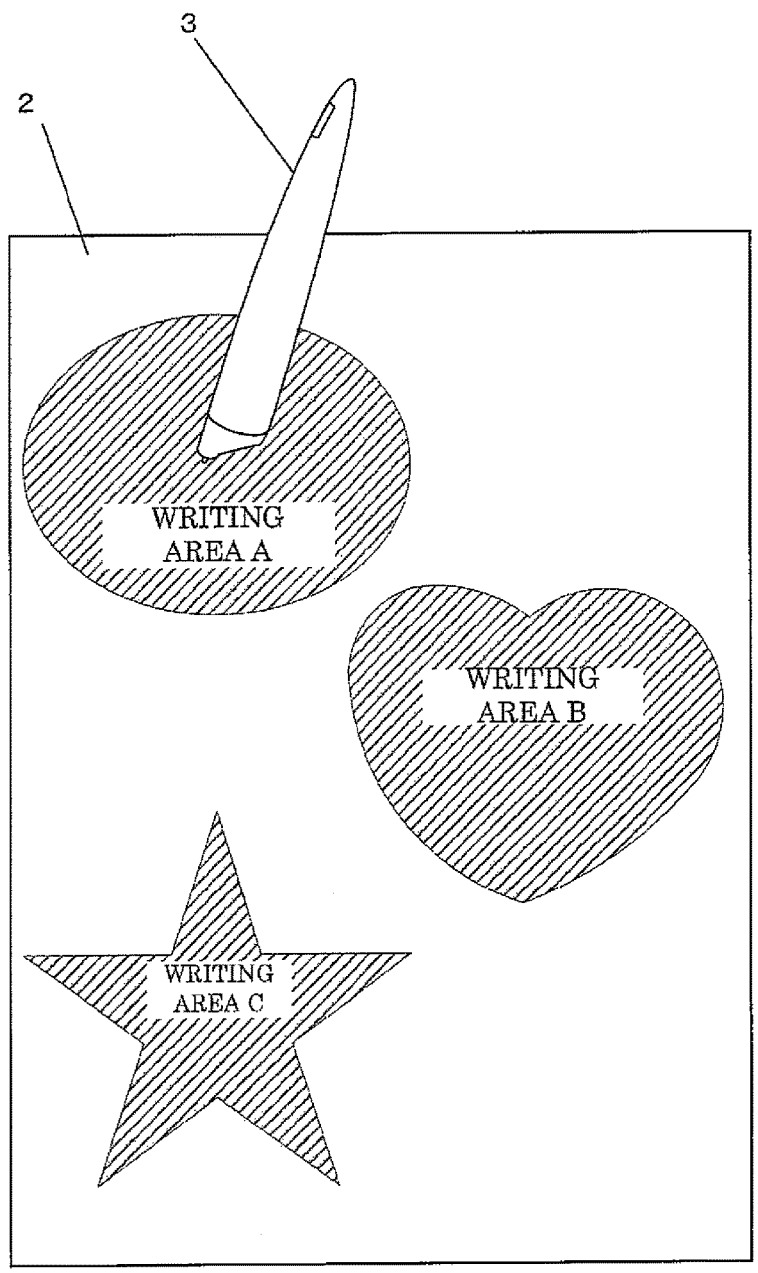
FIG. 78 is a diagram illustrating the function of the medium on which is formed the writing area used for the handwriting input/output system of the invention (15).

So far as described above, the writing area was always a rectangle. If the writing area is identified using code information as in this invention, the shape of the writing area may be, for example, a polygon, circle, ellipse, heart, and star as shown in FIG. 78. Or if an illustration and a dot pattern are superimposed and printed, the shape may be the outline of the actual line of the illustration. Whatever the shape of the writing area may be, similar analysis efficiency can be realized.

Conventionally, to identify the writing area only using the coordinate information, the coordinates indicating the boundary of the writing area should be defined in advance using a table or a function, and whether the input coordinate value is in the scope of the table or the function or not should be determined for each time. As the result, the analysis becomes complicated, and if the writing area is identified using only coordinate information, the writing area is required to be a rectangle to minimize decrease in analysis efficiency of the memory used, calculation rate, and the like. If the writing area is a rectangle, the minimum value and maximum value of the XY coordinate values of the rectangular area are stored in a table and whether the input coordinate value is in the scope or not is determined. Therefore, even when the writing area is a rectangle, memory is required to be used four times as much and four times of additional comparing calculations to determine whether it is the writing area is required compared with the case of specifying the writing area using code information. Further, if there are a plurality of writing areas, determination of which one of the writing areas is required, and, thus, enormous volume of memory used and calculation rate are expected to be required. In this invention, as code information directly identifies the writing area no matter what the shape of the writing area is like, the writing area can be identified without using additional memory used or performing additional calculations.

<Determining by Combination of Arrangement Directions>

The following describes another method of automatically determining operation.

Figure 80:
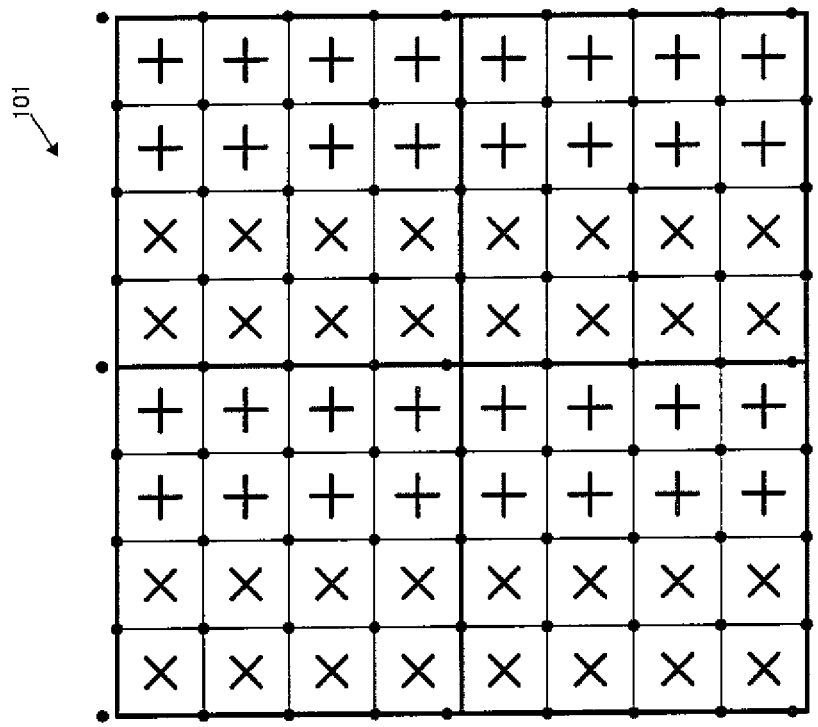
FIGS. 80A and 80B are diagrams illustrating the dot pattern used for the handwriting input/output system of the invention (8).
Figure 80:
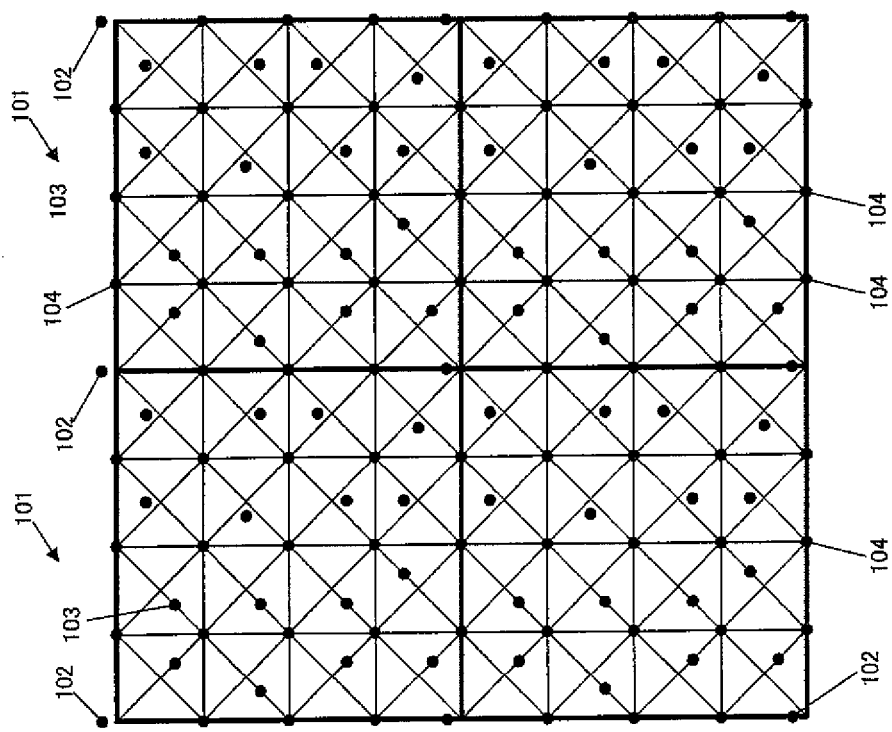

If a dot pattern that defines information by arranging an information dot with a distance and direction from a reference position (the first digitized information), such as GRID1 and GRID3, is used, information of the combination of the arrangement directions (the second digitized information) whether arranging the information dot on + direction lines (on upward, downward, leftward, and rightward direction lines), or arranging on x direction lines (on diagonal lines) can be defined. If the case in which an information dot is arranged on x direction lines is defined as "0" and the case in which an information dot is arranged on + direction lines is defined as "1," the second digitized information in the dot pattern of FIG. 79B is "1010010110100101," and the second digitized information in the dot pattern of FIG. 80B is "0000000011111111."

In addition to the arrangement direction of an information dot, the second digitized information can be defined by the combination of which distance the information dot is arranged with reference to the virtual reference point by defining two or more patterns of distances to arrange an information dot from a virtual reference point (arrangement distances).

It will be appreciated that the second digitized information may be defined by the combination of both the arrangement direction and arrangement distance of an information dot.

That is, the second digitized information means information that is defined by the arrangement rule of an information dot, such as the arrangement direction and arrangement distance of the information dot.

While the inventor had proposed a dot pattern format that defines both code information and coordinate information, with such a dot pattern format, a large dot pattern distribution area has to be provided to increase the number of information dots, requiring a large scanning area of the optical reading unit of the pen scanner to read the dot pattern.

For this reason, it was difficult for toys and the like that comprise an optical reading unit with low reading accuracy, calculation rate, and calculation capacity to use a format that defines both code information and coordinate information. However, the above-described method can define large amount of information even with a dot pattern with small number of information dots in a small distribution area.

INDUSTRIAL APPLICABILITY

Firstly, the handwriting input/output system of the invention has an industrial applicability as an input device with which a person who has not acquired techniques for using existing input devices used for computer operations, such as a mouse, keyboard, and tablet, can use as if writing on a paper medium. Further, the handwriting input/output system of the invention has an industrial applicability as a toy mainly targeting children, particularly as an educational toy.

Secondly, as the handwriting input/output system of the invention can identify the writing area based on the code information read out simultaneously with the coordinate information, if a handwritten input content belongs to a predetermined category, the recognition rate significantly increases by referring to a dictionary of that category.

Thirdly, the handwriting input/output system of the invention determines whether it is the writing area or not only by reading a dot pattern without a special operation of an operator, realizing intuitive handwriting input by anybody as if using a favorite writing material.

DESCRIPTION OF REFERENCE NUMERALS AND SIGNS

1 HANDWRITING INPUT/OUTPUT SYSTEM
2 MEDIUM

3 SCANNER
4 COMPUTER
5 SERVER
6 DISPLAY
7 IMAGING UNIT
8 DOT PATTERN ANALYSIS UNIT
9 TRAJECTORY RECOGNITION UNIT
10 PROCESS INSTRUCTION UNIT
11 INFORMATION PROCESSING UNIT
12 IMAGING ELEMENT
13 IRRADIATION UNIT
14 LIGHT CONTROL UNIT
15 TIMER
16 ANGLE MEASURING UNIT
17 ANGLE CHANGE RECOGNITION UNIT
18 ROTATION ANGLE READING UNIT
19 ROTATION ANGLE CHANGE RECOGNITION UNIT
20 SOUND RECORDING UNIT
21 SOUND RECOGNITION UNIT
22 SOUND OUTPUT UNIT
23 TRANSMISSION UNIT
24 TRANSMISSION BUTTON
25 RETRANSMISSION BUTTON
26 MICROPHONE
27 SOUND PLAY BUTTON
28 PROJECTION FOR INSTRUCTION
29 PEN
30 PEN RETRACT BUTTON
31 PEN-SHAPED SCANNER
32 LIGHT GUIDE
33 LENS
34 LED
35 C-MOS SENSOR
36 PCB
37 PEN
38 GUIDE BANK
39 BRAILLE
40 MICRO PROCESSING UNIT (MPU)
41 MICROPHONE
42 AMPLIFIER
43 A/D CONVERTER
44 COMPRESSION CIRCUIT
45 SPEAKER
46 EARPHONE

What is claimed is:

1. A handwriting input/output system comprising:
a medium that comprises a writing area, on at least part of or a plurality of areas of the medium, formed with a dot pattern that repeatedly defines coordinate information and code information;
an imaging unit that images the dot pattern of the writing area; and
a dot pattern analysis unit that analyzes a code of the image data of the dot pattern imaged from the imaging unit to obtain the code information and trajectory information created by the coordinate information;
wherein the medium comprises a plurality of the writing areas,
in at least a part of the code information defined in each of the plurality of the writing areas, a specific code which uniquely specifies the writing area is defined.

2. A handwriting input/output system comprising:
a medium that comprises a writing area, on at least part of or a plurality of areas of the medium, formed with a dot pattern that repeatedly defines coordinate information and code information;
an imaging unit that images the dot pattern of the writing area; and
a dot pattern analysis unit that analyzes a code of the image data of the dot pattern imaged from the imaging unit to obtain the code information and trajectory information created by the coordinate information;
wherein the imaging unit further comprises:
an irradiation unit that irradiates a predetermined wavelength light to the medium surface through an imaging opening; and
a transmitting unit that images at least reflection of the predetermined wavelength light and transmits as image data to the dot pattern analysis unit, and
further comprises a light control unit that controls the irradiation unit, wherein the light control unit causes the irradiation unit to emit a predetermined strength light during a first predetermined time that is within a limit of time when the imaging unit can image the dot pattern in the imaging element, the image data can remain in the imaging element longer than time during which the dot pattern analysis unit stores the image data transmitted, and the dot pattern analysis unit can recognize the dot including blur of the image and analyze the image data, then to emit the predetermined strength light again after a second predetermined time has elapsed that is longer than analysis time required by the dot pattern analysis unit for analyzing a code of the image data.

3. A handwriting input/output system comprising:
a medium that comprises a writing area, on at least part of or a plurality of areas of the medium, formed with a dot pattern that repeatedly defines coordinate information and code information;
an imaging unit that images the dot pattern of the writing area; and
a dot pattern analysis unit that analyzes a code of the image data of the dot pattern imaged from the imaging unit to obtain the code information and trajectory information created by the coordinate information;
wherein the medium comprises a writing area formed with a dot pattern in which: a plurality of reference dots are provided so as to form a size and direction of a block within an area of the block for arranging an information dot; a plurality of virtual reference points that are defined with reference to the reference dots are arranged; the information dot that defines coordinate information or coordinate information and code information by a distance and direction from the virtual reference point is arranged; and, the coordinate information or the coordinate information and code information is repeatedly defined at least part of or a plurality of areas in a predetermined combination of arrangement directions of the information dot among a plurality of combinations of arrangement directions of the information dot with reference to the plurality of virtual reference points, and
the dot pattern analysis unit determines the writing area based on the predetermined combination of arrangement directions of the information dot and processes handwriting input.

4. A handwriting input/output system comprising:
a medium that comprises a writing area, on at least part of or a plurality of areas of the medium, formed with a dot pattern that repeatedly defines coordinate information and code information;
an imaging unit that images the dot pattern of the writing area; and a dot pattern analysis unit that analyzes a code of the image data of the dot pattern imaged from the imaging unit to obtain the code information and trajectory information created by the coordinate information;

wherein at least a part of the code information defines a writing flag indicating that there is a writing area, and the dot pattern analysis unit processes handwriting input by identifying that there is the writing area based on the writing flag.

5. The handwriting input/output system according to any one of claims 1, 2, 3 and 4, wherein the medium is further formed with a text, graphic, and photograph relating to the writing area on at least part of or a plurality of areas of the medium.

6. The handwriting input/output system according to any one of claims 1, 2, 3 and 4, wherein the medium is formed by being superimposed with the dot pattern at least as well as the trajectory information drawn on the surface of the writing area or edited information of the trajectory information and/or print information on the surface of the medium.

7. The handwriting input/output system according to any one of claims 1, 2, 3 and 4, wherein, on a predetermined medium surface and/or the writing area surface of the medium, the dot pattern that is formed by repeatedly defining the writing area and/or an operation instruction (e.g., starting up a program, inputting a command, inputting and outputting/searching data, specifying searching information) in at least a part of the code information, and an icon are formed by being superimposed.

8. The handwriting input/output system according to claim 7 wherein the icon is formed by superimposing on the dot pattern on a surface of a medium including a sticker and sticky note that can be attached somewhere.

9. The handwriting input/output system according to any one of claims 1, 2, 3 and 4, further comprising: by defining the medium provided with the writing area as a first medium, a second medium on which is formed a dot pattern that repeatedly defines a specific code for identifying a surface of the first medium and/or a surface of the writing area, wherein, by scanning the code information formed on the second medium with the imaging unit, print information on the first medium surface and/or the trajectory information drawn on the writing area surface and/or information related with the trajectory information is output.

10. The handwriting input/output system according to claim 9, wherein the second medium is in a form of a sticker, sticky note that can be attached somewhere, or a card.

11. The handwriting input/output system according to any one of claims 1, 2, 3 and 4, wherein the medium is a grid sheet that is a transparent information input assistance sheet used by being placed on a monitor surface that displays the writing area of the handwriting input/output system and the grid sheet is formed with a dot pattern that repeatedly defines coordinate information and/or code information.

12. The handwriting input/output system according to any one of claims 1, 2, 3 and 4, wherein the medium is a grid sheet that is a transparent information input assistance sheet used by being placed on a medium printed with the writing area of the handwriting input/output system and the grid sheet is formed with a dot pattern that repeatedly defines coordinate information and/or code information.

13. The handwriting input/output system according to claim 2, wherein the light control unit instructs the irradiation unit to emit light after storing of the image data in a storage element by the dot pattern analysis unit before the second predetermined time, the irradiation unit emits the predetermined strength light during the first predetermined time, and the dot pattern analysis unit analyzes a code of image data that is newly imaged by the imaging unit and stored into the storage element.

14. The handwriting input/output system according to claim 2, wherein the light control unit instructs the irradiation unit to immediately emit light while the dot pattern analysis unit is analyzing the dot pattern before the second predetermined time, the irradiation unit emits the predetermined strength light during the first predetermined time, and the dot pattern analysis unit analyzes a code of image data that is newly imaged by the imaging unit and stored into a storage element during the analysis time immediately after the analysis time.

15. The handwriting input/output system according to any one of claims 1, 2, 3 and 4, wherein the imaging unit further comprises a projection for instruction and images the dot pattern on a trajectory near the projection for instruction when tracing a letter, a character and/or a figure traced by the projection for instruction onto the writing area surface.

16. The handwriting input/output system according to any one of claims 1, 2, 3 and 4, wherein the imaging unit further comprises at least a pen tip, and images the dot pattern on a trajectory near the pen tip when tracing a letter, a character, and/or a figure drawn by the pen tip onto the writing area surface.

17. The handwriting input/output system according to claim 15, wherein the projection for instruction further comprises:

at least a pen tip;

a retraction space for retracting the pen tip inside the projection for instruction; and a button for controlling retraction/extension of the pen tip.

18. The handwriting input/output system according to claim 15, wherein the imaging unit further comprises an erasing unit, in the projection for instruction, that erases a letter, a character, and/or a figure drawn on the writing area surface, and a process instruction unit that transmits a process instruction for erasing the trajectory information of the letter, the character, and/or the figure and the trajectory information to an information processing unit, and erases an area traced by the erasing unit on the writing area surface.

19. The handwriting input/output system according to claim 16, wherein the imaging unit further comprises an erasing unit, in the pen tip, that erases a letter, a character, and/or a figure drawn on the writing area surface, and a process instruction unit that transmits a process instruction for erasing the trajectory information of the letter, the character, and/or the figure and the trajectory information to an information processing unit, and erases an area traced by the erasing unit on the writing area surface.

20. The handwriting input/output system according to claim 15, wherein the dot pattern analysis unit calibrates the coordinate information so that the coordinate information becomes identical or approximate to a trajectory of a letter, a character, and/or a figure either traced or drawn by the projection for instruction on the writing area surface.

21. The handwriting input/output system according to claim 16, wherein the dot pattern analysis unit calibrates the coordinate information so that the coordinate information becomes identical or approximate to a trajectory of a letter, a character, and/or a figure either traced or drawn by the pen tip on the writing area surface.

22. The handwriting input/output system according to any one of claims 1, 2, 3 and 4 further comprising:
a trajectory recognition unit that recognizes a letter, a character, and/or a figure based on at least the trajectory information.

23. The handwriting input/output system according to claim 22, wherein the trajectory recognition unit further comprises a timer for keeping times.

24. The handwriting input/output system according to claim 23, wherein the timer records times by associating with a part or all of the trajectory information or records times that the imaging unit becomes in contact with the writing area surface and becomes off the writing area surface by associating with the trajectory information.

25. The handwriting input/output system according to claim 22, wherein the trajectory recognition unit further refers to a letter, character, and/or figure information pattern categorized in advance and relating to a content to be written in the writing area to recognize the trajectory information, wherein the letter, character, and/or figure information pattern is associated with at least a part of the code information.

26. The handwriting input/output system according to claim 22, wherein, the trajectory recognition unit refers to a semantic information dictionary of the letter, the character, and/or the figure information or a word comprising one or a plurality of the letters and the characters, and converts the semantic information into a semantic information code.

27. The handwriting input/output system according to any one of claims 1, 2, 3 and 4 further comprising:
a process instruction unit that transmits at least one of the coordinate information, the code information, the trajectory information, letter, character, and/or figure information and a semantic information code to an information processing unit.

28. The handwriting input/output system according to claim 27, wherein the process instruction unit transmits identification information that identifies the writing area and/or an operation instruction (e.g., starting up a program, inputting a command, inputting and outputting/searching data, specifying searching information) based on the code information or the letter, character, and/or figure information to the information processing unit.

29. The handwriting input/output system according to claim 27, wherein the process instruction unit instructs the information processing unit on a first operation, that is, to input a recognition result of the trajectory information by the trajectory recognition unit as a text and/or a figure.

30. The handwriting input/output system according to claim 27, wherein the process instruction unit instructs the information processing unit on a second operation, that is, to input a recognition result of the trajectory information by the trajectory recognition unit as a comment.

31. The handwriting input/output system according to claim 27, wherein the process instruction unit instructs the information processing unit on a third operation, that is, by defining a recognition result of the trajectory information by the trajectory recognition unit as an edit mark for editing a text and/or a figure and/or a comment, to edit a text and/or a figure and/or a comment based on the edit mark.

32. The handwriting input/output system according to claim 27, further comprising:
an angle measuring unit that at least measures an inclination and an inclination direction of an imaging light axis of the imaging unit in contact with the medium surface when the imaging unit is tilted with reference to a perpendicular line to the medium surface; and
an angle change recognition unit that analyzes a predetermined change in the inclination and/or the direction by a grid tilt operation, that is, a motion of tilting the imaging unit with reference to the inclination and the direction measured when the imaging unit becomes in contact with the medium surface,
wherein the process instruction unit transmits a predefined process instruction to the information processing unit based on a result of the analysis.

33. The handwriting input/output system according to claim 32, wherein the dot pattern arranged with a predetermined angle with reference to a direction of the writing area is formed on the writing area on the medium, and
the angle measuring unit and the angle change recognition unit analyze a predetermined change in the inclination direction and/or the inclination of the imaging unit tilted toward the writing area with reference to a direction of the dot pattern read out when the imaging unit becomes in contact with the writing area surface.

34. The handwriting input/output system according to claim 32, wherein, when the angle change recognition unit recognizes that the imaging unit is tilted to a first predetermined direction with reference to an upward direction of the imaging unit or the writing area by the grid tilt operation, the process instruction unit instructs the information processing unit to execute a first operation, that is, to input a recognition result of trajectory information by the trajectory recognition unit as a text and/or a figure.

35. The handwriting input/output system according to claim 32, wherein, when the angle change recognition unit recognizes that the imaging unit is tilted to a second predetermined direction with reference to an upward direction of the imaging unit or the writing area by the grid tilt operation, the process instruction unit instructs the information processing unit to execute a second operation, that is, to input a recognition result of trajectory information by the trajectory recognition unit as a comment.

36. The handwriting input/output system according to claim 32, wherein, when the angle change recognition unit recognizes that the imaging unit is tilted to a third predetermined direction with reference to an upward direction of the imaging unit or the writing area by the grid tilt operation, the process instruction unit instructs the information processing unit to execute a third operation, that is, by defining a recognition result of trajectory information by the trajectory recognition unit as an edit mark for editing a text and/or a comment, to edit a text and/or a figure and/or a comment based on the edit mark.

37. The handwriting input/output system according to claim 36, wherein, when the angle change recognition unit recognizes that the imaging unit is tilted to a fourth predetermined direction with reference to an upward direction of the imaging unit or the writing area by the grid tilt operation, the process instruction unit instructs the information processing unit to terminate the third operation.

38. The handwriting input/output system according to claim 27 wherein, when the information processing unit determines whether to execute a predetermined process or not and when the dot pattern analysis unit recognizes that the imaging unit touches the medium surface only once during a predetermined time period,
the process instruction unit instructs the information processing unit to determine not to execute the predetermined process, and when the dot pattern analysis unit recognizes that the imaging unit touches the medium surface once and touches again during a predetermined time period, the process instruction unit instructs the information processing unit to determine to execute the predetermined process.

39. The handwriting input/output system according to claim 27, further comprising:
a rotation angle reading unit that reads out a rotation angle between a direction of the dot pattern read out when the imaging unit becomes in contact with the writing area surface by standing an imaging light axis of the imaging unit generally perpendicular to the writing area surface and an angle of the imaging unit; and
a rotation angle change recognition unit that, when the imaging light axis is rotated in a predetermined rotation direction by a grid turn operation, that is, a motion that rotates the imaging unit, analyzes a predetermined change in the rotation angle with reference to the rotation angle measured when the imaging unit becomes in contact with the writing area surface,
wherein the process instruction unit transmits a predefined process instruction to the information processing unit based on a result of the analysis.

40. The handwriting input/output system according to claim 39, wherein, when the rotation angle change recognition unit recognizes that the imaging unit is rotated in a first predetermined direction, the process instruction unit instructs the information processing unit to store a change result of a file content of a running application, and
when the rotation angle change recognition unit recognizes that the imaging unit is rotated in a second predetermined direction that is an opposite direction to the first predetermined direction, the process instruction unit instructs the information processing unit to cancel a change of the file content of the running application.

41. The handwriting input/output system according to claim 39, wherein, when the rotation angle change recognition unit recognizes that the imaging unit is rotated in a first predetermined direction and further rotated in a second predetermined direction that is an opposite direction to the first predetermined direction during a predetermined time period, the process instruction unit instructs the information processing unit to start up an application for handwriting input/output, and
when the rotation angle change recognition unit recognizes that the imaging unit is rotated in the second predetermined direction and further rotated in the first predetermined direction during a predetermined time period, the process instruction unit instructs the information processing unit to terminate the application for handwriting input/output.

42. The handwriting input/output system according to any one of claims 1, 2, 3 and 4 further comprising:
a sound recording unit that records a sound by a predetermined operation with the imaging unit.

43. The handwriting input/output system according to claim 42, further comprising:
a sound recognition unit that refers to a sound recognition information dictionary associated with at least a part of the code information, recognizes the recorded sound, converts it to letter and character information.

44. The handwriting input/output system according to claim 42, wherein the predetermined operation is performed either by tracing or drawing a symbol signifying a sound input on the writing area using the imaging unit.

45. The handwriting input/output system according to claim 42, wherein the predetermined operation is performed by touching the writing area with imaging unit and flicking the imaging unit.

46. The handwriting input/output system according to claim 42, wherein the predetermined operation is performed by recording a predetermined word in the sound recording unit and recognizing the predetermined word by the sound recognition unit.

47. The handwriting input/output system according to any one of claims 1, 2, 3 and 4, wherein instruction information of voice guidance is predefined in at least a part of the code information, and
the handwriting input/output system further comprises a sound output unit that explains a content to be written on the writing area by the voice guidance.

48. The handwriting input/output system according to any one of claims 1, 2, 3 and 4 wherein the writing area is of an arbitrary shape.

49. The handwriting input/output system according to claim 3, wherein the predetermined combination of arrangement directions of the information dot is a predetermined combination of arrangement directions of the information dot among combinations of arrangement directions where the information dot is arranged in any one of upward, downward, leftward, rightward directions and diagonal directions from each of the plurality of virtual reference points.

50. The handwriting input/output system according to any one of claims 1, 2, 3 and 4, wherein at least a part of the code information defines identification code that uniquely identifies the writing area and/or an operation instruction meaning a writing process, and
the dot pattern analysis unit processes handwriting input/output by identifying the identification code and/or the operation instruction.

* * * * *